(12) United States Patent
Nyberg et al.

(10) Patent No.: US 8,562,803 B2
(45) Date of Patent: Oct. 22, 2013

(54) ELECTROCHEMICAL ION EXCHANGE TREATMENT OF FLUIDS

(75) Inventors: Eric David Nyberg, Belmont, CA (US); Christine Ellen Vogdes, Sunnyvale, CA (US); James Crawford Holmes, San Carlos, CA (US); Ashok Kumar Janah, San Francisco, CA (US)

(73) Assignee: Pionetics Corporation, San Carlos, CA (US)

( * ) Notice: Subject to any disclaimer, the term of this patent is extended or adjusted under 35 U.S.C. 154(b) by 1852 days.

(21) Appl. No.: 11/539,596

(22) Filed: Oct. 6, 2006

(65) Prior Publication Data

US 2007/0108056 A1    May 17, 2007

Related U.S. Application Data

(60) Provisional application No. 60/724,456, filed on Oct. 6, 2005, provisional application No. 60/831,703, filed on Jul. 17, 2006.

(51) Int. Cl.
*B01D 61/42* (2006.01)
*B01D 61/48* (2006.01)

(52) U.S. Cl.
USPC ........... 204/536; 204/537; 204/538; 204/631; 204/632

(58) Field of Classification Search
USPC ................... 204/536–538, 631–632
See application file for complete search history.

(56) References Cited

U.S. PATENT DOCUMENTS

| | | | |
|---|---|---|---|
| 2,470,741 A | 5/1949 | Gordon | |
| 2,726,356 A | 12/1955 | Rockafellow | |
| 2,974,681 A | 7/1957 | Whitehurst | |
| 2,825,666 A | 3/1958 | Stoddard | |
| 2,829,095 A | 4/1958 | Oda et al. | |
| 2,863,813 A | 12/1958 | Juda et al. | |
| 3,003,940 A | 10/1961 | Mason et al. | |
| 3,233,732 A | 2/1966 | Lung et al. | |
| 3,250,695 A | 5/1966 | Winslow, Jr. et al. | |
| 3,368,871 A | 2/1968 | O'Connor et al. | |

(Continued)

FOREIGN PATENT DOCUMENTS

| | | |
|---|---|---|
| CA | 2228886 | 8/1999 |
| CN | 1172774 A | 2/1998 |

(Continued)

OTHER PUBLICATIONS

Hawkins, J., "Electrochemical ion exchange with textured membranes and cartridge", U.S Appl. No. 11/190,802, filed Jul. 26, 2005 (published as US 2007/0023290).

*Primary Examiner* — Arun S Phasge
(74) *Attorney, Agent, or Firm* — Ashok K. Janah; Janah & Associates, P.C.

(57) ABSTRACT

A fluid treatment apparatus for treating a fluid comprises an electrochemical cell having fluid orifices to receive and release fluid, and a fluid passageway connecting the orifices with a water-splitting ion exchange membrane is exposed to the fluid in the passageway. First and second electrodes are positioned about the membrane. The apparatus also comprises a controller to control and operate a power supply and valve system. The power supply supplies a current to the first and second electrodes at sufficiently high current density to result in bacteriostasis, deactivation, or a reduction in the microorganisms in the fluid. The controller can also operate a set of cells to deionize fluid and regenerate the cells.

72 Claims, 21 Drawing Sheets

(56) References Cited

U.S. PATENT DOCUMENTS

| | | |
|---|---|---|
| 3,398,069 A | 8/1968 | Juda |
| 3,398,091 A | 8/1968 | Greatorex |
| 3,412,006 A | 11/1968 | Alexander et al. |
| 3,420,773 A | 1/1969 | Selmeczi |
| 3,433,726 A | 3/1969 | Parsi et al. |
| 3,440,149 A | 4/1969 | Parsi et al. |
| 3,440,159 A | 4/1969 | McRae et al. |
| 3,446,724 A | 5/1969 | Winslow, Jr. et al. |
| 3,454,472 A | 7/1969 | Giuffrida |
| 3,475,122 A | 10/1969 | McRae et al. |
| 3,475,143 A | 10/1969 | O'Connor et al. |
| 3,476,600 A | 11/1969 | Morgan, Jr. et al. |
| 3,480,495 A | 11/1969 | Sohn et al. |
| 3,485,576 A | 12/1969 | McRae et al. |
| 3,496,091 A | 2/1970 | McGriff et al. |
| 3,496,453 A | 2/1970 | Swain |
| 3,502,429 A | 3/1970 | Sanders |
| 3,515,513 A | 6/1970 | Parsi |
| 3,518,174 A | 6/1970 | Inoue |
| 3,520,803 A | 7/1970 | Iaconelli |
| 3,523,755 A | 8/1970 | McRae |
| 3,523,880 A | 8/1970 | Parsi |
| 3,524,801 A | 8/1970 | Parsi |
| 3,525,682 A | 8/1970 | McRae et al. |
| 3,542,205 A | 11/1970 | O'Cheskey |
| 3,547,801 A | 12/1970 | Paine |
| 3,554,895 A | 1/1971 | McRae et al. |
| 3,558,279 A | 1/1971 | McRae et al. |
| 3,562,139 A | 2/1971 | Leitz |
| 3,567,864 A | 3/1971 | Palmer et al. |
| 3,589,999 A | 6/1971 | McRae et al. |
| 3,607,417 A | 9/1971 | McRae et al. |
| 3,607,706 A | 9/1971 | Eisenmann et al. |
| 3,608,610 A | 9/1971 | Greatorex et al. |
| 3,616,312 A | 10/1971 | McGriff et al. |
| 3,621,173 A | 11/1971 | O'Cheskey |
| 3,627,133 A | 12/1971 | Rak |
| 3,643,806 A | 2/1972 | O'Cheskey |
| 3,645,882 A | 2/1972 | Parsi |
| 3,645,884 A | 2/1972 | Gilliland |
| 3,654,103 A | 4/1972 | McRae |
| 3,654,125 A | 4/1972 | Leitz et al. |
| 3,657,104 A | 4/1972 | Hodgdon, Jr. |
| 3,661,647 A | 5/1972 | Owens et al. |
| 3,661,762 A | 5/1972 | Parsi |
| 3,663,299 A | 5/1972 | Owens et al. |
| 3,664,832 A | 5/1972 | Paton |
| 3,669,857 A | 6/1972 | Kirkham et al. |
| 3,672,841 A | 6/1972 | Freeman, Jr. et al. |
| 3,675,041 A | 7/1972 | Elliott et al. |
| 3,695,444 A | 10/1972 | Iaconelli |
| 3,695,446 A | 10/1972 | Lyall et al. |
| 3,700,934 A | 10/1972 | Swain |
| 3,701,360 A | 10/1972 | Morrison |
| 3,717,256 A | 2/1973 | Parrott et al. |
| 3,720,329 A | 3/1973 | Gamble |
| 3,738,812 A | 6/1973 | Berry et al. |
| RE27,701 E | 7/1973 | Allan, Jr. et al. |
| 3,749,655 A | 7/1973 | Hodgdon, Jr. |
| 3,765,035 A | 10/1973 | Mutchler |
| 3,765,225 A | 10/1973 | Rivers |
| 3,766,712 A | 10/1973 | Schaltenbrand |
| 3,772,189 A | 11/1973 | Kreusch et al. |
| 3,774,763 A | 11/1973 | Yall et al. |
| 3,774,802 A | 11/1973 | O'Cheskey |
| 3,775,135 A | 11/1973 | Harper |
| 3,785,954 A | 1/1974 | Herbert |
| 3,787,339 A | 1/1974 | Hodgdon, Jr. et al. |
| 3,794,460 A | 2/1974 | Kirk |
| 3,805,833 A | 4/1974 | Teed |
| 3,814,688 A | 6/1974 | Hirs |
| 3,817,703 A | 6/1974 | Atwood |
| 3,826,614 A | 7/1974 | Capuano |
| 3,826,618 A | 7/1974 | Capuano |
| 3,827,564 A | 8/1974 | Rak |
| 3,840,341 A | 10/1974 | Rogers |
| 3,843,523 A | 10/1974 | Dresen et al. |
| 3,847,765 A | 11/1974 | Uno et al. |
| 3,850,797 A | 11/1974 | Lyall |
| B408,749 I5 | 1/1975 | Westlin |
| 3,869,376 A | 3/1975 | Tejeda |
| 3,883,383 A | 5/1975 | Leitz, Jr. |
| 3,887,499 A | 6/1975 | Hodgdon, Jr. |
| 3,896,015 A | 7/1975 | McRae |
| 3,926,071 A | 12/1975 | Elliott |
| 3,926,864 A | 12/1975 | Hodgdon, Jr. |
| 3,954,592 A | 5/1976 | Horvath |
| 3,958,960 A | 5/1976 | Bakke |
| 3,958,961 A | 5/1976 | Bakke |
| 3,964,985 A | 6/1976 | Giuffrida |
| 3,972,815 A | 8/1976 | O'Cheskey et al. |
| 3,975,567 A | 8/1976 | Lock |
| 3,978,266 A | 8/1976 | Lock |
| 3,978,855 A | 9/1976 | McRae et al. |
| 3,993,517 A | 11/1976 | Schneider |
| 3,997,927 A | 12/1976 | Culligan |
| 4,012,310 A | 3/1977 | Clark et al. |
| 4,024,043 A | 5/1977 | Dege et al. |
| 4,031,918 A | 6/1977 | Cagle et al. |
| 4,032,452 A | 6/1977 | Davis |
| 4,057,483 A | 11/1977 | Giuffrida |
| 4,062,756 A | 12/1977 | Jha et al. |
| 4,067,794 A | 1/1978 | Ganzi et al. |
| 4,073,632 A | 2/1978 | Reinauer et al. |
| 4,074,983 A | 2/1978 | Bakke |
| D248,157 S | 6/1978 | Ganzi et al. |
| 4,107,015 A | 8/1978 | Chlanda et al. |
| 4,110,265 A | 8/1978 | Hodgdon |
| 4,115,225 A | 9/1978 | Parsi |
| 4,124,478 A | 11/1978 | Tsien et al. |
| 4,133,641 A | 1/1979 | Lueck |
| 4,140,591 A | 2/1979 | Fong et al. |
| 4,146,455 A | 3/1979 | McRae |
| 4,148,708 A | 4/1979 | Grant |
| 4,173,524 A | 11/1979 | McRae |
| 4,180,451 A | 12/1979 | McRae |
| 4,183,399 A | 1/1980 | Seehausen |
| 4,191,811 A | 3/1980 | Hodgdon |
| 4,202,772 A | 5/1980 | Goldstein |
| 4,216,073 A | 8/1980 | Goldstein |
| 4,217,186 A | 8/1980 | McRae |
| 4,225,412 A | 9/1980 | Reiss |
| 4,230,544 A | 10/1980 | McRae |
| 4,231,855 A | 11/1980 | Hodgdon et al. |
| 4,242,185 A | 12/1980 | McRae |
| 4,255,012 A | 3/1981 | Parent et al. |
| 4,257,887 A | 3/1981 | Rak et al. |
| 4,270,935 A | 6/1981 | Reinauer |
| 4,275,227 A | 6/1981 | MacDonald |
| 4,276,140 A | 6/1981 | Jain |
| 4,284,492 A | 8/1981 | Karn |
| 4,298,442 A | 11/1981 | Giuffrida |
| 4,299,677 A | 11/1981 | Venkatasubramanian et al. |
| 4,299,698 A | 11/1981 | Rak et al. |
| 4,310,631 A | 1/1982 | MacDonald |
| 4,316,125 A | 2/1982 | Noguchi |
| 4,321,192 A | 3/1982 | Jain |
| 4,322,275 A | 3/1982 | Jain |
| 4,332,680 A | 6/1982 | O'Cheskey |
| 4,344,781 A | 8/1982 | Higgins et al. |
| 4,351,710 A | 9/1982 | Jain |
| 4,372,821 A | 2/1983 | Reinauer |
| 4,373,031 A | 2/1983 | Waite |
| 4,374,206 A | 2/1983 | MacDonald et al. |
| 4,374,720 A | 2/1983 | MacDonald |
| 4,381,232 A | 4/1983 | Brown |
| 4,391,680 A | 7/1983 | Mani et al. |
| 4,396,477 A | 8/1983 | Jain |
| 4,426,323 A | 1/1984 | Jain |
| 4,435,318 A | 3/1984 | Pabst et al. |
| 4,441,978 A | 4/1984 | Jain |
| 4,446,352 A | 5/1984 | O'Cheskey et al. |
| 4,461,693 A | 7/1984 | Jain |
| 4,461,945 A | 7/1984 | O'Cheskey et al. |

(56) References Cited

U.S. PATENT DOCUMENTS

| | | |
|---|---|---|
| 4,463,064 A | 7/1984 | Ruch et al. |
| 4,465,573 A | 8/1984 | O'Hare |
| 4,504,373 A | 3/1985 | Mani et al. |
| 4,505,797 A | 3/1985 | Hodgdon et al. |
| 4,528,173 A | 7/1985 | Seamans |
| 4,534,867 A | 8/1985 | Kreusch et al. |
| 4,536,845 A | 8/1985 | DeVale et al. |
| 4,551,209 A | 11/1985 | Lauks |
| 4,584,075 A | 4/1986 | Goldstein et al. |
| 4,587,269 A | 5/1986 | Thomas, Jr. |
| 4,592,817 A | 6/1986 | Chlanda et al. |
| 4,594,135 A | 6/1986 | Goldstein |
| 4,606,943 A | 8/1986 | Rak et al. |
| 4,608,140 A | 8/1986 | Goldstein |
| 4,609,007 A | 9/1986 | Uhl et al. |
| 4,613,422 A | 9/1986 | Lauks |
| 4,614,576 A | 9/1986 | Goldstein |
| 4,617,321 A | 10/1986 | MacDonald |
| 4,622,123 A | 11/1986 | Nejame, Jr. |
| 4,629,424 A | 12/1986 | Lauks et al. |
| 4,636,289 A | 1/1987 | Mani et al. |
| 4,643,814 A | 2/1987 | Goldstein |
| 4,645,625 A | 2/1987 | Lundstrom |
| 4,661,224 A | 4/1987 | Goldstein et al. |
| 4,661,896 A | 4/1987 | Kobayashi et al. |
| 4,663,144 A | 5/1987 | McQuillan et al. |
| 4,668,402 A | 5/1987 | Norton |
| 4,671,863 A | 6/1987 | Tejeda |
| 4,673,483 A | 6/1987 | Mandle |
| 4,678,553 A | 7/1987 | Mandle et al. |
| 4,678,565 A | 7/1987 | Norton |
| 4,707,240 A | 11/1987 | Parsi et al. |
| 4,731,049 A | 3/1988 | Parsi |
| 4,735,717 A | 4/1988 | Sims |
| 4,739,380 A | 4/1988 | Lauks et al. |
| 4,750,983 A | 6/1988 | Foster et al. |
| 4,760,328 A | 7/1988 | Groves |
| 4,764,315 A | 8/1988 | Brusa |
| 4,769,135 A | 9/1988 | Norton |
| 4,775,703 A | 10/1988 | Susa |
| 4,781,809 A | 11/1988 | Falcone, Jr. |
| 4,795,537 A | 1/1989 | Timewell |
| 4,802,984 A | 2/1989 | Waite |
| 4,804,451 A | 2/1989 | Palmer |
| 4,806,291 A | 2/1989 | Susa |
| 4,822,471 A | 4/1989 | MacDonald |
| 4,838,312 A | 6/1989 | Berchem et al. |
| 4,851,100 A | 7/1989 | Hodgdon et al. |
| 4,864,229 A | 9/1989 | Lauks et al. |
| 4,871,431 A | 10/1989 | Parsi |
| 4,888,098 A | 12/1989 | Nyberg et al. |
| 4,900,450 A | 2/1990 | Schmidt |
| 4,913,816 A | 4/1990 | Waite |
| 4,925,541 A | 5/1990 | Giuffrida et al. |
| 4,940,667 A | 7/1990 | Goldstein et al. |
| 4,969,983 A | 11/1990 | Parsi |
| 4,970,003 A | 11/1990 | Rak |
| 4,977,094 A | 12/1990 | Goldstein et al. |
| 4,980,056 A | 12/1990 | Norton |
| D313,330 S | 1/1991 | Brusa |
| 4,990,230 A | 2/1991 | Voss et al. |
| 5,006,211 A | 4/1991 | Paleologou et al. |
| 5,007,989 A | 4/1991 | Nyberg et al. |
| 5,019,235 A | 5/1991 | Nyberg et al. |
| 5,026,465 A | 6/1991 | Katz et al. |
| 5,034,124 A | 7/1991 | Kopf |
| 5,037,858 A | 8/1991 | MacDonald |
| 5,045,171 A | 9/1991 | MacDonald |
| 5,045,198 A | 9/1991 | Norton |
| 5,055,170 A | 10/1991 | Saito |
| 5,056,996 A | 10/1991 | Papastavros et al. |
| 5,061,372 A | 10/1991 | Rak |
| 5,066,375 A | 11/1991 | Parsi et al. |
| 5,066,393 A | 11/1991 | Padera et al. |
| 5,073,255 A | 12/1991 | Chili et al. |
| 5,075,011 A | 12/1991 | Waite |
| 5,089,192 A | 2/1992 | Costa |
| D325,740 S | 4/1992 | Loftis |
| 5,102,547 A | 4/1992 | Waite et al. |
| 5,118,424 A | 6/1992 | McRae |
| 5,118,717 A | 6/1992 | Hodgdon et al. |
| 5,120,416 A | 6/1992 | Parsi et al. |
| 5,127,427 A | 7/1992 | Kajpust et al. |
| 5,137,925 A | 8/1992 | Hodgdon |
| 5,141,717 A | 8/1992 | McRae |
| 5,145,618 A | 9/1992 | MacDonald et al. |
| 5,147,553 A | 9/1992 | Waite |
| 5,152,901 A | 10/1992 | Hodgdon |
| 5,160,608 A | 11/1992 | Norton |
| 5,162,649 A | 11/1992 | Burke |
| 5,194,189 A | 3/1993 | Papastavros et al. |
| 5,203,976 A | 4/1993 | Parsi et al. |
| 5,203,982 A | 4/1993 | MacDonald |
| 5,221,455 A | 6/1993 | Hanada et al. |
| 5,227,052 A | 7/1993 | Ilves |
| 5,228,962 A | 7/1993 | Mani et al. |
| 5,239,285 A | 8/1993 | Rak |
| 5,254,257 A | 10/1993 | Brigano et al. |
| 5,264,125 A | 11/1993 | MacDonald et al. |
| 5,273,070 A | 12/1993 | Chili et al. |
| 5,275,206 A | 1/1994 | Acker et al. |
| 5,281,317 A | 1/1994 | Mani et al. |
| 5,282,935 A | 2/1994 | Cawlfield et al. |
| 5,284,879 A | 2/1994 | Hodgdon et al. |
| 5,290,443 A | 3/1994 | Norton |
| 5,298,164 A | 3/1994 | Hapach et al. |
| 5,308,466 A | 5/1994 | Ganzi et al. |
| 5,322,604 A | 6/1994 | Cawlfield |
| 5,354,903 A | 10/1994 | MacDonald |
| 5,384,813 A | 1/1995 | Loftis et al. |
| 5,401,408 A | 3/1995 | Umemura et al. |
| 5,415,759 A | 5/1995 | Cawlfield et al. |
| 5,472,622 A | 12/1995 | Solomon et al. |
| 5,474,653 A | 12/1995 | Bostjancic |
| 5,478,488 A | 12/1995 | Doetsch et al. |
| 5,480,555 A | 1/1996 | Momber |
| 5,503,729 A | 4/1996 | Elyanow et al. |
| 5,510,394 A | 4/1996 | Hodgdon |
| 5,572,414 A | 11/1996 | Komori |
| 5,575,923 A | 11/1996 | Solomon et al. |
| 5,577,890 A | 11/1996 | Nielsen et al. |
| 5,585,003 A | 12/1996 | Van Newenhizen |
| 5,616,249 A | 4/1997 | Hodgdon |
| 5,656,161 A | 8/1997 | Solomon et al. |
| 5,658,459 A | 8/1997 | Guttormsen |
| 5,662,802 A | 9/1997 | Heins et al. |
| 5,665,239 A | 9/1997 | Katzakian, Jr. et al. |
| 5,667,686 A | 9/1997 | Schubert |
| 5,670,055 A | 9/1997 | Yu et al. |
| 5,679,228 A | 10/1997 | Elyanow et al. |
| 5,679,229 A | 10/1997 | McRae et al. |
| D387,656 S | 12/1997 | Liang |
| 5,693,227 A | 12/1997 | Costa |
| 5,699,272 A | 12/1997 | Zabinski |
| 5,702,582 A | 12/1997 | Goldstein et al. |
| D389,400 S | 1/1998 | Liang |
| 5,730,646 A | 3/1998 | Watkin |
| 5,738,170 A | 4/1998 | Lavernhe |
| 5,738,780 A | 4/1998 | Markham |
| D394,697 S | 5/1998 | Liang |
| 5,751,598 A | 5/1998 | Zabinski et al. |
| 5,759,412 A | 6/1998 | McDougald |
| 5,762,774 A | 6/1998 | Tessier |
| 5,766,488 A | 6/1998 | Uban et al. |
| 5,770,037 A | 6/1998 | Goto et al. |
| 5,788,826 A * | 8/1998 | Nyberg .................. 204/536 |
| 5,798,040 A | 8/1998 | Liang |
| D398,368 S | 9/1998 | Schroer |
| 5,800,705 A | 9/1998 | Downs |
| 5,814,197 A | 9/1998 | Batchelder et al. |
| 5,833,846 A | 11/1998 | Tanabe et al. |
| 5,833,867 A | 11/1998 | Hensley |
| 5,858,191 A | 1/1999 | DiMascio et al. |
| 5,863,438 A | 1/1999 | Katzakian, Jr. et al. |

(56) References Cited

U.S. PATENT DOCUMENTS

| | | | |
|---|---|---|---|
| 5,868,915 A | 2/1999 | Ganzi et al. |
| 5,881,809 A | 3/1999 | Gillespie et al. |
| 5,885,141 A | 3/1999 | Watkin |
| 5,885,458 A | 3/1999 | Wilcher et al. |
| 5,888,381 A | 3/1999 | Primdahl et al. |
| 5,891,328 A | 4/1999 | Goldstein |
| 5,895,570 A | 4/1999 | Liang |
| 5,897,757 A | 4/1999 | Sano |
| 5,906,436 A | 5/1999 | Cole et al. |
| 5,919,357 A | 7/1999 | Wilkins et al. |
| 5,922,209 A | 7/1999 | Yoshida et al. |
| 5,925,240 A | 7/1999 | Wilkins et al. |
| 5,931,194 A | 8/1999 | Raque et al. |
| 5,931,196 A | 8/1999 | Bernardi et al. |
| 5,934,971 A | 8/1999 | Thompson et al. |
| 5,948,230 A | 9/1999 | McRae |
| 5,957,669 A | 9/1999 | Parikh et al. |
| 5,958,213 A | 9/1999 | Goto |
| 5,979,551 A | 11/1999 | Uban et al. |
| 6,004,438 A | 12/1999 | Woodson |
| 6,009,136 A | 12/1999 | Loftis et al. |
| 6,019,892 A | 2/2000 | Wilcher |
| 6,027,645 A | 2/2000 | Biskner et al. |
| 6,030,529 A | 2/2000 | Biskner et al. |
| 6,032,821 A | 3/2000 | Martin et al. |
| 6,047,768 A | 4/2000 | Buehler, III |
| 6,051,131 A | 4/2000 | Maxson |
| 6,068,450 A | 5/2000 | Parikh et al. |
| 6,074,551 A | 6/2000 | Jones et al. |
| 6,076,543 A | 6/2000 | Johnson |
| 6,080,323 A | 6/2000 | Yu et al. |
| 6,086,757 A | 7/2000 | Wilcher |
| 6,093,329 A | 7/2000 | McDougald |
| 6,103,078 A | 8/2000 | Hitchems et al. |
| 6,105,598 A | 8/2000 | Cabrera et al. |
| 6,109,778 A | 8/2000 | Wilmer |
| 6,110,342 A | 8/2000 | Mani |
| 6,110,385 A | 8/2000 | Copa et al. |
| 6,117,297 A | 9/2000 | Goldstein |
| 6,126,516 A | 10/2000 | Barrier et al. |
| 6,126,796 A | 10/2000 | Simamune et al. |
| 6,126,805 A | 10/2000 | Batchelder et al. |
| 6,132,176 A | 10/2000 | Higgins |
| 6,139,714 A | 10/2000 | Livshits |
| 6,143,184 A | 11/2000 | Martin et al. |
| 6,146,538 A | 11/2000 | Martin |
| 6,149,819 A | 11/2000 | Martin et al. |
| 6,153,105 A | 11/2000 | Tadlock et al. |
| 6,176,258 B1 | 1/2001 | Bernardi |
| 6,180,002 B1 | 1/2001 | Higgins |
| 6,190,564 B1 | 2/2001 | Lehmann et al. |
| 6,206,091 B1 | 3/2001 | Buehler |
| 6,206,200 B1 | 3/2001 | Gilles et al. |
| 6,217,729 B1 | 4/2001 | Zolotarsky et al. |
| 6,221,248 B1 | 4/2001 | Lin et al. |
| 6,244,574 B1 | 6/2001 | Downs |
| 6,263,900 B1 | 7/2001 | Cabrera et al. |
| 6,267,855 B1 | 7/2001 | Watanabe et al. |
| 6,270,671 B1 | 8/2001 | Shorr et al. |
| 6,273,937 B1 | 8/2001 | Schucker |
| 6,280,601 B1 | 8/2001 | Doring |
| 6,284,124 B1 | 9/2001 | DiMascio et al. |
| 6,293,975 B1 | 9/2001 | Scalliet et al. |
| 6,305,555 B1 | 10/2001 | Wilcher |
| 6,309,521 B1 | 10/2001 | Andrews et al. |
| 6,312,577 B1 | 11/2001 | Ganzi et al. |
| 6,315,886 B1 | 11/2001 | Zappi et al. |
| 6,315,906 B1 | 11/2001 | Sassaman, Jr. et al. |
| 6,328,896 B1 | 12/2001 | Atnoor et al. |
| 6,337,014 B1 | 1/2002 | Regunathan et al. |
| 6,342,163 B1 | 1/2002 | DeLonge et al. |
| 6,343,752 B1 | 2/2002 | Sleasman et al. |
| 6,344,584 B2 | 2/2002 | Lin et al. |
| 6,354,819 B1 | 3/2002 | Parikh et al. |
| 6,355,157 B1 | 3/2002 | Martin |
| 6,358,421 B1 | 3/2002 | Newenhizen et al. |
| 6,373,680 B1 | 4/2002 | Riskin |
| 6,375,851 B1 | 4/2002 | Sterling et al. |
| D456,876 S | 5/2002 | Zellinger et al. |
| 6,383,389 B1 | 5/2002 | Pilgram et al. |
| 6,391,148 B2 | 5/2002 | Marks et al. |
| 6,398,965 B1 | 6/2002 | Arba et al. |
| 6,409,926 B1 | 6/2002 | Martin |
| 6,410,672 B1 | 6/2002 | MacDonald et al. |
| 6,419,817 B1 | 7/2002 | Martin |
| 6,419,823 B2 | 7/2002 | DeLonge et al. |
| 6,423,234 B1 | 7/2002 | Martin |
| 6,428,677 B1 | 8/2002 | Bonnick et al. |
| 6,434,024 B2 | 8/2002 | Shirato |
| 6,440,310 B1 | 8/2002 | Shorr et al. |
| 6,457,698 B2 | 10/2002 | Wichmann |
| 6,464,211 B1 | 10/2002 | Downs |
| 6,468,412 B2 | 10/2002 | Bryan et al. |
| 6,472,223 B1 | 10/2002 | Stannard et al. |
| 6,482,305 B1 | 11/2002 | Mani |
| 6,485,641 B1 | 11/2002 | McLeod |
| 6,491,181 B1 | 12/2002 | Martin et al. |
| 6,497,817 B1 | 12/2002 | Liang |
| 6,510,959 B1 | 1/2003 | Van Newenhizen |
| 6,514,398 B2 | 2/2003 | DiMascio et al. |
| 6,524,469 B1 | 2/2003 | Schucker |
| 6,536,606 B2 | 3/2003 | Schneider et al. |
| 6,546,685 B2 | 4/2003 | Nordland et al. |
| 6,568,282 B1 | 5/2003 | Ganzi |
| 6,572,758 B2 | 6/2003 | Zolotarsky et al. |
| 6,575,195 B2 | 6/2003 | Wichmann |
| 6,579,450 B2 | 6/2003 | Wilcher |
| 6,582,605 B2 | 6/2003 | Krulik et al. |
| 6,592,762 B2 | 7/2003 | Smith |
| 6,607,175 B1 | 8/2003 | Nguyen et al. |
| 6,607,647 B2 | 8/2003 | Wilkins et al. |
| 6,613,230 B2 | 9/2003 | Krulik et al. |
| 6,620,315 B2 | 9/2003 | Martin |
| 6,623,647 B2 | 9/2003 | Martin |
| 6,638,413 B1 | 10/2003 | Weinberg et al. |
| 6,645,385 B2 | 11/2003 | Krulik et al. |
| 6,645,400 B2 | 11/2003 | Martin |
| 6,649,037 B2 | 11/2003 | Liang et al. |
| 6,652,758 B2 | 11/2003 | Krulik |
| 6,659,113 B2 | 12/2003 | Wilcher |
| 6,660,307 B2 | 12/2003 | Zolotarsky et al. |
| 6,674,249 B1 | 1/2004 | Leskovec |
| 6,693,139 B2 | 2/2004 | Bachman et al. |
| 6,709,578 B2 | 3/2004 | Wilcher |
| 6,716,359 B1 | 4/2004 | Dennis, II |
| 6,723,246 B2 | 4/2004 | Krulik |
| 6,726,893 B2 | 4/2004 | Lee et al. |
| 6,733,636 B1 | 5/2004 | Heins |
| 6,736,275 B2 | 5/2004 | Schneider et al. |
| 6,740,235 B2 | 5/2004 | Gill |
| 6,763,846 B2 | 7/2004 | Haruch |
| 6,776,926 B2 | 8/2004 | Martin |
| 6,790,362 B2 | 9/2004 | FitzGerald et al. |
| 6,796,436 B2 | 9/2004 | Carson et al. |
| 6,797,134 B2 | 9/2004 | Weinberg et al. |
| 6,800,208 B2 | 10/2004 | Bolman |
| 6,824,662 B2 * | 11/2004 | Liang et al. .......... 204/524 |
| 6,830,683 B2 | 12/2004 | Gundrum et al. |
| 6,830,689 B2 | 12/2004 | Hong et al. |
| 6,887,452 B1 | 5/2005 | Pecoraro et al. |
| 6,994,785 B2 | 2/2006 | Wilcher |
| 7,001,516 B2 | 2/2006 | Hong et al. |
| 7,014,754 B2 | 3/2006 | Wilcher |
| 7,077,201 B2 | 7/2006 | Heins |
| 7,087,211 B2 | 8/2006 | Balachandran et al. |
| 7,087,654 B2 | 8/2006 | MacDonald et al. |
| 7,094,325 B2 | 8/2006 | Mack et al. |
| 7,344,629 B2 * | 3/2008 | Holmes et al. .......... 204/536 |
| 2001/0035218 A1 | 11/2001 | Ibanez Sapina |
| 2002/0172871 A1 | 11/2002 | Schucker |
| 2003/0019790 A1 | 1/2003 | Schucker |
| 2003/0019818 A1 | 1/2003 | Carson et al. |
| 2003/0041908 A1 | 3/2003 | Scanlan et al. |
| 2003/0116430 A1 | 6/2003 | Kurokawa et al. |

(56) References Cited

U.S. PATENT DOCUMENTS

| | | |
|---|---|---|
| 2004/0005719 A2 | 1/2004 | Godec et al. |
| 2004/0027100 A1 | 2/2004 | Xu et al. |
| 2004/0108277 A1 | 6/2004 | Krulik |
| 2005/0022989 A1 | 2/2005 | Heins |
| 2005/0029124 A1 | 2/2005 | Holmes et al. |
| 2005/0109703 A1 | 5/2005 | Newenhizen |
| 2005/0145545 A1 | 7/2005 | Schucker |
| 2005/0279500 A1 | 12/2005 | Heins |
| 2006/0016685 A1 | 1/2006 | Hawkins et al. |
| 2006/0032630 A1 | 2/2006 | Heins |
| 2006/0137986 A1 | 6/2006 | Holmes et al. |
| 2006/0138997 A1 | 6/2006 | Holmes et al. |
| 2006/0169586 A1 | 8/2006 | Zhang et al. |
| 2006/0186334 A1 | 8/2006 | Jolliffe et al. |
| 2007/0023290 A1 | 2/2007 | Hawkins et al. |

FOREIGN PATENT DOCUMENTS

| | | |
|---|---|---|
| CN | 1477065 A | 2/2004 |
| DE | 3730419 A1 | 3/1989 |
| DE | 3926642 A1 | 3/1990 |
| DE | 43 29 802 A1 | 3/1995 |
| DE | 200 13 926 U1 | 11/2000 |
| DE | 100 13 457 A1 | 9/2001 |
| DE | 102 17 885 A1 | 11/2003 |
| EP | 0 317 816 A1 | 5/1989 |
| EP | 0 537 526 A1 | 4/1993 |
| EP | 0 638 664 A1 | 2/1995 |
| EP | 0 642 824 | 3/1995 |
| EP | 1 075 868 | 2/2001 |
| EP | 1 150 050 A2 | 10/2001 |
| EP | 1 172 145 A | 1/2002 |
| FR | 2 803 284 A1 | 6/2001 |
| GB | 1 289 738 A | 9/1972 |
| GB | 1 551 538 | 8/1979 |
| JP | 49-023773 | 3/1974 |
| JP | 06-079278 | 3/1994 |
| JP | 07-136653 | 5/1995 |
| JP | 09-138207 | 5/1997 |
| JP | 10-085746 | 4/1998 |
| JP | 10-216723 | 8/1998 |
| JP | 11-226576 | 8/1999 |
| JP | 2000-202449 | 7/2000 |
| JP | 2001-259634 | 9/2001 |
| KR | 10-0379123 | 3/2003 |
| SU | 874090 A | 10/1981 |
| TW | 504720 | 10/2002 |
| WO | WO-93/20929 A1 | 10/1993 |
| WO | WO-97/30939 | 8/1997 |
| WO | WO-98/32525 | 7/1998 |
| WO | WO-99/28240 | 6/1999 |
| WO | WO-02/14224 A1 | 2/2002 |
| WO | WO-02/079098 | 10/2002 |
| WO | WO-03/020404 | 3/2003 |
| WO | WO-2005/009596 | 2/2005 |
| WO | WO-2005/016831 A1 | 2/2005 |
| WO | WO-2005/049205 | 6/2005 |
| WO | WO-2006/015034 A3 | 7/2006 |
| WO | WO-2006/071513 A3 | 7/2006 |
| WO | WO-2006/071533 A1 | 7/2006 |
| WO | WO-2007/044609 | 4/2007 |

* cited by examiner

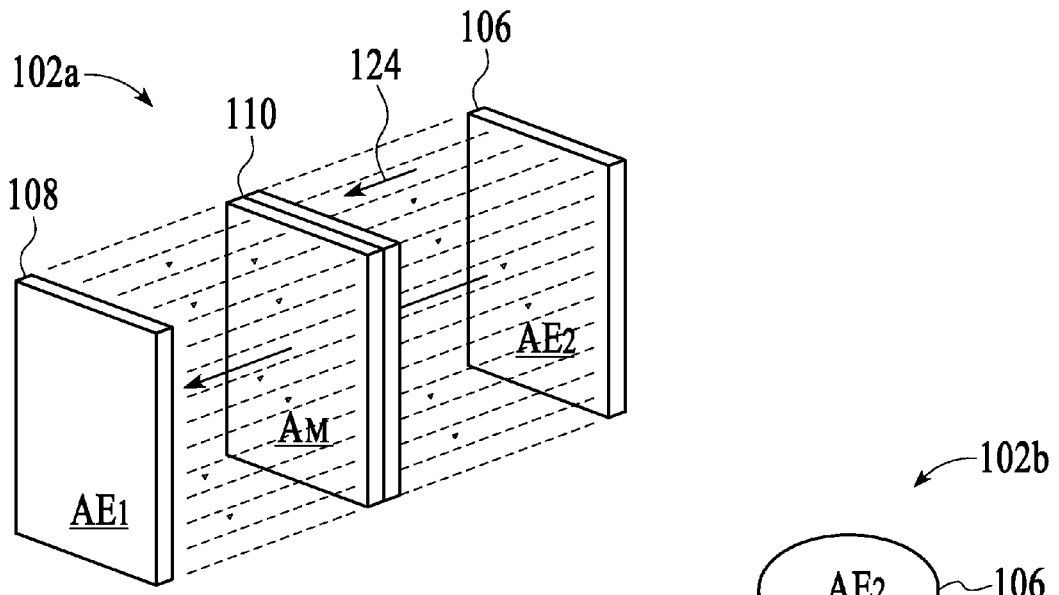
FIG.3A
FIG.3B
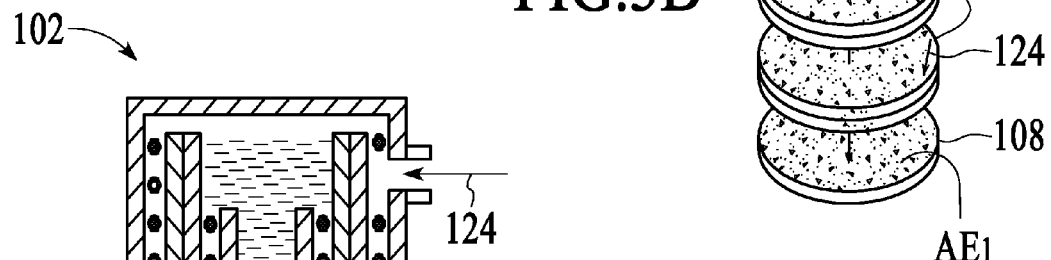
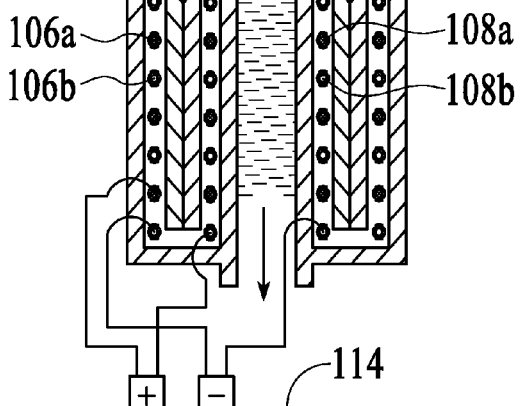
FIG.3C
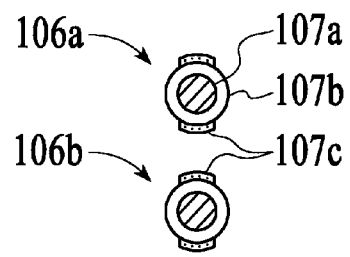
FIG.3C1

ELECTROCHEMICAL ION EXCHANGE TREATMENT OF FLUIDS

CROSS REFERENCE

The present application is a continuation of U.S. Provisional Application No. 60/724,456, filed on Oct. 6, 2005, and U.S. Provisional Application No. 60/831,703 filed on Jul. 17, 2006 both of which are incorporated by reference herein in their entireties.

BACKGROUND

Embodiments of the present invention relate to the treatment of fluids in electrochemical cells to control levels of ions, particulates, and microorganisms in the fluid, and to regenerate the cells.

Fluid treatment apparatuses comprising electrochemical ion exchange cells can be used to treat fluids to, for example, selectively exchange ions present in fluids, remove contaminants from drinking water, reduce total dissolved solids (TDS), treat industrial or hazardous waste fluids and desalinate salt water, amongst other uses. Electrochemical ion exchange cells have water-splitting, ion exchange membranes between facing electrodes in a cell. When a current is applied to the electrodes by a cell power supply, water is irreversibly dissociated into $H^+$ and $OH^-$ ions at the boundary between the cation and anion exchange layers of the membranes, causing cations and anions to be exchanged from the fluid stream passing through the cell. Electrochemical cells can be regenerated without using hazardous chemicals simply by reversing the applied electric potential while flushing the cell with a fluid. Also, to obtain continuous operation, two or more electrochemical cells can be connected to allow treatment of fluid in a cell while another cell is being regenerated. When the reverse electric potential is applied, the membranes are regenerated without the use of chemicals. The cell can also have a valve to control the flow of fluids during treatment and regeneration processes.

Electrochemical systems can be used to selectively control the level of ions in the treated fluid but typically do not remove sediment and particulates from the fluid stream. The solids typically found in fluids such as well water or even treated city water, include particulates and sediment, such as sand or dirt. City water can also contain lead or other heavy metal ions which should be removed. Industrial waste systems can also use reduction of particulate matter. In addition to the removal of ions from the fluid, it is desirable to also remove such particulates from the fluid stream. Fluids with high solids content can also clog up the membranes to limit their operational cycle and block orifices of the electrochemical cells.

Another problem is that hard water from wells or the city water supply can also contain dissolved compounds, such as for example calcium, magnesium or manganese compounds, and bicarbonate or sulfate salts. These salts can precipitate out in the cell and tubing during process cycles. For example, dissolved calcium carbonate compounds can precipitate out to accumulate on cell walls, tubing and membranes, requiring frequent replacement or cleaning of these components. Scale accumulation in the cartridges, cells or tubing increases fluid inlet pressure requirements and reduces flow rates through the cell. Dissolved calcium compounds that precipitate out during membrane regeneration also clog the membrane with scale or particulates to reduce cell performance.

In fluid treatment processes, it is also desirable to reduce the level of microorganisms, such as germs, microbes, and even viruses, which are present in the treated fluid stream. Failure to properly disinfect drinking water can have severe consequences. For example, cryptosporidium, a contaminant of drinking water, caused the sickness of over 400,000 people in Milwaukee, Wis. Such microbes can be present in the original fluid before treatment and/or be actually generated and added to the fluid stream during the fluid treatment process itself. Microorganisms present in the original fluid can be removed by conventional bacteriolysis, disinfection or sterilization of the fluid prior to fluid treatment by ion exchange. The microbial growth generated within the fluid treatment apparatus can also be reduced by periodic cleansing of the fluid treatment system. However, such cleanings are often ineffective because they only partially remove the organic bio-residues formed on the inner walls of the fluid treatment systems as many of the inner surfaces of the components of such systems are difficult to access. Also, scrubbing the inner surfaces of the apparatus to completely remove the strongly adhered film, can result in scratches to which later formed biofilms are even more strongly adhered, and consequently all the more difficult to remove.

Conventional membrane regeneration processes can also take too much time to perform and use excessive fluid or electrical power for regeneration. Reducing the time it takes to regenerate a membrane allows the cell to be used for a larger number of process cycles per unit time. Minimizing the power required to regenerate membranes both reduces energy costs and minimizes scale formation which is typically promoted by temperature gradients. In water filtration applications, excessive waste fluid volume during regeneration further adds to operational costs. In industrial applications, the fluid used to regenerate the membranes may be expensive, difficult to procure or hazardous—particularly in chemical filtration systems, and thus, difficult to dispose of under prevalent environmental regulations. Thus, it is desirable to optimize membrane regeneration processes to reduce regeneration time, and fluid and energy consumption.

Other problems arise in treating fluids for drinking water applications. During the regeneration cycle, water is passed through the cell to remove ions and flush out residual solids. However, a small portion of the regeneration water stream may become entrapped in the cell after the regeneration process is completed. When the user subsequently turns on the cell for the first time, the cell discharges the residual entrapped fluid which may have sediments, be colored or have an undesirable taste. The same problem arises when the orifice is shut off when the cell is not in use, which can cause the residual fluid in the cell to become ionized with ions permeating out of the cell and into the stagnant cell water; thus, losing the benefit of the treatment process. Also, variations in quality of the fluid passed through the cell can affect both treatment and regeneration cycles. The ion composition, hardness, pH, pressure and other water source characteristics in city water supplies often varies during the day or from one city to another. Higher ambient water temperatures can alter the treatment and regeneration properties of the heated or cooled water. Furthermore, when normal cell electrode power levels are applied to hot input fluid streams, the output fluid can have excessively high temperatures. Variability in the amount of hard calcium salts in the input water can also cause undesirable fluctuations in fluid treatment and regeneration.

It is desirable to have a fluid treatment apparatus comprising an electrochemical cell which can efficiently treat fluids to control the level of ions in the fluid, remove sediments and particulates, and treat fluids that vary in ion content or type, hardness, pH, temperature and pressure. It is further desirable to be able to regenerate membranes faster, more thoroughly, and with reduced fluid consumption and electrical power usage. It is further desirable to deactivate and prevent reproduction of, remove, or reduce the levels of microorganisms in the fluid.

DRAWINGS

The features, aspects and advantages of the systems, apparatus and methods described herein will become better understood with regard to the following description, drawings, and appended claims, all of which provide illustrative examples of the systems, apparatus and methods. However, it is to be understood that each of the features described herein can be used by themselves or in any selective combination, not merely in the context of any particular drawings or any particularly described combination of features, where:

FIG. 3A is a schematic perspective exploded view of an embodiment of an electrochemical cell comprising electrodes about a membrane showing application of an electric field perpendicular to the membrane to obtain an electric potential drop across the membrane;

FIG. 3B is a schematic perspective exploded view of an embodiment of an electrochemical cell comprising circular membranes and electrodes;

FIG. 3C is a schematic sectional view of an embodiment of an electrochemical cell comprises two inner electrodes and two outer electrodes;

Figure 1:
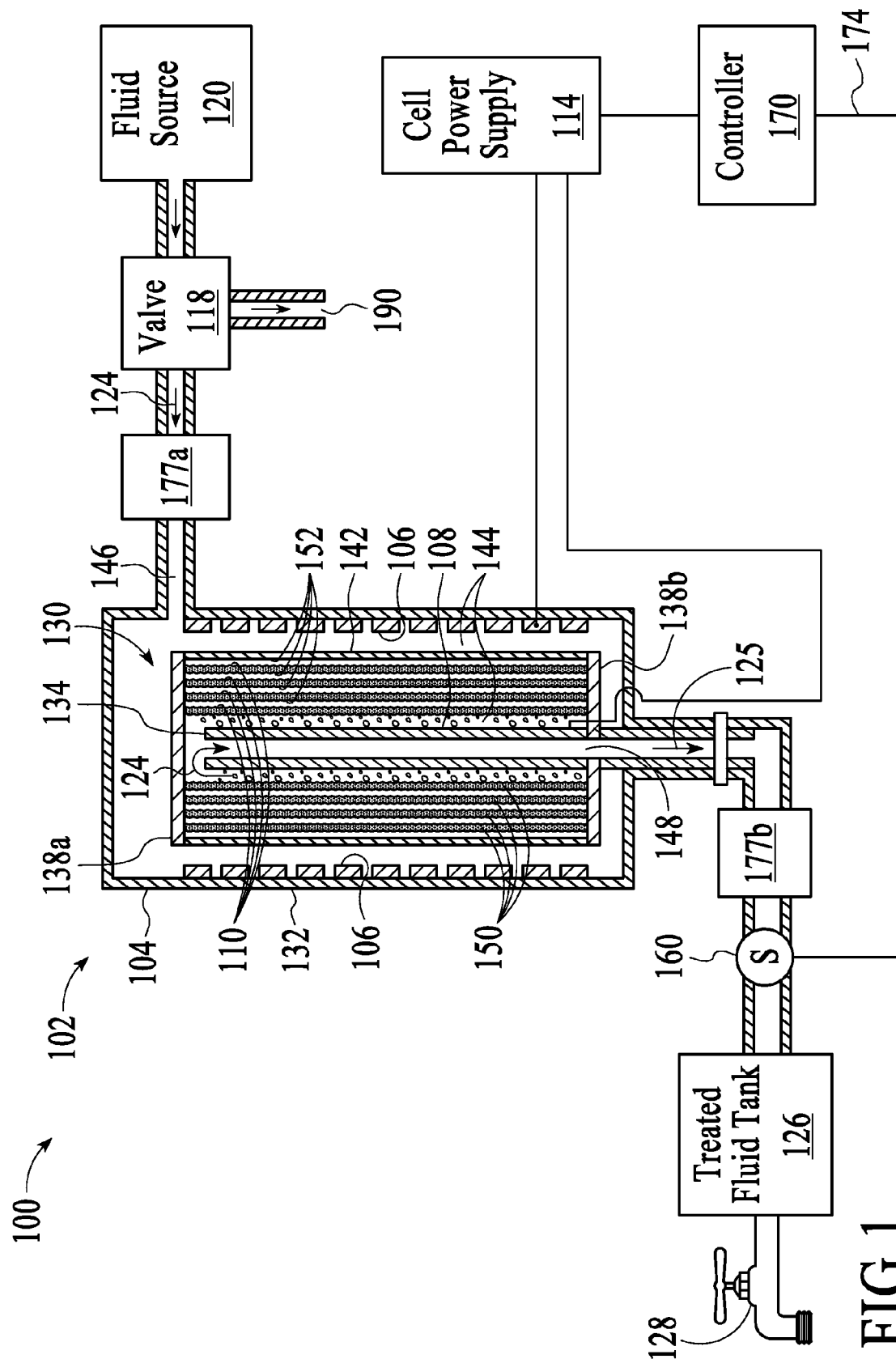
FIG. 1 is a schematic view of an embodiment of a fluid treatment apparatus comprising an electrochemical cell having electrodes positioned about membranes.
Figure 2A:
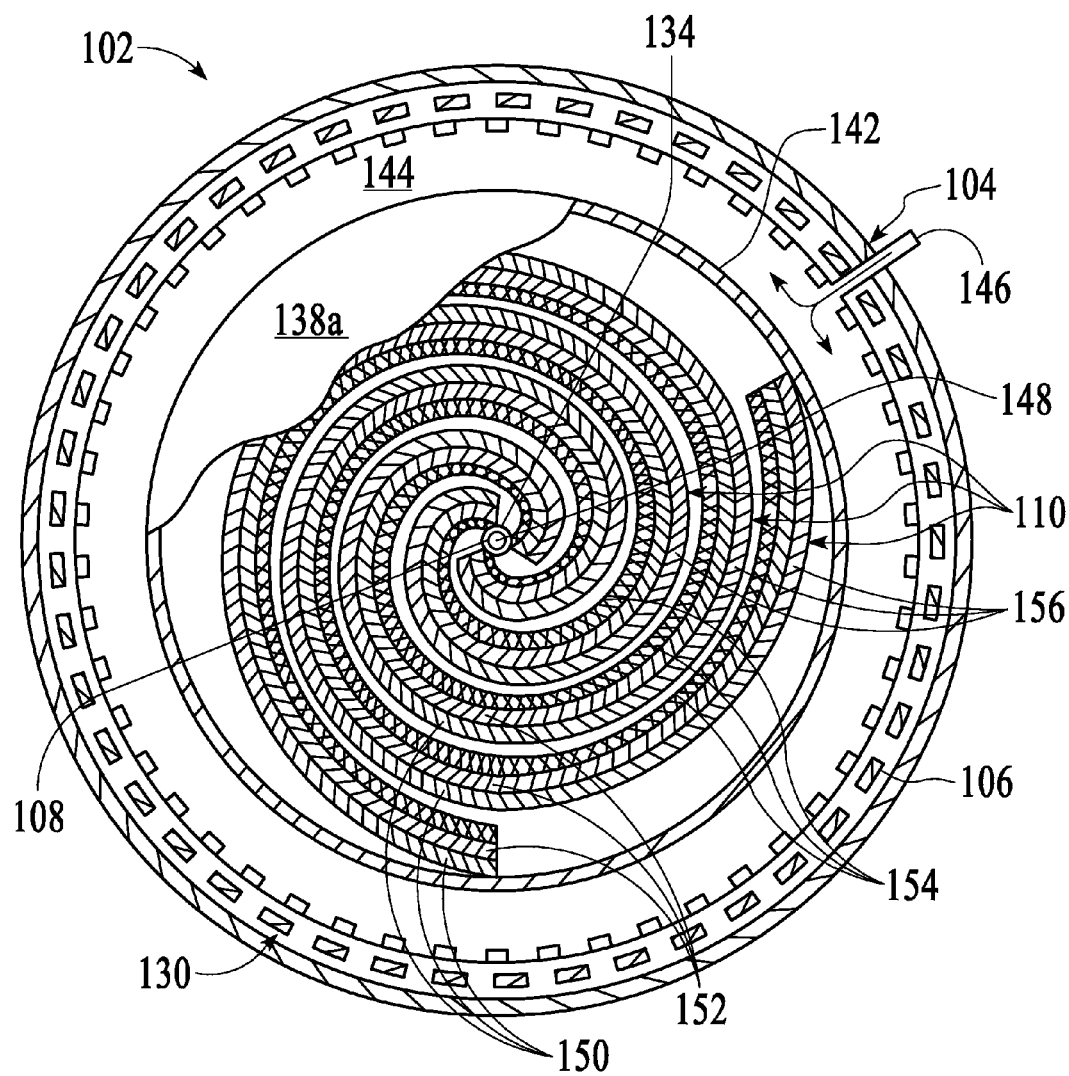
FIG. 2A is a schematic sectional top view of the electrochemical cell of FIG. 1 showing a cartridge having membranes with integral spacers that are spirally wound around a core tube.
Figure 2B:
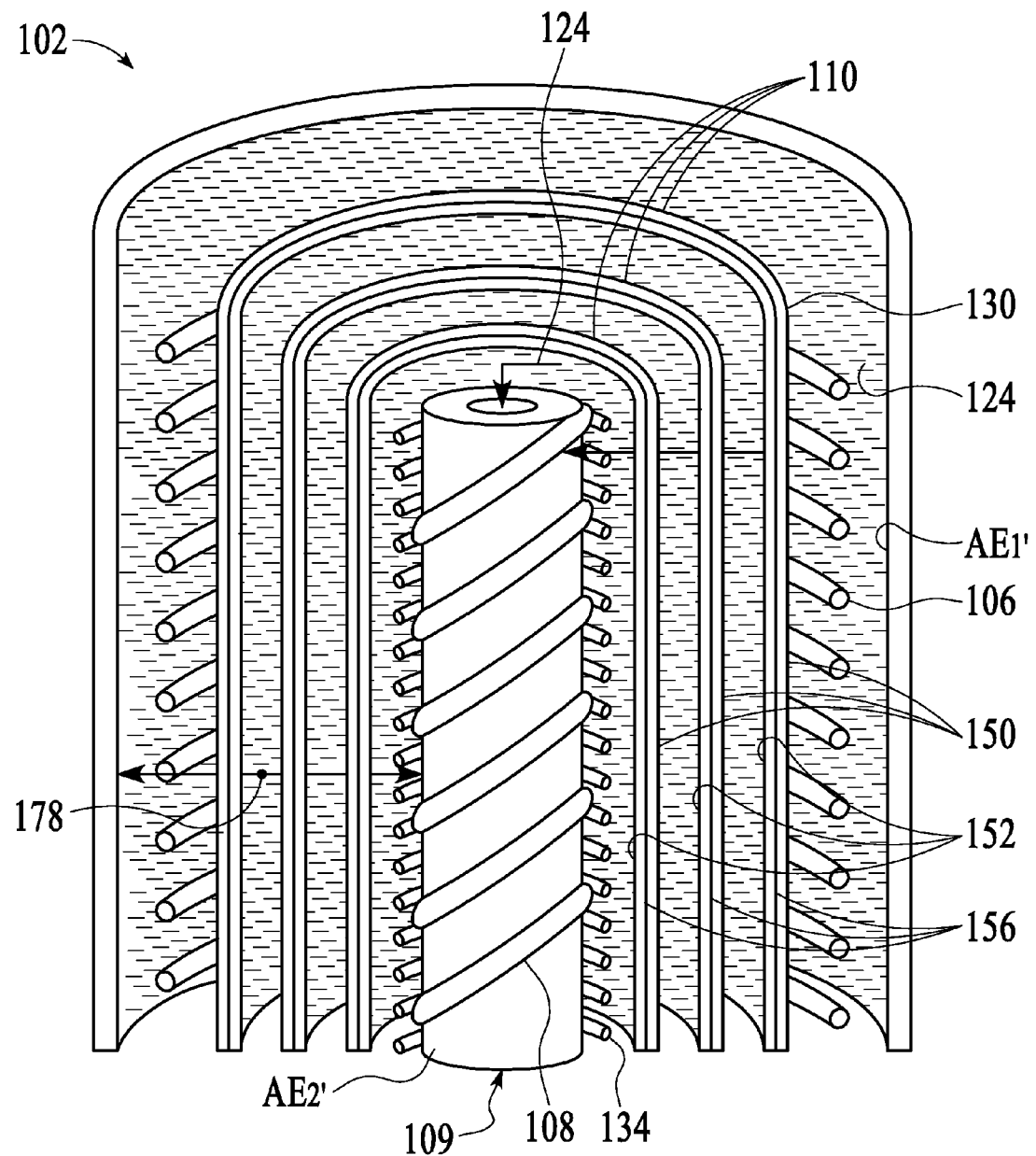
FIG. 2B is a schematic perspective exploded view of an embodiment of an electrochemical cell having membranes wrapped around tubular electrodes which can apply an electric potential in the cell to deactivate microorganisms in the fluid stream as they pass across or through the membranes.
Figure 4A:
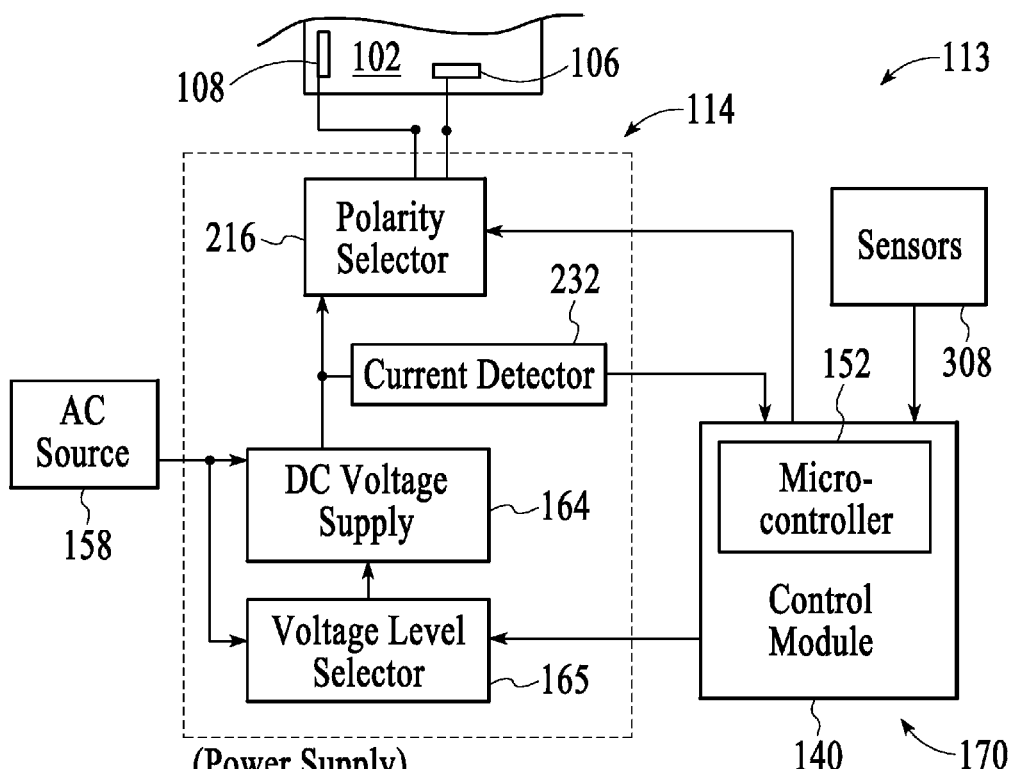
Figure 4B:
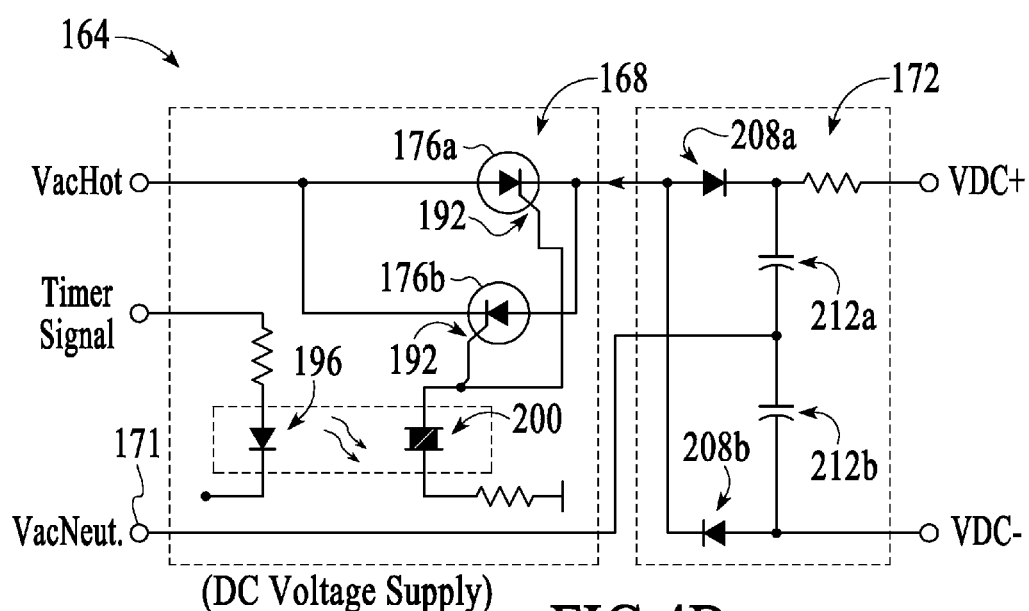
Figure 5:
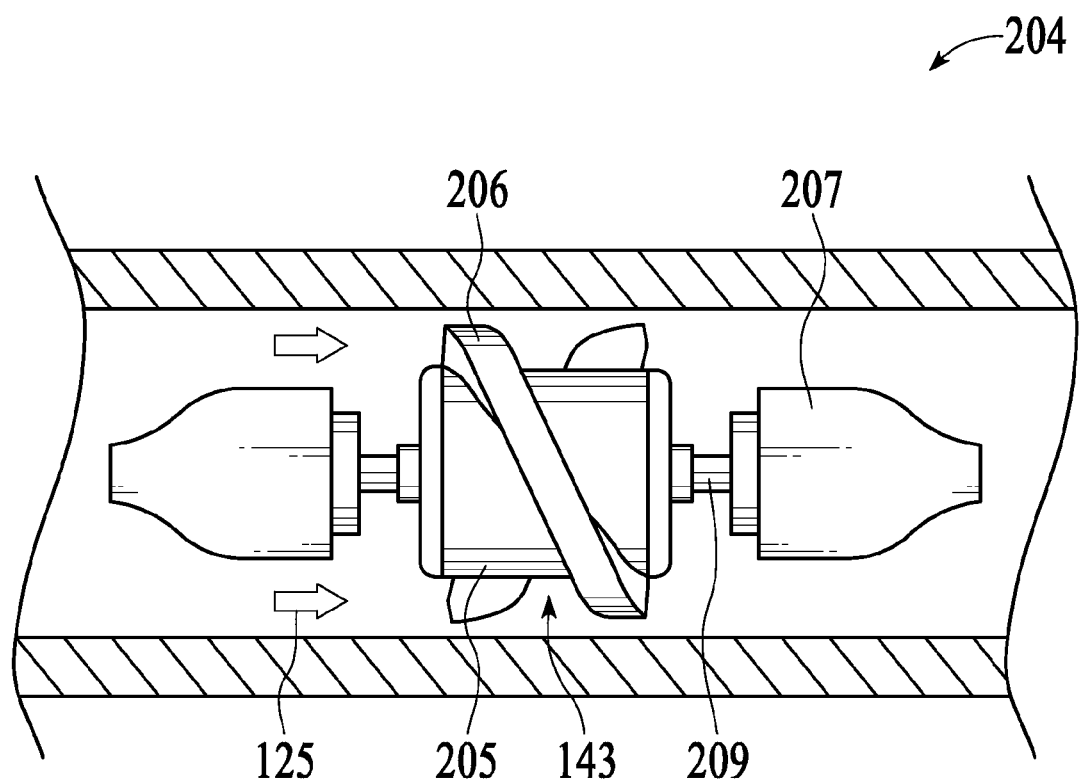
Figure 6:
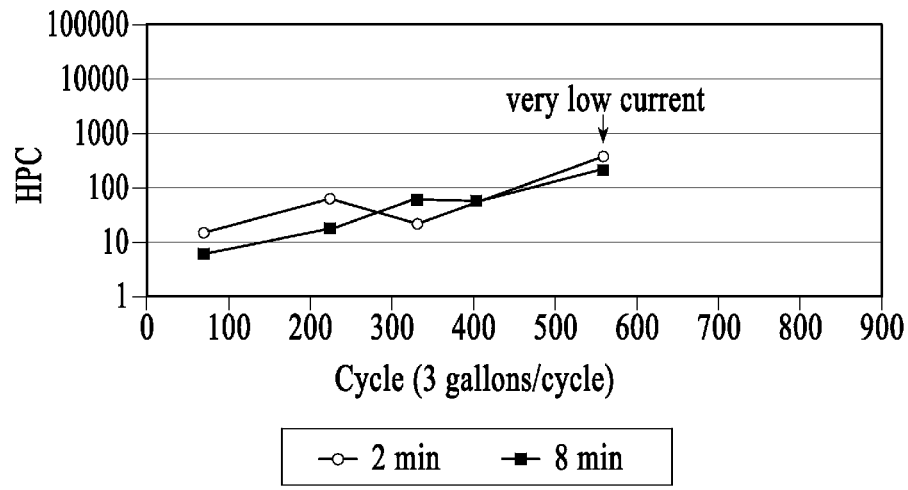
Figure 7:
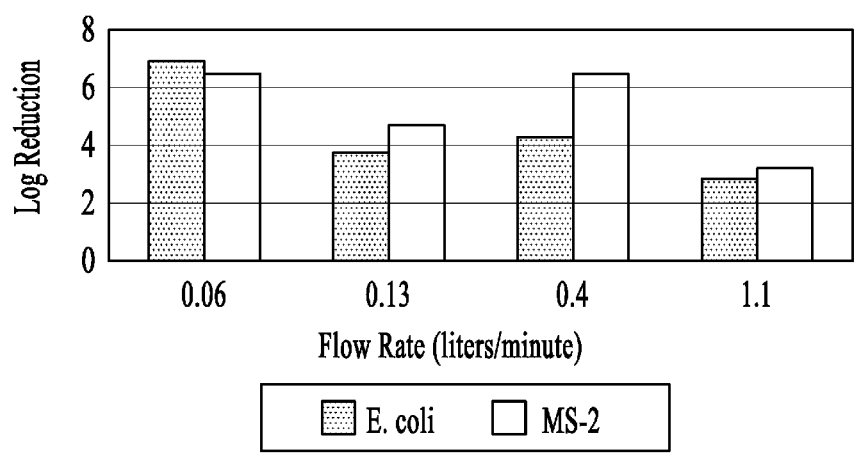
Figure 8A:
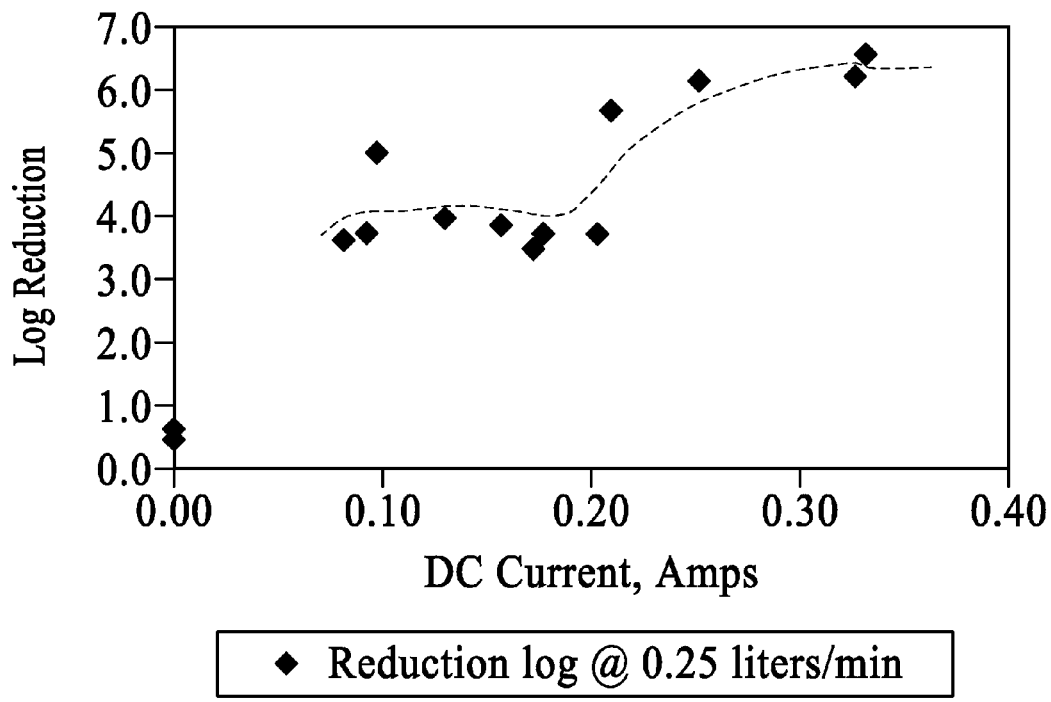
Figure 8B:
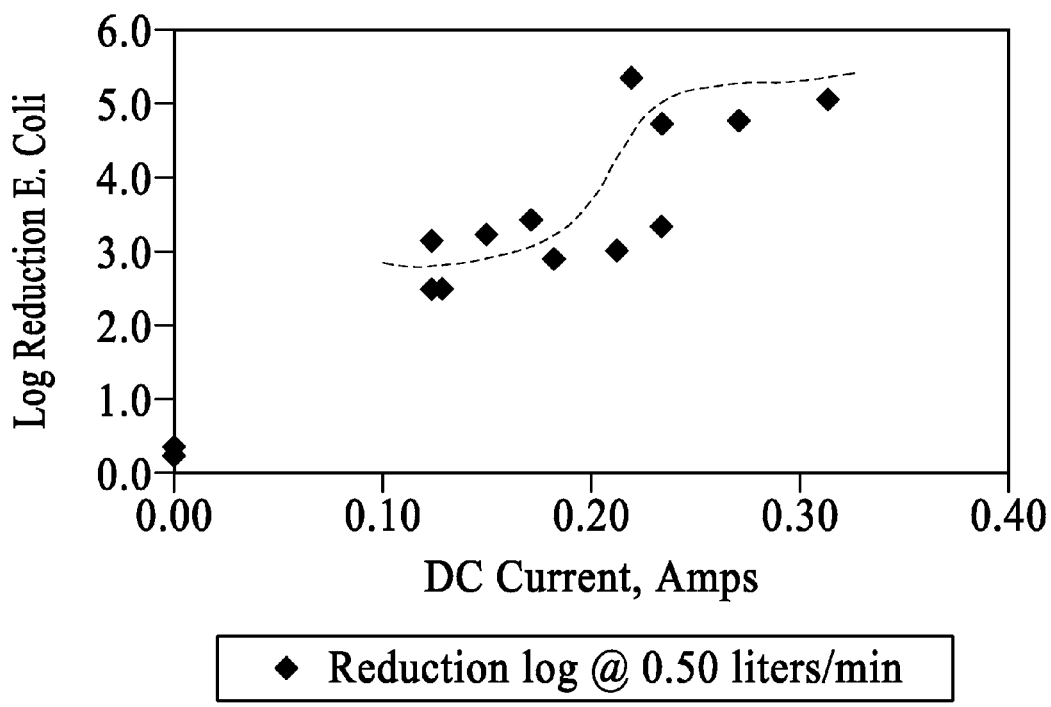
Figure 9A:
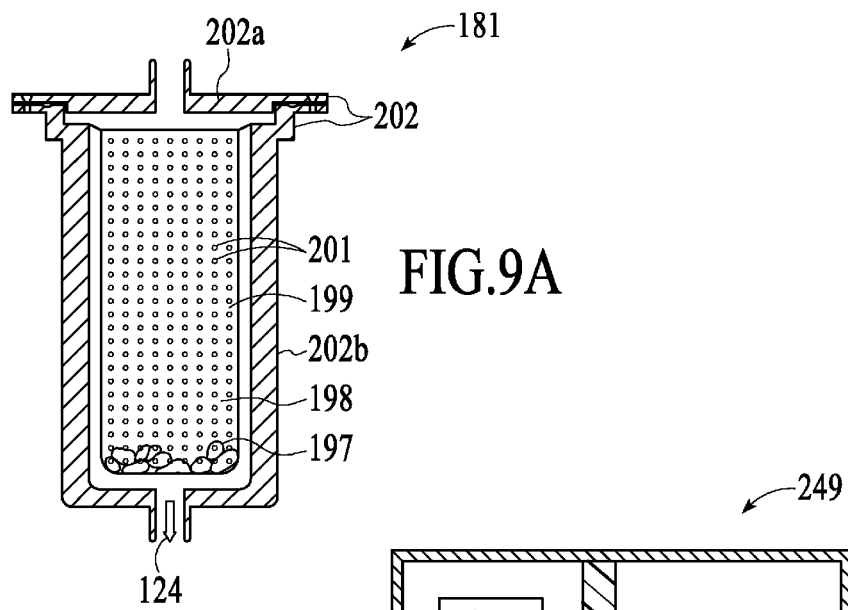
Figure 9B:
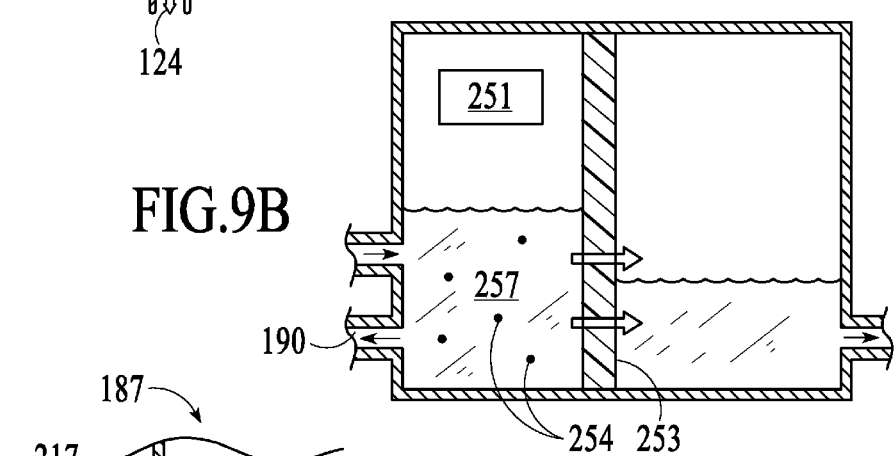
Figure 10:
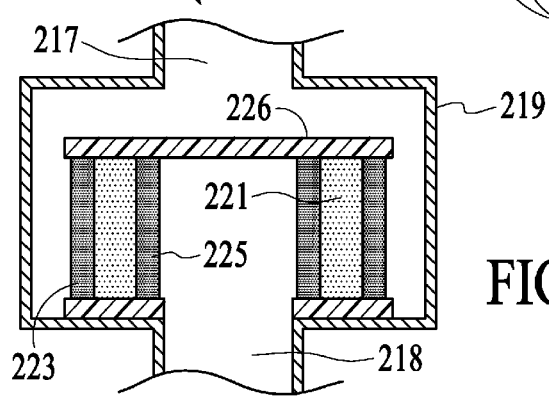
Figure 11A:
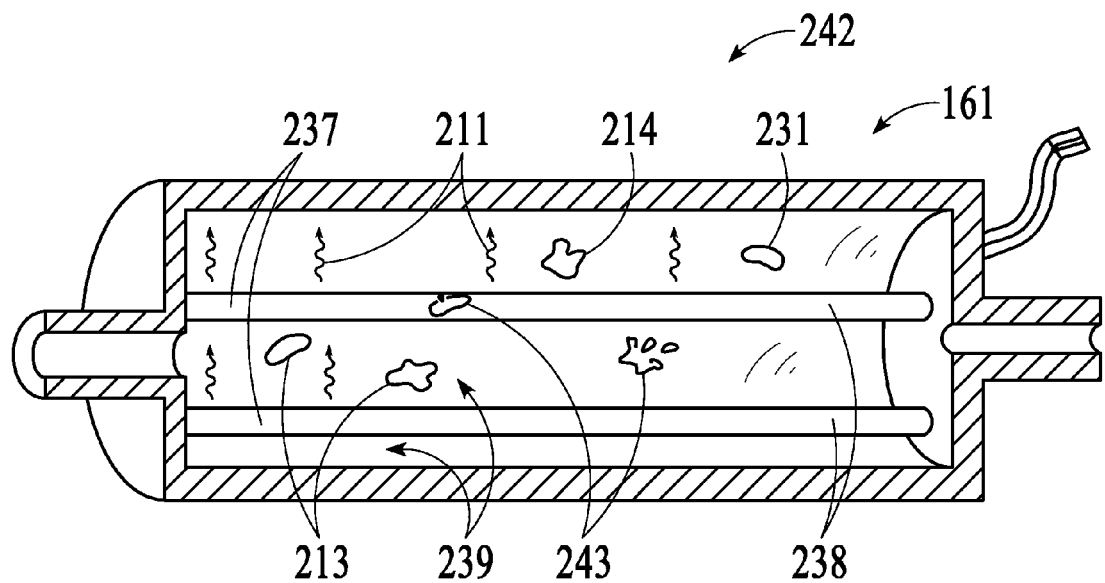
Figure 11B:
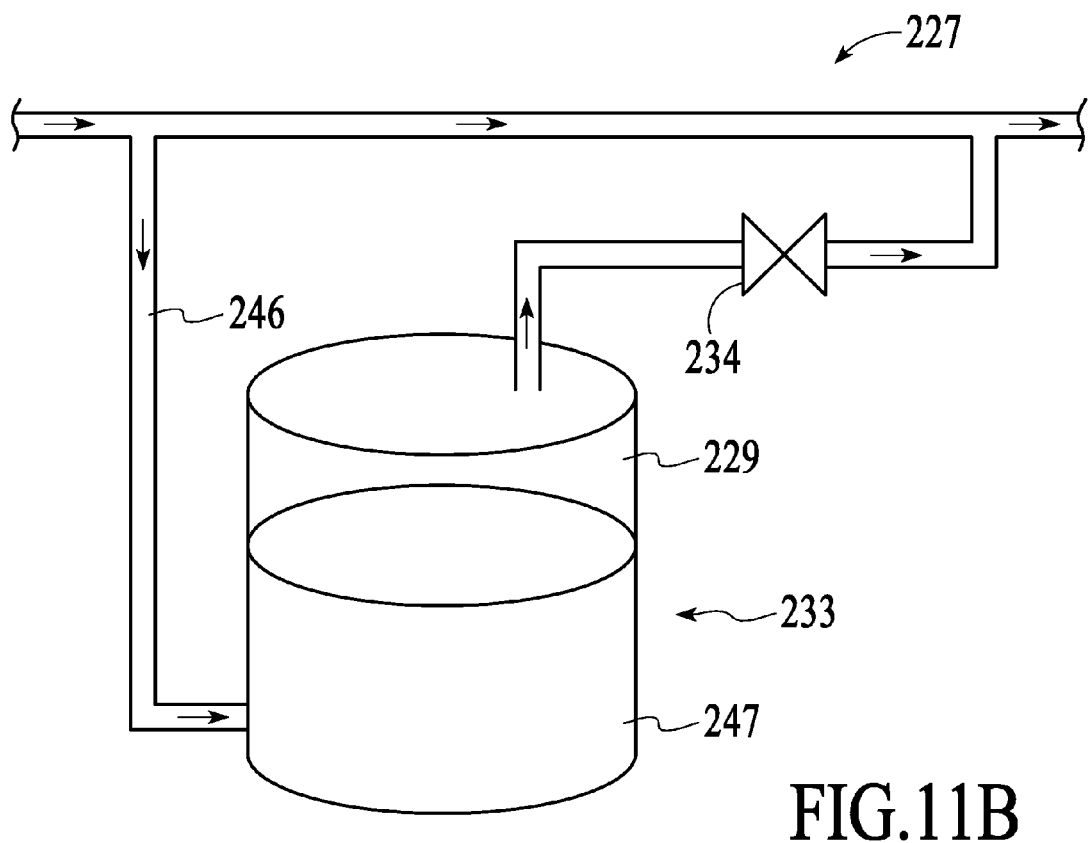
Figure 12:
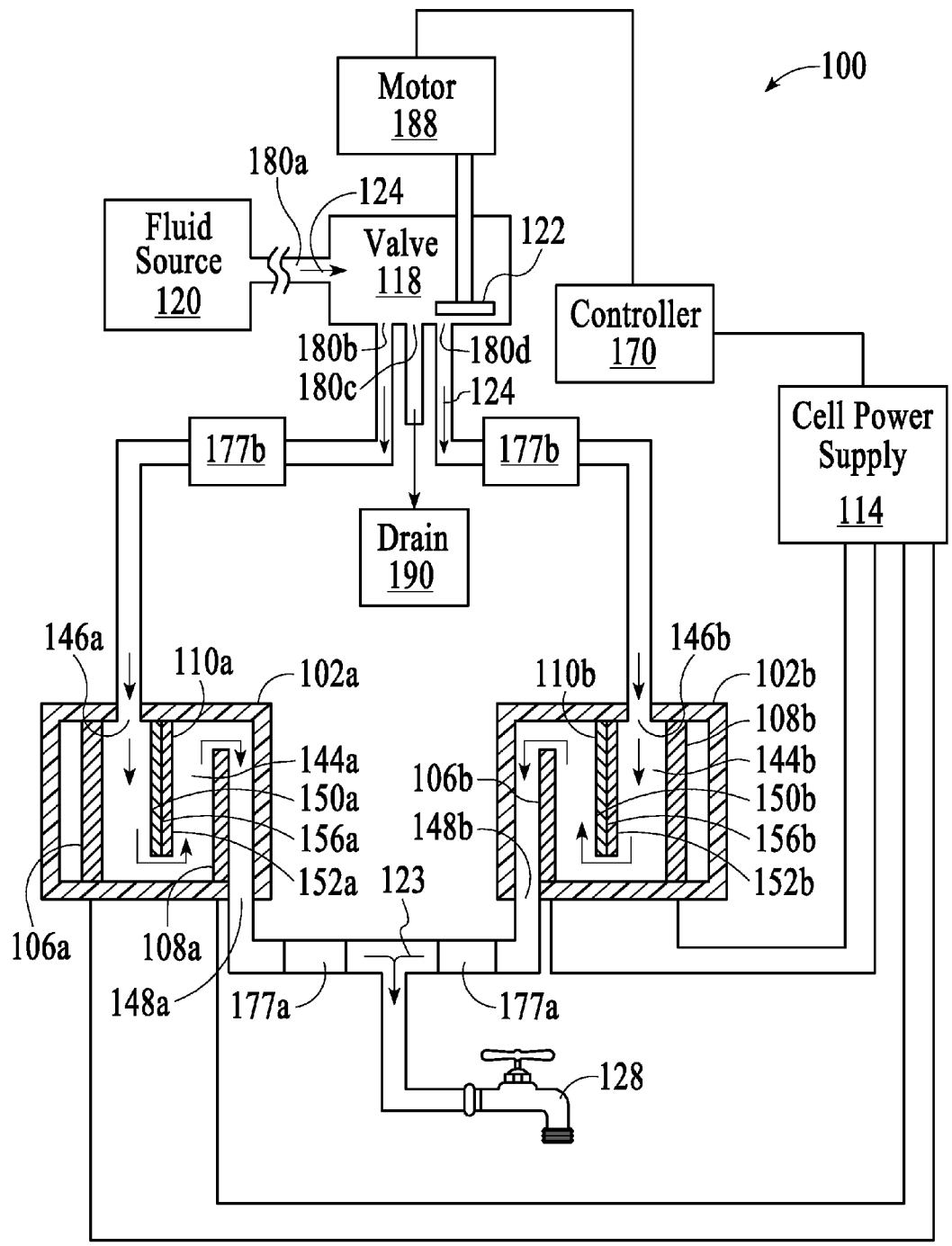
Figure 13:
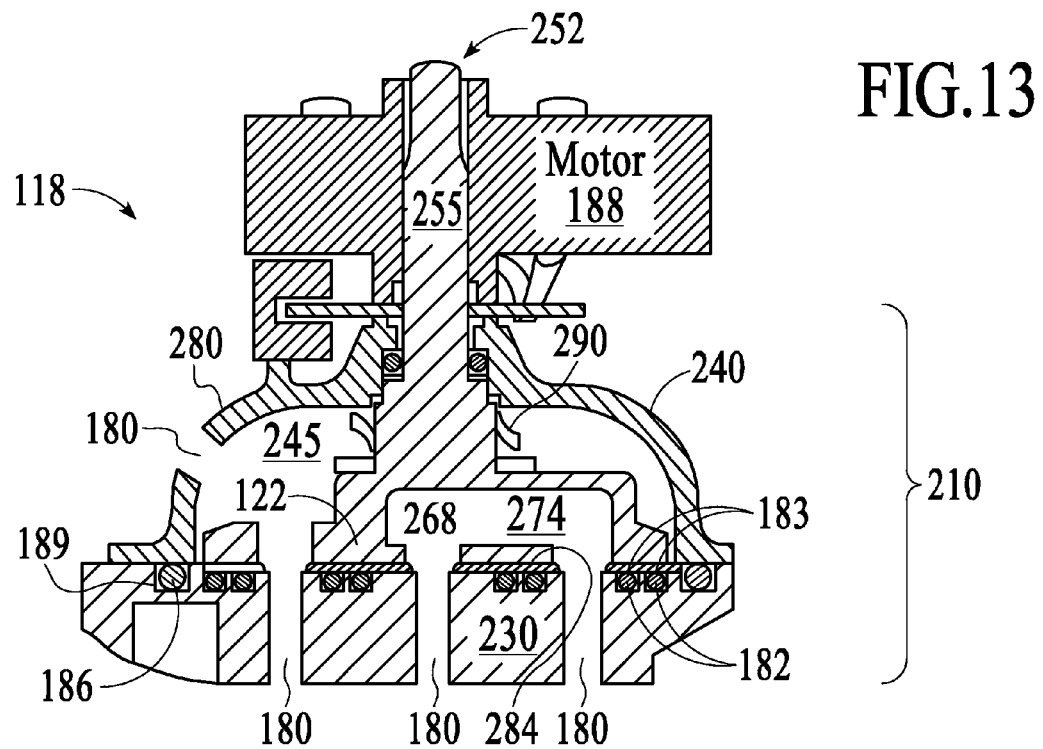
Figure 14:
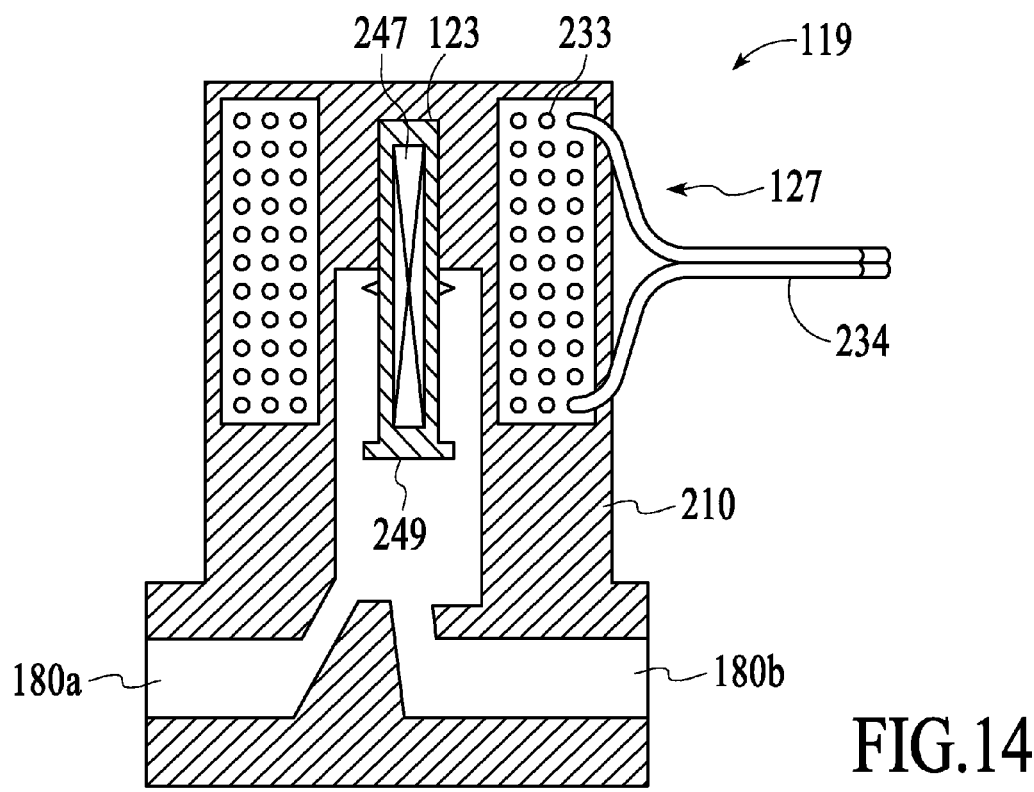
Figure 15:
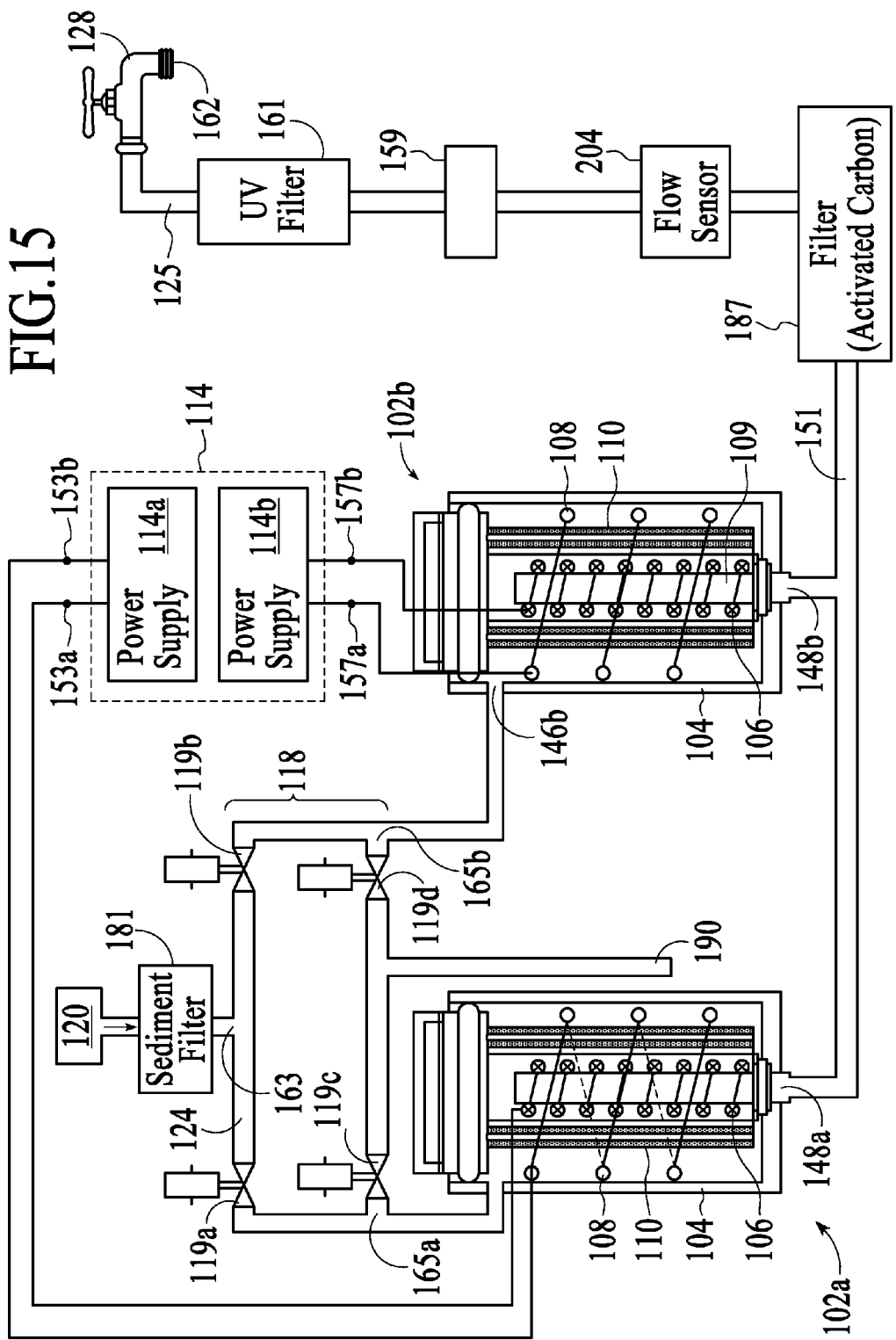
Figure 16:
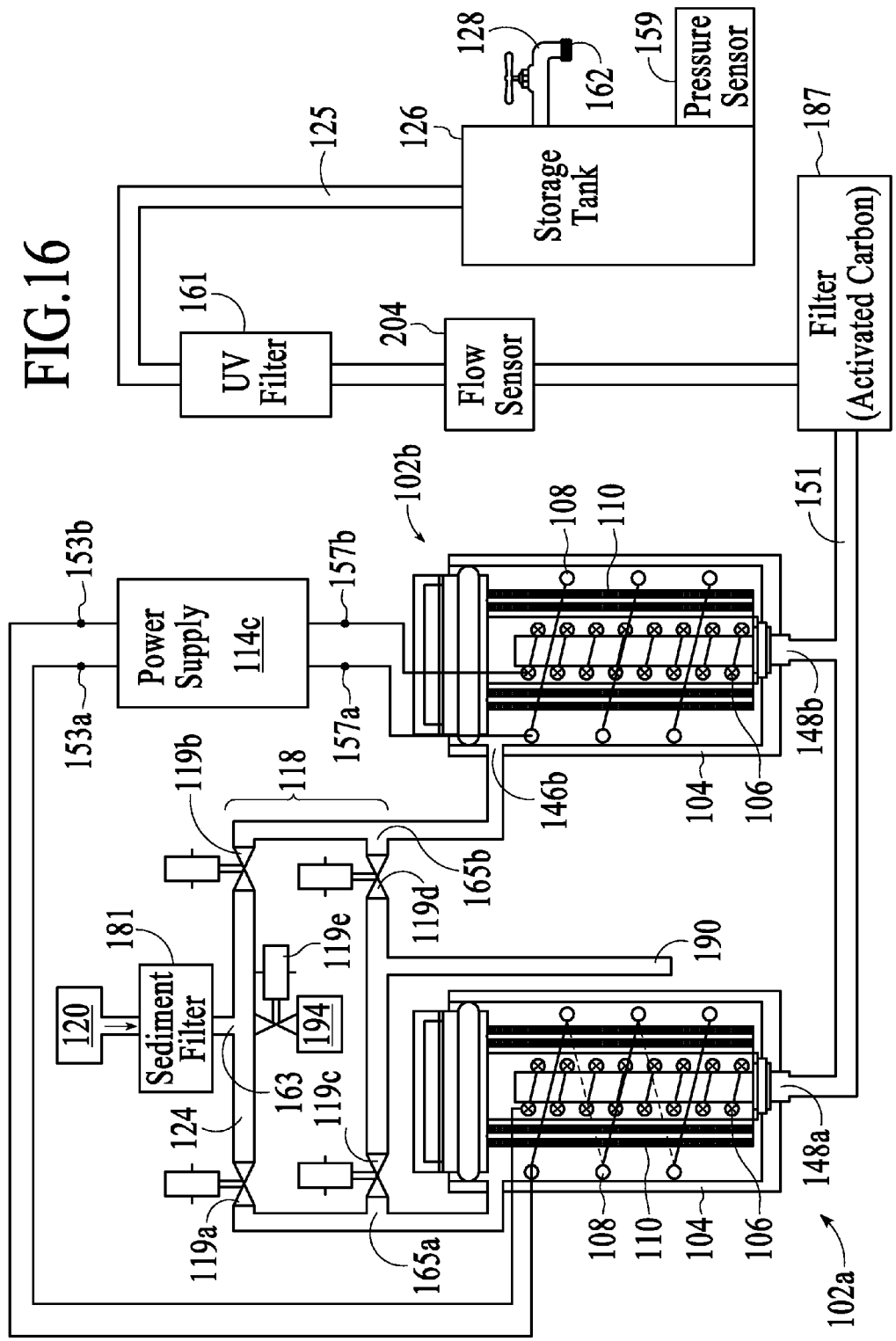
Figure 17:
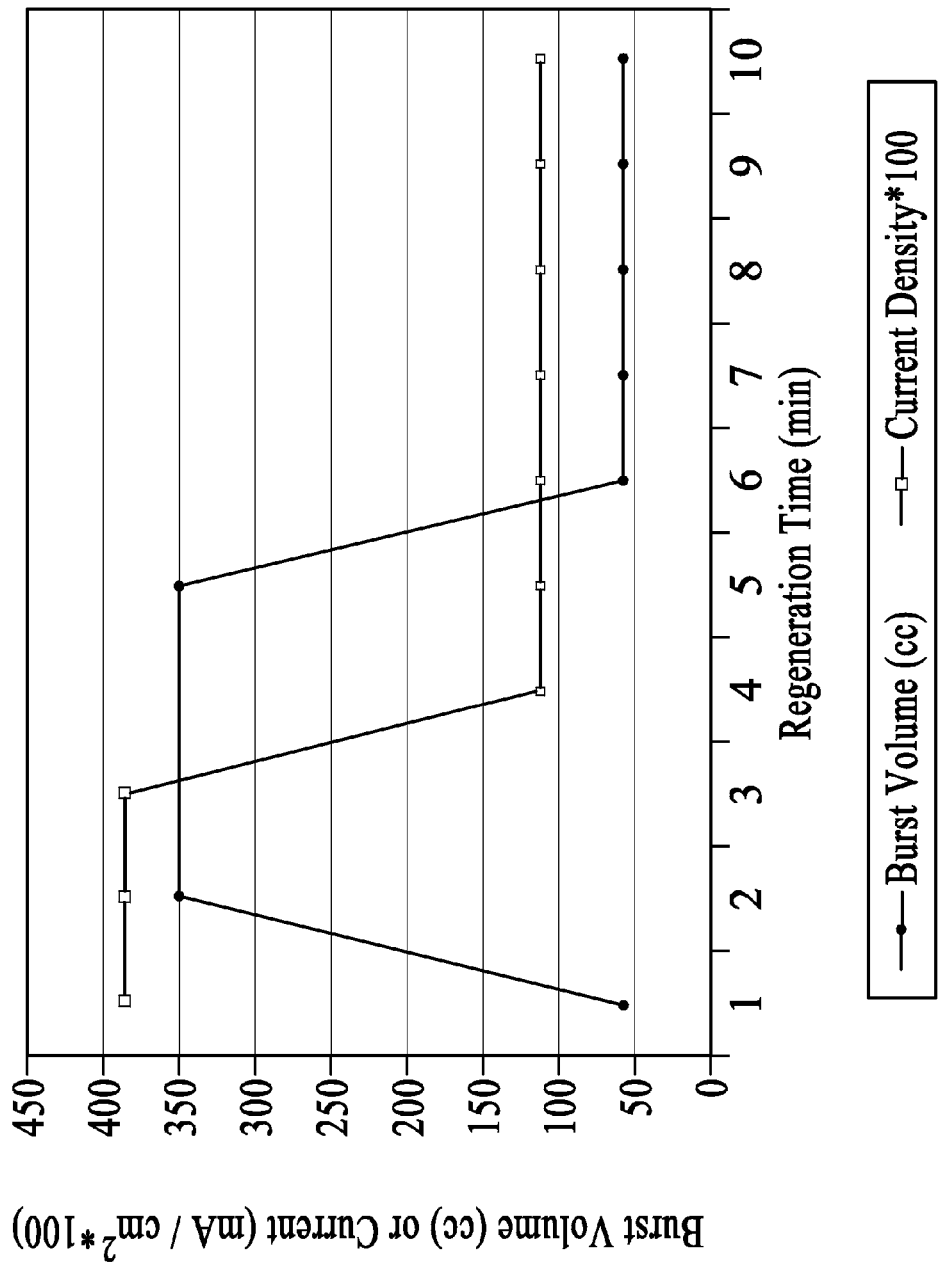
Figure 18:
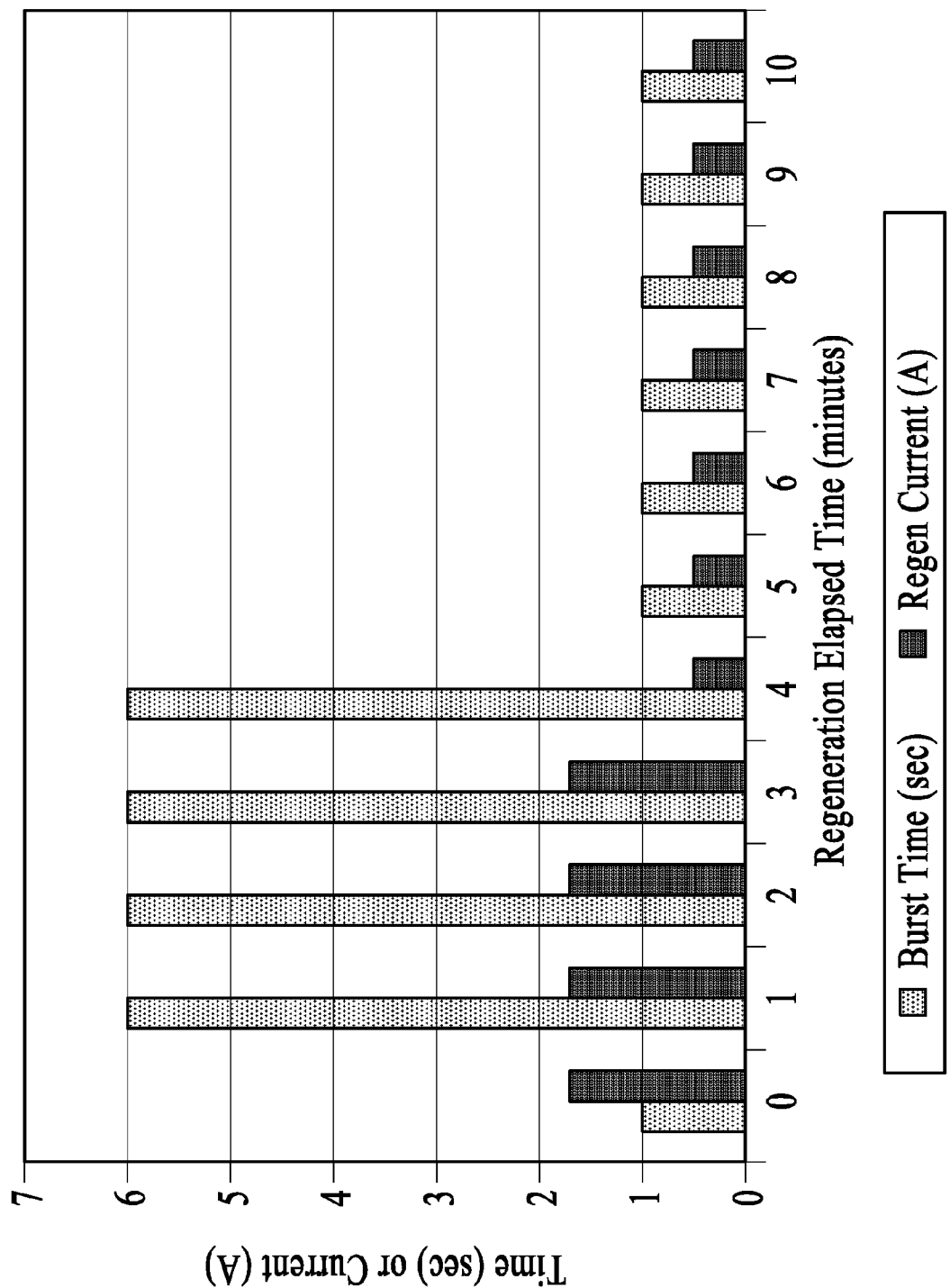
Figure 19:
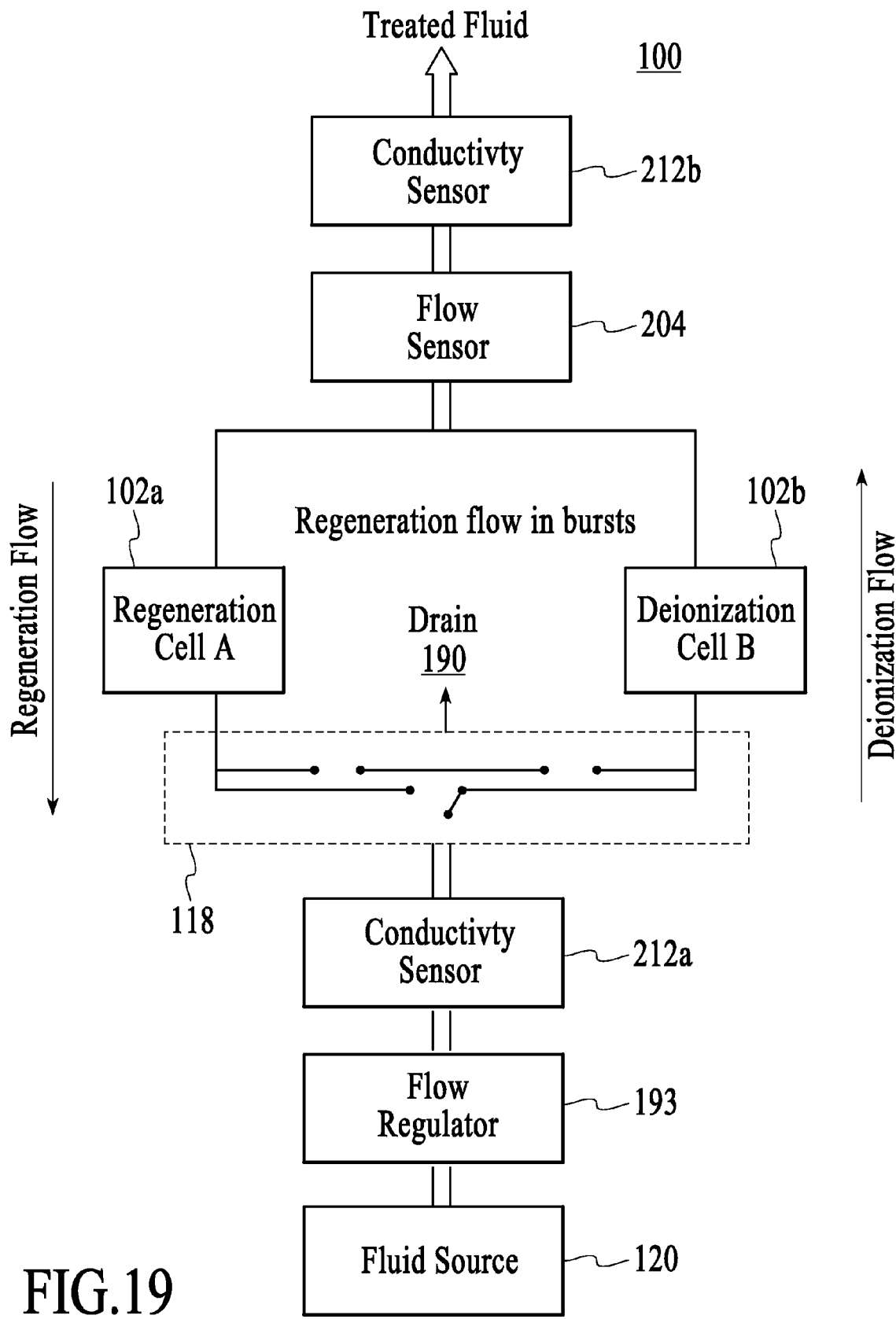
Figure 20:
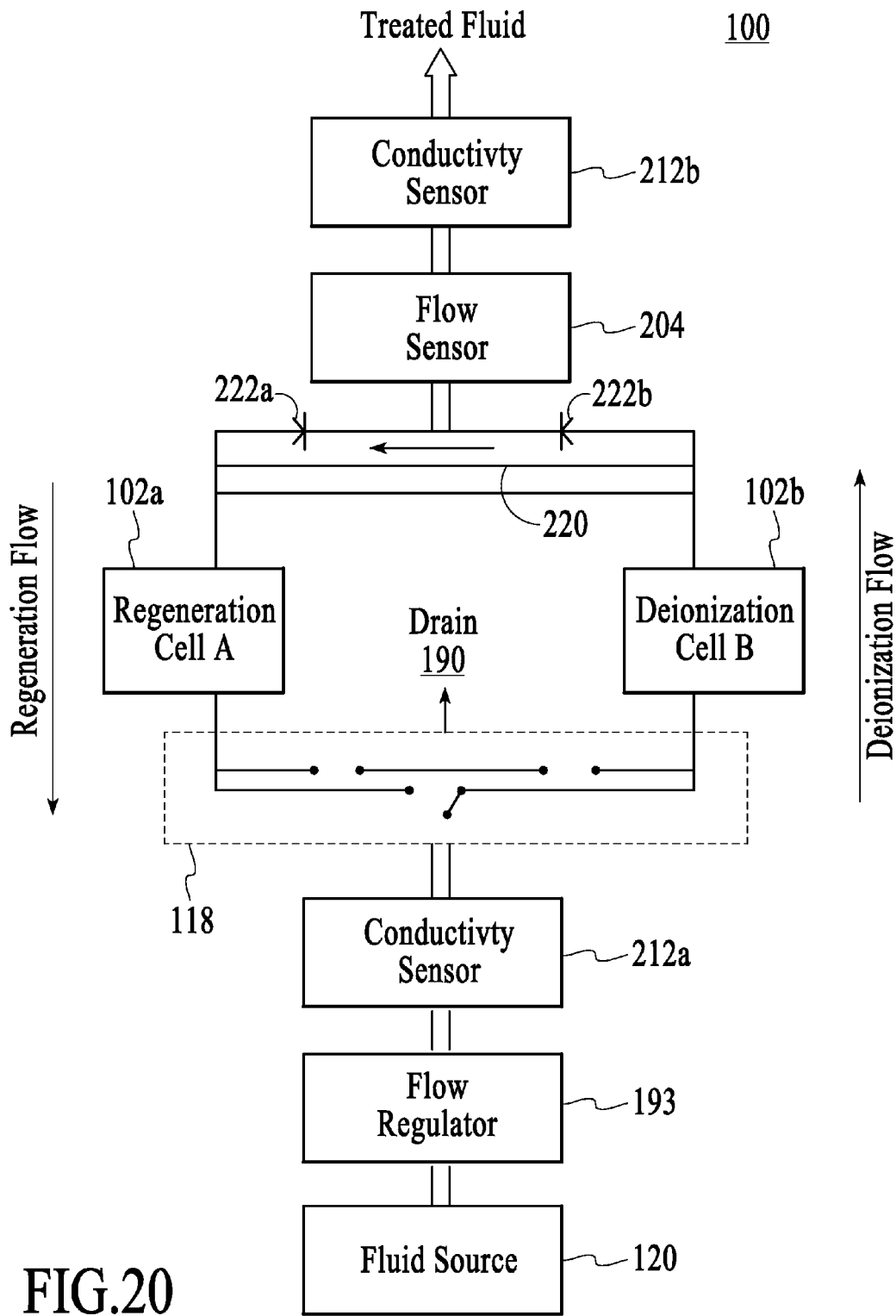
Figure 21:
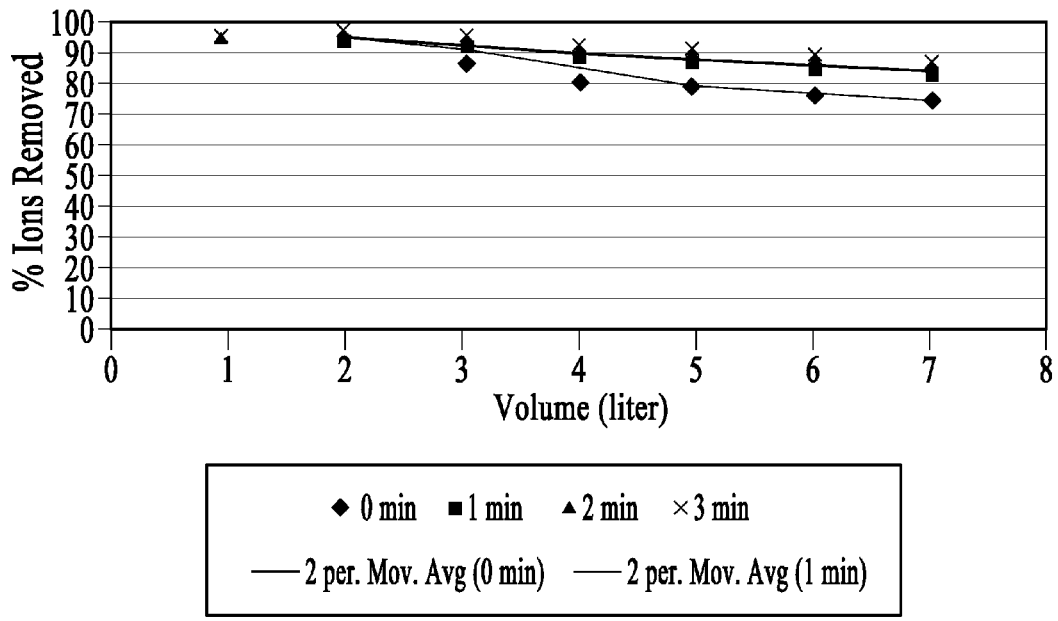
Figure 22:
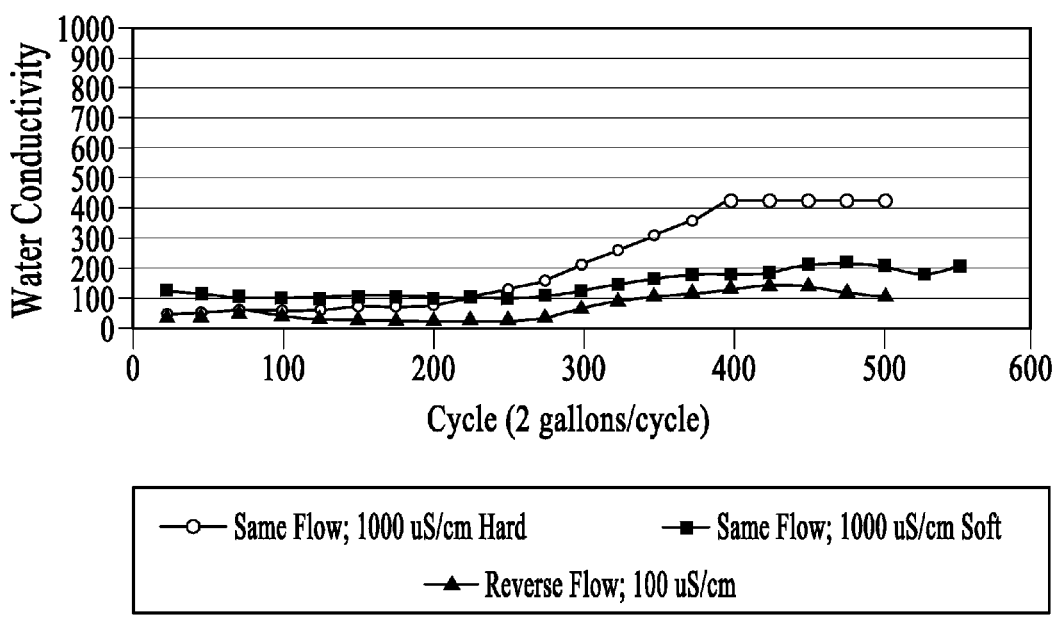
Figure 23:
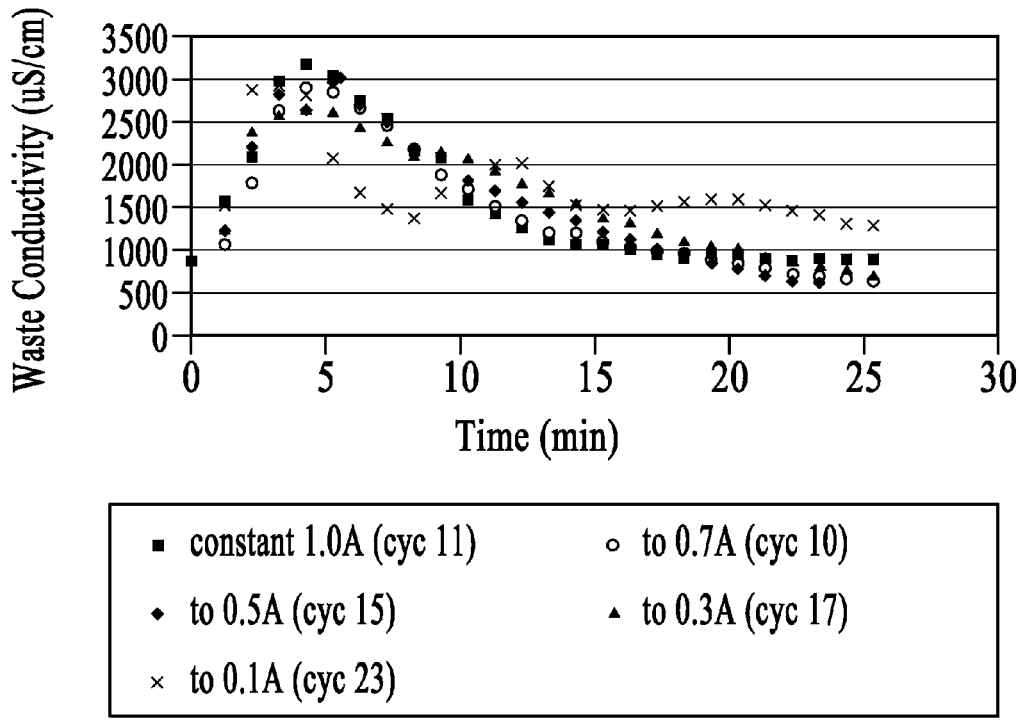
Figure 24:
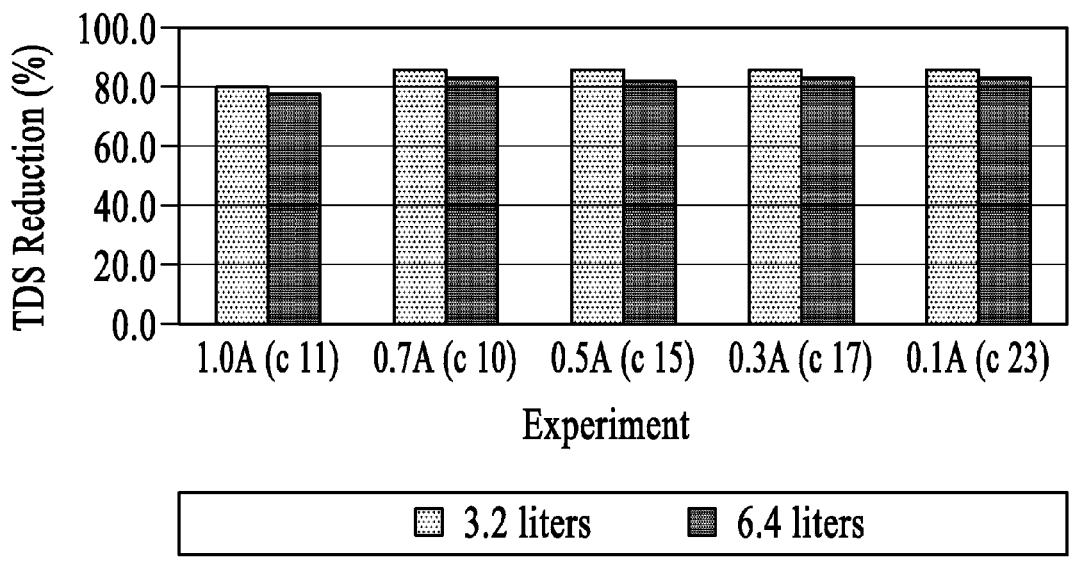
Figure 25:
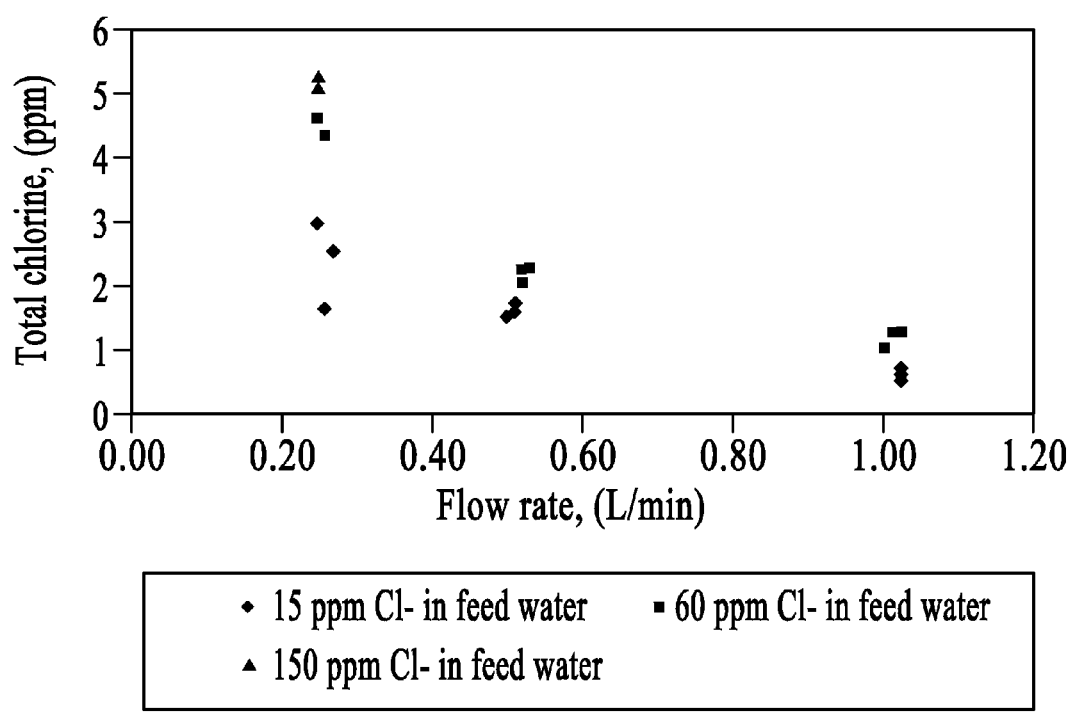

FIG. 3C1 is a schematic sectional view of a dimensionally stable anode electrode comprising an electrically conductive substrate with a surface coating, and having a partial insulator coating on the adjacent portions of the electrode;

FIG. 4A is a schematic block diagram of a controller comprising a control module and an electrode power supply for operating the electrochemical cell of FIG. 1;

FIG. 4B is a circuit diagram of a DC voltage supply that is appropriate for use in the power supply of FIG. 4A;

FIG. 5 is a side view of a flow sensor comprising an electromagnetic sensor and a magnetic turbine assembly;

FIG. 6 is a graph showing the heterotrophe bacteria plate count versus number of cell cycles for the electrochemical cell of FIGS. 2A and 2B;

FIG. 7 is a graph showing the log reduction in both bacteria and virus count as a function of flow rate for an electrochemical cell having a spiral wrapped membrane;

FIGS. 8A and 8B are graphs showing the log reduction in *E. Coli* bacteria as a function of DC current applied through the cell at a flow rate of 0.25 liter/min through the cell (FIG. 7A), and at a flow rate of 0.50 liter/min through the cell (FIG. 7B);

FIG. 9A is a cross-sectional schematic view of a sediment filter;

FIG. 9B is a cross-sectional schematic view of a reverse osmosis filter;

FIG. 10 is a cross-sectional schematic view of an activated carbon filter;

FIG. 11A is a cross-sectional schematic view of an antimicrobial cell comprising an ultraviolet cell;

FIG. 11B is a schematic diagram of an antimicrobial cell comprising a saturated salt solution cell and a control valve;

FIG. 12 is a schematic block diagram of an embodiment of a fluid treatment apparatus comprising a plurality of electrochemical cells;

FIG. 13 is a sectional side view of a motorized valve suitable for use in the valve system used to regulate the flow of fluid through the fluid treatment apparatus;

FIG. 14 is a sectional side view of a solenoid valve suitable for use in the valve system;

FIG. 15 is a schematic view of an embodiment of a fluid treatment apparatus which has dual electrochemical cells and dual power supplies, a solenoid valve system and various filters;

FIG. 16 is a schematic view of another embodiment of a fluid treatment apparatus which has dual electrochemical cells, a single power supply, a solenoid valve system and various filters;

FIG. 17 is a graph of the burst fluid volumes and current supplied to the electrodes over time;

FIG. 18 is a graph of a regeneration cycle of an electrochemical cell showing the burst time and current supplied to the electrodes with elapsed time in the regeneration cycle;

FIG. 19 is a schematic flow diagram of a fluid treatment apparatus having a flow regulator and flow sensor in the flow pathway of a pair of electrochemical cells;

FIG. 20 is a schematic flow diagram of a fluid treatment apparatus having a flow restrictor in the flow pathway of the electrochemical cells;

FIG. 21 is a graph of the % ions removed from the fluid passed through the cell for different time periods of deionization power supplied to the electrodes after the deionized fluid is flow from the cell is terminated;

FIG. 22 is a graph of the conductivity of the treated water for deionization process cycles run in an electrochemical cell when (a) fluid comprising hard water is used to regenerate the cell, (b) fluid comprising soft water is used to regenerate the cell and (c) fluid comprising deionized water is passed through the cell in a reverse flow through the deionized fluid orifice;

FIG. 23 is a graph of the conductivity of the regenerate or waste fluid outputted from the cell over time when different regeneration currents are applied to the electrodes;

FIG. 24 is a graph of the percentage of total dissolved solids (TDS) reduced in the outputted deionized fluid for cells regenerated with the lower regeneration current levels of FIG. 23; and FIG. 25 is a graph of the total chlorine level in the output fluid measured as a function of the chloride ion present in the input fluid and flow rate.

DESCRIPTION

Embodiments of the present system, apparatus and methods are capable of treating a fluid to extract, replace or add ions to the fluid, remove particles and sediment, and deactivate or reduce the levels of microorganisms in the fluid. While exemplary embodiments of the fluid treatment apparatus are provided to illustrate the invention, they should not be used to limit the scope of the invention. For example, the fluid treatment apparatus can include an apparatus other than the electrochemical cells or cell arrangements described herein, as would be apparent to those of ordinary skill in the art. Also, in addition to the treatment of water, which is described as an exemplary embodiment herein, the fluid treatment apparatus can be used to treat other fluids, such as solvent or oil based fluids, chemical slurries, and waste water. Thus, the illustrative embodiments described herein should not be used to limit the scope of the present invention.

An exemplary embodiment of an apparatus 100 capable of treating a fluid by ion exchange is shown in FIG. 1. The apparatus 100 comprises an electrochemical cell 102, which includes a housing 104 enclosing at least two electrodes 106, 108 and one or more ion exchange membranes 110, such as water-splitting ion exchange membranes. A cell power supply 114 is provided to power the electrodes 106,108 by supplying a current or voltage to the electrodes 106,108. A valve system 118 controls the fluid supply from a fluid source 120 to provide an influent fluid stream 124 into the cell. The treated fluid is passed out of the cell 102 as a treated or effluent fluid stream 125 which may be stored in a treated fluid tank 126 and/or released from a dispensing device 128. Electrochemical ion exchange apparatuses are described in commonly assigned U.S. Pat. No. 5,788,812 issued to Nyberg et al., U.S. patent application Ser. No. 10/130,256 also to Nyberg et al.; and U.S. patent application Ser. No. 11/021,931 to Holmes et al., all of which are incorporated herein by reference in their entireties.

The electrodes 106,108 of the cell 102 are fabricated from electrically conductive materials, such as a metal or metal alloy, which are resistant to corrosion in the low or high pH chemical environments formed during the positive and negative polarization of the electrodes 106,108, in operation of the cell 102. Suitable electrodes 106,108 can be fabricated from corrosion-resistant materials such as titanium or niobium, and can have an outer coating of a noble metal, such as platinum. The shape of the electrodes 106,108 depends upon the design of the electrochemical cell 102 and the conductivity of the fluid stream 124 flowing through the cell 102. Suitable shapes for the electrodes 106,108 include for example, wires, wire mesh wraps and sheets with punched holes. The electrodes 106,108 are arranged to provide an electric potential drop through the membranes 110 upon application of a current to the electrodes 106,108.

In one embodiment, shown in FIGS. 1B and 1C, the cell 102 comprises a cartridge 130 containing a pair of electrodes 106,108, which are wires wrapped on a central riser tube 109 in the center of the cartridge 130 and the wire wrap outside the cartridge adjacent to the inner wall of the housing 104. The electrodes are located about a stack of spiral wrapped water splitting membranes 110 which are rolled and bound together by an outer netting tube (not shown). In the cell 102c, the fluid stream 124 flows between the membrane layers from the outside to the inside of the housing, and into the top of riser tube 109, and exits at the bottom of the cell, or fluid flow may be in the opposite direction. The electric potential difference applied between the two electrodes 106,108, across the stack of spirally wound membranes 110. Advantageously, the cartridge 130 provides a high density or packing efficiency of stacked membranes 110 between the two electrodes 106,108 in a smaller footprint, and also allows easy replacement or cleaning of membranes by changing the cartridge 130.

The electrodes 106,108 can also have other shapes, such as concentric spheres, parallel plates, tubular wire meshes, discs, or even conical shapes, depending on the application. For example, FIG. 3A shows a parallel plate cell 102a comprising a pair of electrodes 106,108 that are parallel plates on either side of a water-splitting membrane 110. Instead of one membrane 110, a plurality of stacked membranes 110 can also be used in this cell. In the parallel plate cell 102a, the fluid stream 124 flows perpendicular to and through, or between the surfaces of, the membranes 110. As another example, a disc cell 102b as shown in FIG. 3B, comprises a pair of electrodes 106,108 comprising discs on either side of a stack of water-splitting membranes 110. In the disc cell 102b, the fluid stream 124 flows through the membranes 110 and is assisted by gravity. The electric potential drop is applied between the two disc electrodes 106,108. The membranes 110 are also shaped as circular discs and can also have separators (not shown) between them.

Yet another version of the electrochemical cell 102 comprises two inner electrodes 108a,b and/or two outer electrodes 106a,b, as shown in FIG. 3C. The traditional cell 102 uses a single inner electrode 108 and a single outer electrode 106 which are alternatively operated as the anode and cathode, depending on whether the cell is in the deionization or regeneration mode. However, in the dual electrode cell version, a first pair of inner and outer electrodes 108a, 106a, respectively, are each composed of the same first material. The second pair of inner and outer electrodes 108b,106b, respectively, are each composed of the same second material that is a different material than the first material. The power supply 114 of the cell 102 applies a current to operate the first pair of inner and outer electrodes, 108a,106a, exclusively as an anode (e.g., during a deionization step), and the second pair of inner and outer electrodes 108b,106b, which are made from a different material, exclusively as a cathode (e.g., during a regeneration step). In operation, the power supply 114 disconnects the unused electrode so that it would float. For example, if a current was being supplied to the inner electrode 108a and outer electrode 106a, the inner electrode 108b and outer electrode 106b would be disconnected to reduce stray currents between the electrodes.

The first pair of inner and outer electrodes 108a,106a, operated as anodes, are both made from a material that reduces corrosion of an anodic electrode that would otherwise arise from chemical attack by particular ions in the fluid that are attracted to a positive polarity electrode. Suitable anode electrodes, 108a,106b, are dimensionally stable anodes, or DSAs. These anode electrodes provide longer overall life, less maintenance, or lower cell operational costs. In one version, each dimensionally stable anode electrode 108a,106a, comprises an electrically conductive substrate 107a with a surface coating 107b, as shown in FIG. 3C1. The surface coating 107b can be a defect containing solid solution containing at least one precious metal oxide and at least one "valve" metal oxide. In these substitutional solid solutions, an interstitial atom of valve metal that is oriented in the characteristic rutile valve metal oxide crystal lattice structure is replaced with an atom of precious metal. This structure has conductive electrical properties in contrast to physical mixtures of the two oxides, which would be an insulator. The substitutional solid solutions, in addition to being electrically conductive, can also be catalytic or electrocatalytic. Suitable valve metals include titanium, tantalum, niobium and zirconium; and the implanted precious metal can include platinum, ruthenium, palladium, iridium, rhodium and osmium. The molar ratio of valve metal to precious metal typically varies from between about 0:2 to about 5:1, for example, 2:1. The electrically conductive substrate 107a is also made of the valve metal. One example of such a DSA electrode comprises a titanium substrate 107a having a surface coating 107b comprising a solid solution of titanium dioxide and ruthenium dioxide. The titanium substrate 107a is corrosion resistant in a chlorine environment which allows for the structure to maintain its dimensional tolerance during its life unlike, for example, anodes made from graphite. Another example is a DSA electrode that is resistant to erosion in oxygen-ion environments, and is composed of a titanium substrate 107a having a coating 107b comprising multiple layers of different metals or an electrochemically active metal oxide layer.

The inner and outer electrodes 108b,106b, operated as cathodes, are also made from an erosion-resistant material which increases their lifetimes as cathodes with a negative polarity in an ionic fluid. Suitable erosion-resistant materials for the cathode electrodes 108b,106b, include carbon and stainless steel.

The dual inner and outer electrodes, 108a,b, 106a,b, one suitable for use as a cathode and another as an anode, can be positioned adjacently, so they are in the same general region of the cell 102. In one version, the dual inner electrodes, 106a,b, both have the same shape, size and configuration, and the dual electrodes, 108a,b, are also essentially the same. dual inner and outer electrodes, 108a,b, 106a,b. In one version, both inner and outer cathode electrodes 108b,106b are made from stainless steel and both inner and outer anode electrodes 108a,106a are DSA electrodes made from titanium and ruthenium dioxide.

In yet another version, the inner electrodes 108a,b, are positioned side by side and have an insulator coating on adjacent portions of each of the inner electrodes, and the outer electrodes 106a,b, are also positioned side by side and have an insulator coating 107c on adjacent portions of each of the outer electrodes. The insulator coating 107c can be a ceramic coating, for example, plasma sprayed aluminum oxide or titanium dioxide. The coating 107c can be thin, for example, it can have a thickness of less than 100 microns.

Referring back to FIGS. 2A and 2B, the cartridge 130 is positioned within the housing 104 of the electrochemical cell 102. The housing 104 has an inlet or influent orifice 146 for introducing an input fluid in an influent fluid stream 124 into the cell and an outlet or deionization orifice 148 to release a treated output fluid in an effluent fluid stream 125. The cartridge 130 comprises a hydraulically porous tubular inner wall 134, such as a rigid net tube, on which membranes 110 are rolled, and end caps 138a,b mounted on either end of the tubular inner wall 134. The cartridge 130 may be designed for a variety of flow patterns, for example end-to-end flow (parallel to the tubular inner wall 134) or inner-to-outer flow (radial flow to or from the tubular inner wall 134). The tubular inner wall 134, outer sleeve 142 which contains the rolled membrane, and end-caps 138a,b, are designed to provide a fluid passageway 144 that provides the desired flow pattern across substantially the entire membrane surface. For example, for the fluid stream 124 to flow radially to or from the tubular inner wall 134, across both the inner and outer surfaces of each textured membrane 110, the end-caps 138a,b seal the ends of the spirally wound membranes 110 to prevent fluid from by-passing the membrane 110 surface on its way from orifice 146 to orifice 148. The membranes 110 can also be arranged in the cartridge 130 to provide a fluid passageway 144 from the orifice 146 to the orifice 148. The fluid stream 124 flows past both the cation and anion exchange layers 150, 152, of each membrane 110 in the fluid passageway 144. Preferably, the passageway 144 forms a unitary and contiguous pathway that is connected throughout in an unbroken sequence extending continuously from the orifice 146 to the orifice 148.

In one version, the ion exchange membrane 110 is water-splitting and is also known as a bipolar, double or laminar membrane. The water-splitting ion exchange membrane 110 comprises a cation exchange layer 150 and an anion exchange layer 152, which are joined together at a membrane interface 156, as shown in FIGS. 2A and 2B. In the version shown, the cation exchange layer 150 faces the first or outer electrode 106 and the anion exchange layer 152 faces the second or inner electrode 108. In this embodiment, three membranes 110 are spiral wrapped to form a parallel flow arrangement, which means that the fluid can flow from orifice 146 to orifice 148 in three equivalent passageways 144 that lie between membranes 110. For any flow pattern, for example, parallel or radial relative to the tubular inner wall 134, one or more membranes 110 can be wrapped in a parallel arrangement to vary the pressure drop across the cartridge 130 and the number of membranes 110 that are being wrapped in a parallel flow arrangement selected to provide the desired pressure drop through the cell 102. While the membranes 110 are generally tightly wound against each other, for pictorial clarity, the membranes 110 are shown loosely wound with spaces between them.

The cation exchange layer 150 and anion exchange layer 152 contain cation and anion exchange materials, respectively, typically in the form of solids or gels containing ions which are replaceable by other ions or which chemically react with specific ions to remove the ions from the fluid stream 124. For example, suitable cation and anion exchange materials can include crosslinked or un-crosslinked organic polymers or inorganic structures such as zeolites. Cation exchange materials exchange cations with no permanent change to the structure of the material, and can include, for example, acidic groups. Suitable cation exchange materials can comprise one or more acidic functional groups capable of exchanging cations such as —COOM, —$SO_3M$, —$PO_3M_2$, and —$C_6H_4OM$, where M is a cation (e.g., hydrogen, sodium, calcium, or copper ion). Cation exchange materials also include those comprising neutral groups or ligands that bind cations through coordinate rather than electrostatic or ionic bonds (for example, pyridine, phosphine and sulfide groups), and groups comprising complexing or chelating groups (e.g., those derived from aminophosphoric acid, aminocarboxylic acid and hydroxamic acid. Anion exchange materials exchange anions with no permanent change to their structure, and can be, for example, basic groups. Other suitable anion exchange materials may comprise one or more basic functional groups capable of exchanging anions such as —$NR_3A$, —$NR_2HA$, —$PR_3A$, —$SR_2A$, or $C_5H_5NHA$ (pyridine), where R is an alkyl, aryl or other organic group and A is an anion (e.g., hydroxide, bicarbonate, chloride, or sulfate ion).

The selection of suitable cation and anion exchange materials for an ion exchange membrane 110 depends on the application of the membrane 110. For example, in the deionization of a water based solution stream, a membrane 110 comprising a cation exchange layers 150 comprising —$SO_3M$ or carboxylic acid (—COOH) groups, and an anion exchange layer 152 having —$NR_3A$ groups such as trimethyl (—$NCH_3$) or triethyl ammonium (—$N(C_2H_5)_3$ groups), is a preferred embodiment. Such membranes 110 readily swell in water, thereby providing lower electrical resistances and higher mass transport rates over a wide range of pH. Anion exchange materials comprising weak base or weak acid groups are preferred when particularly efficient ion exchange regeneration is required. For example, —$NR_2HA$ will react with $OH^-$ in a very favorable reaction to form —$NR_2$, $H_2O$, and expel $A^-$. As another example, for the selective removal of calcium or copper ions from a liquid containing other ions, for example sodium ion, ion exchange groups such as —COOM or a chelating group, such as aminocarboxylic acid, are preferred. These weak acid groups offer the additional benefit of particularly efficient regeneration due to the strongly favorable reaction of —$(COO)_nM$ with $H^+$ to form —COOH and expel $M^{+n}$, where M is a metal ion.

The water splitting ion exchange membranes 110 can be textured with a pattern of repeating three-dimensional shapes, such as arrays of peaks and valleys, exemplary embodiments of which are described in "TEXTURED ION EXCHANGE MEMBRANES", to Hawkins et al., U.S. patent application Ser. No. 10/900,256, filed on Jul. 26$^{th}$, 2004, which is incorporated herein by reference in its entirety. The textured features can be an array of furrows and ridges that are linearly spaced apart and parallel to a flow path of the fluid stream 124 passing through the cell. The textured features generally have dimensions on the order of microns.

The membranes 110 can be spiral wrapped with or without the spacers 154 provided on the external surface of the cation or anion exchange layer 150,152, respectively, separating it from the adjacent layer, as shown in FIGS. 2A and 2B. The spacers 154 can be made from a fibrous dielectric material, such as a polymer, for example, polyethylene or polypropylene, and have a thickness of from about 0.01 to about 5 mm, or more typically about 0.1 mm. The spacers 154 separate the textured membranes 110 from one another to allow better flow of the fluid through the membranes 110. The cartridge 130 comprises several membranes 110 with spacers 154 that are spirally wound around a tubular inner wall 134, which is typically cylindrical.

A controller 170 controls the operation of the apparatus 100 and supplies control signals and power to the various components of the apparatus 100. In one version, the controller 170 comprises a power supply 114 and a control module 140 as shown in FIG. 4A. The power supply 114 is capable of generating voltages to deliver power to components of the ion exchange apparatus 100. The voltage levels generated by the power supply 114 are selectable to deliver power to components of the apparatus 100 depending upon, for example, the component requirements, the operating conditions of the ion exchange apparatus 100, or other factors.

The control module 140 is capable of generating and receiving signals and instructions to individually and collectively operate components of the ion exchange apparatus 100. The control module 140 comprises electronic circuitry and program code to receive, evaluate and send signals. For example, the control module 140 can comprise (i) a programmable integrated circuit chip or a central processing unit, CPU (not shown), (ii) a memory (not shown) such as a random access memory and stored memory, (iii) peripheral input and output devices (not shown) such as keyboards and displays, and (iv) hardware interface boards (not shown) comprising analog, digital input and output boards, and communication boards. The control module 140 can also comprise program code instructions stored in the memory that are capable of controlling and monitoring the ion exchange cell 102, power supply 114 and other components of the ion exchange apparatus 100. The program code may be written in any conventional computer programming language. Suitable program code is entered into single or multiple files using a conventional text editor and stored or embodied in the memory. If the entered code text is in a high level language, the code is compiled, and the resultant compiler code is then linked with an object code of pre-compiled library routines. To execute the linked, compiled object code, the user invokes the object code, causing the CPU to read and execute the code to perform the tasks identified in the program.

In one version, the control module 140 comprises a microcontroller 152. The microcontroller 152 is typically a single integrated device that comprises several of the components of the control module 140. For example, the microcontroller 152 may comprise a CPU, memory, program code, input and output circuitry, and other circuitry that may be specialized or adapted to particular tasks. The microcontroller 152 is advantageous because it encapsulates a relatively high degree of functionality into a single programmable component. One example of suitable commercially available microcontrollers 152 are the PICmicro® series of microcontrollers 152, such as for example the 28/40-Pin 8-Bit CMOS Flash PIC16F87X Microcontroller, available from Microchip located in Chandler, Ariz. Another example of a suitable commercially available microcontroller is the 68000 available from Motorola Corp., Phoenix, Ariz.

In one version, the power supply 114 and a portion of the control module 140, such as the microcontroller 152, can together form a controlled power supply. The controlled power supply combines the generation of voltages and current to deliver power to the components of the ion exchange apparatus 100 with the programmability and control functionality of the microcontroller 152. The controlled power supply may also be part of a controller 170 having a control module 140 and other components besides the microcontroller 152.

The electrode power supply 114 serves to convert an AC voltage source 158 into a DC voltage output to charge the cell electrodes 106,108 and drive fluid treatment in an electrochemical treatment cell 102. The magnitude of the DC voltage applied between the electrodes 106 and 108 affects the ion mass transport in the cell 102, whereby higher voltages correspond to a greater ion mass transport, and lower voltages correspond to a lesser ion mass transport. In order to regulate the properties of the treated fluid, the electrode power supply 114 must be able to deliver a selectable DC voltage. An acceptable DC voltage output, for example, is a pulsating DC voltage, having an amplitude and a ripple. In one version, the ripple has a value of from about 10% to about 50% of the time-averaged value of the DC voltage during a specified time period and the electrode power supply 114 is capable of generating the DC voltage which has a voltage level which is typically selectable in the range of from about 0 V to about 330 V, or from about 30 volts to 300 volts. The polarity of the voltage applied to the electrodes also affects the operation, whereby one polarity corresponds to fluid treatment and a reverse polarity corresponds to electrochemical cell regeneration.

In order to exhibit these characteristics, the power supply 114 must comprise certain elements, namely: a DC voltage supply 164 capable of rectifying and multiplying the AC input voltage, a voltage level selector 165 with timing circuitry, a current detector 232, a polarity selector 216, and must be controlled by a controller 170 which is capable of interpreting sensor information and outputting appropriate command signals to the voltage level 165 and polarity 216 selectors.

One embodiment of a DC voltage supply sensor 160 appropriate for use in the power supply 114 of FIG. 4A is shown in FIG. 4B. The DC voltage supply sensor 160 comprises a rectifier 168 and a multiplier 172. The rectifier 168 comprises a clockwise forward parallel circuit of gate controlled circuit elements which are optically coupled to a timing signal circuit. The gate controlled circuit elements are SCRs 176$a,b$. One possible advantage of SCRs over standard Schockley diodes is their latching property, which allows them to be off until switched on by supplying a voltage to the gate of the SCR 176. The SCRs 176$a,b$ are switched on in response to a trigger pulse and allow current to pass in their forward direction over the portion of the AC waveform which occurs after the SCRs 176 are switched on. The SCRs 176 will continue to pass current after the gate voltage is removed and until the applied AC voltage falls below their threshold conduction value, then they will switch off again.

The voltage level selector 165 comprises a timing circuit which chooses the trigger pulse to have a duration sufficient to allow the conducting SCR 176 to be activated. The clockwise forward parallel SCR circuit effectively comprises two rectifiers 168, arranged with opposing orientations, and thus the output voltage signal comprises positive and negative pulses. That is, each rectifier element, i.e., each SCR, produces at least part of a half-wave rectified voltage having a polarity that opposes a polarity of the at least part of the half-wave rectified voltage produced by the other rectifier element, e.g., the other SCR. In the embodiment shown, the SCRs 176a,b can be used to modulate the amount of power delivered to the voltage multiplier and hence the power and voltage available from the power supply 114.

The output from the rectifier 168 serves as an input for the voltage multiplier 172, which rectifies and multiplies the input. The multiplier 172 comprises two diodes 208a,b which are connected to the output of the rectifier 168, one able to pass current from the output and the other able to pass current into the output. The ends of the diodes 208a,b are attached to two capacitors 212a,b, and the ends of the capacitors 212a,b are connected to the neutral pin 171 of the AC input. The output voltage is taken to include both capacitors 212a,b between its pins. When the input signal is a positive voltage pulse, current flows through the forward diode 208a, onto capacitor 212a and out of the neutral pin 171 of the AC input, charging capacitor 212a. When the input signal is a negative voltage pulse, current flows through the reverse diode 208b, off of the capacitor 212b, and out of the neutral pin 171, thereby charging capacitor 212b. If the power available to the circuit is higher than it's power output, the capacitors 212a,b will be charged to give a combined output voltage of twice the voltage magnitude of the chopped AC input signal. If necessary, the output voltage can be stepped up further by applying the output of the voltage multiplier to another pair of capacitors, however, the current available is limited by the power input by the rectifier.

In one version, the current detector 232 comprises a resistor in the DC output line which, when current is passed through it, has a voltage that is optically coupled to a photo-transistor (not shown). The photo-transistor passes voltage when light is applied and outputs a voltage signal which is related to the current flowing between the terminals of the electrodes 106,108. This signal is sent to the controller 170, which is capable of interpreting the input and signaling the timing circuit of the voltage level selector 165 to control the current supplied to the cell 102.

The timing of the trigger pulse supplied to the rectifier 168 affects the output voltage of the DC power supply and is supplied by the voltage level selector 165. In one version of the power supply 114, the voltage level selector 165 comprises a zero crossing detector (not shown), a capacitor & switched resistor network (not shown) and a timer (not shown). The zero crossing detector is connected to the AC source and outputs a pulse every time it sees the AC source pass through zero volts. The capacitor and resistor circuit defines an RC time constant, and has a resistance which is adjustable by the controller 170, making the time constant adjustable. The timer reads and combines the pulsed output of the zero crossing detector with the time constant of the capacitor and resistor circuit into an effectively timed trigger pulse output. A commonly available chip called a 555 is a suitable timing chip.

Fluid treatment systems 100 having two cells 102a,b as shown in FIG. 12, require the controller 170 to be capable of sensing and controlling power supplied to both cells 102a,b. When one power supply 114 is used to operate two cells 102a,b, the cells 102a,b may be supplied with the same magnitude of voltage. However, the polarity selector 216 allows for the cells to be run with opposite polarities, that is, one cell in treatment mode while the other cell is in regeneration mode. In one embodiment, the polarity selector 216 comprises a double-pole double-throw relay switch.

In one embodiment, load on the power supply 114 is decreased, in multi-cell operation, by providing a separate power supply 114a,b for each cell 102a,b. In versions of the fluid treatment system 100 having more than one power supply 114, the controller 170 is configured to control the power supplies 114a,b separately.

In one embodiment, longevity of the system 100 can be increased by providing two different power supplies, one to drive the cells in the forward direction for fluid treatment and one to drive the cells in the reverse direction during regeneration. Moreover, since the fluid exiting the regenerating cell is discarded, the regeneration power supply voltage does not need to be finely controlled and adjusted. Thus, the design parameters on the regeneration power supply are relaxed and a cheaper, dirtier DC power supply may be provided for regeneration.

Sensors

The ion exchange apparatus 100 typically comprises one or more sensors 160 to sense a property of a component of the apparatus 100, or to detect an event or measure a property. The sensors 160 can be of different types, such as a flow sensor, pressure sensor, ion conductivity sensor or a temperature sensor. The controller 170 receives signals from the sensors 160 through line 174 connecting the sensors 160 to the controller 170, and may use these signals to generate control signals for the power supply 114. For example, the microcontroller 152 of the controller 170 may also generate the polarity selection signal in response to signals from the sensor 160. In another version, the controller 170 may use a combination of signals, such as those generated by the power supply 114 and the sensor 160, to generate a series of control signals for the power supply 114. As one example, the controller 170 may generate a time-constant selection signal and a polarity selection signal that evolve in time in response to conditions in the apparatus 100 sensed by the sensor 160 and conditions in the power supply 114 or the apparatus 100 communicated by the power supply 114 to the controller 170, for example, communicated by the current detection signal.

A sensor 160 comprising a fluid flow sensor 204 can be positioned along the fluid stream 125. In one embodiment, a suitable fluid flow sensor 204 comprises a turbine 143 that is oriented to rotate or otherwise move with the fluid stream as shown in FIG. 5. In the version shown, the turbine 143 comprises a rotor 205 having a spiral blade that wraps around an axle which is suspended between two bearings 207. The axle 209 is held in a fixed orientation in the pipe by arms (not shown) which extend from the interior wall of the pipe and are attached to the bearings 207. The spiral blade 206 can be at least two blades 206 which are integrally attached to the rotor 205 along arcuate joints such that the blades 206 are not flat but wrap around the body of the rotor 205 and have a pitch. The bearings 207 are contoured in a conical shape to allow the fluid stream to be deflected by the exterior surface of the cone to be directed towards the spiral blades 206 of the turbine 143. The turbine 143 also comprises a magnet 208 which is embedded in the rotor 205 and is oriented such that a line joining the magnet's north and south poles lies approximately perpendicular to the rotor's axis of rotation. The rate of rotation of the rotor 205 and the magnet 208 is proportional to the rate of rotation of the blades 206 which is dependent on the fluid flow through the pipe. An electromagnetic sensor (not shown) is positioned on or embedded in the pipe wall adjacent to the rotor 205 and senses the frequency of oscillation of the magnetic field of the turbine magnet. The electromagnetic sensor (not shown) outputs a flow rate signal comprising a voltage to the controller 170. The output voltage of the sensor 204 is a function of the rotational frequency and hence is also a function of the rate of fluid flow through the output pipe 151. A suitable sensor is a Hall Effect sensor which outputs a voltage which oscillates with a frequency that corresponds to the rotational frequency of the turbine. While one type of flow sensor 204 is described, it should be noted that other flow sensor configurations are also possible.

The controller 170 uses the flow rate signal from the fluid flow sensor 204 to determine the flow rate of fluid passing through the pipes and the cells 102a,b, and this flow rate information can be used for a number of different purposes. For example, the controller 170 can use level of the flow rate signal to control the power supplies 114a,b to adjust the electrical power applied to the electrodes of the cells 102a,b. In this way, the voltage applied to the electrodes can be adjusted to achieve higher levels of microorganism deactivation, or to adjust the voltage power applied to the electrodes in relation to the rate of flow fluid through the cells 102a,b.

A sensor 160 that is a pressure sensor can also be provided to output a pressure signal to the controller 170 that is proportional to the pressure of the fluid in the apparatus 100. In use, when the pressure in the output pipe decreases, the controller 170 can switch on operation of the fluid treatment apparatus 100 to provide a treated fluid stream 125. However, when the output is closed, pressure builds up in the output and the controller 170 can switch off the operation of the electrochemical cell 102.

The sensor 160 can also be a conductivity ion sensor that measures directly or indirectly the concentration of ions in the fluid being treated by the ion exchange apparatus 100. The conductivity ion sensor can measure, for example, concentration, species, or ratio of concentrations of ions in the treated fluid. The sensor 160 may be placed at certain points in the fluid stream such as, for example, at the inlet 146 or outlet 148 of the electrochemical ion exchange cell 102, or at a combination of these locations or others. The ion conductivity sensor is also useful to determine and control total dissolved solids (TDS) concentration in the treated fluid stream 125. Alternatively, the conductivity ion sensor 160 can be an ion specific sensor that detects a particular ionic species, for example nitrate, arsenic or lead. The ion specific sensor can be, for example, ISE (ion selective electrode). Generally, it is preferred to place the conductivity ion sensor as far upstream as possible to obtain the earliest measurement. The earlier the sensor measurement can be determined in this embodiment, the more precisely the ion concentration of the treated fluid can be controlled. The microcontroller 152 of the controller 170 may generate a time-constant selection signal that is in relation to both signals from the power supply 114, such as the current detection signal, and a signal from the ion sensor, such as an ion concentration signal. The controller 170 can also control the power supply 114 to control an electrical power supplied to the electrodes 106,108 of the cell 102 in response to an ion concentration signal received from a sensor.

A sensor 160 comprising a temperature sensor can also be provided to sense the temperature of fluid and generate a temperature signal. The temperature sensor measures a temperature of fluid inside or outside the cell 102 and generates a temperature signal which contains information about the fluid temperature. The controller 170 receives the temperature signal and sets the magnitude of the current applied to the electrodes 106,108 in response to the temperature signal, in either or both of the deionization and regeneration cycles. For example, the controller 170 can instruct the power supply 114 to change the magnitude of the current by steps of, for example, at least about 20%. In one preferred version, the magnitude of the current is changed by at least about 20% for every 10° C. that the measured fluid temperature is above or below the temperature of 25° C. As an example, in response to a temperature measurement signal, the controller 170 can instruct the power supply 114 to reduce the current passed through the cell 102 from a first level to a second level that is at least about 20% lower than the first level when the fluid temperature is at least about 10° C. above 25° C. (room temperature). For example, the controller 170 can be programmed to reduce the current from the first to the second level when the temperature is at least about 45° C. The current may also be continuously reduced upon detection of a fluid temperature that is at least about 20° C. higher than room temperature. For example, the current may be continuously reduced in decrements of milliamps, until the desired second current level is reached. Advantageously, this method controls the temperature of the fluid treated in the cell 102 to ensure that the fluid is not heated to excessively high temperatures during deionization. It is useful particularly in drinking water applications where hot water output may be undesirable.

In an alternative version, the controller 170 sets the current passed through the cell 102 to maintain a prespecified fluid temperature. For example, this version may be useful when it is desirable to output warmer or cooler water from the cell 102. The controller 170 is programmed to adjust the level of current applied through the cell 102, for example, by increasing or decreasing the current, to control the fluid temperature. The current magnitude may be set in relation to the measured temperature in the cell 102 and/or the desired fluid temperature.

A suitable temperature sensor is a thermocouple or positioned in the fluid flow pathway or touching fluid tubing. The thermocouple can be a type J or K thermocouple. The temperature sensor can also be a thermistor, such as one constructed from sintered metal oxide in a ceramic matrix that changes electrical resistance with temperature.

Microorganism Deactivation

In one version of the present invention, the controller 170 sends a control signal to the power supply 114 to control the power output to the electrodes 106,108. The controller 170 is capable of controlling the power supply 114 to apply across the first and second electrodes 106,108, of the cell 102, current having a current density that is sufficiently high to deactivate microorganisms in the fluid stream 124 passing through the fluid passageway 144 of the cell 102. For a given flow rate, if the deactivation current is too low, the microorganisms present in the cell 102 and the input fluid retain their ability to multiply or replicate after the fluid passes through the cell 102 which is undesirable. However, the deactivation process is not just a function of the current passed through the electrodes 106,108, but rather the current density passing through the membranes 110 of the cell 102. It has been determined that low levels of current density will result in insufficient, or no, deactivation of microorganisms. However, excessively high levels of current density are not desirable because such levels result in the consumption of excessive electrical power, and can also damage the ion exchanging properties of the membranes 110.

Bacteriostasis within cell 102 is achieved when microorganisms, such as bacteria, are deactivated on the surfaces within cell 102. It results in the microorganism levels remaining the same, or even reducing in number, in the cell over time. One may obtain bacteriostasis without reducing the levels of active microorganisms as the input fluid passes through the cell. A bacteriostatic cell or system will not exhibit an increase in bacteria in water passing through it over a span of time, for example over many weeks or months. A non-bacteriostatic cell will grow bacteria on its internal surfaces, which is then sloughed-off the surfaces and added to the fluid as it passes through the cell. With time, the concentration of bacteria increases within the cell, resulting in an increase in bacteria levels in the treated water over the time span. Thus, preferably, a current having a sufficiently high current density to result in bacteriostasis of cell 102, that is deactivation of microorganisms on the internal cell surfaces, is applied across the first and second electrodes 106,108 by the power supply 114, which is controlled by the controller 170. The current density of the current applied through the fluid is sufficiently high to cause bacteriostasis such that over a period of time in use, the output fluid from the cell 102 comprises a level of microorganisms which remains constant or is reduced.

It is further advantageous to deactivate microorganisms in incoming water, for example, the levels of bacteria or virus, as water passes through the cell 102. In this example, the first level of a microorganism in the input fluid is reduced to a second level in the output fluid which is, for example, at least about 90% lower than the first level, or even at least about 99%, 99.99%, or 99.9999% lower. For example, the first and second levels can be levels of $E.\ coli$ bacteria, MS-2 virus, or other microorganisms.

A common method of determining active bacterial number is a viable plate count method. In this method, a sample of the fluid in which bacteria or other microorganisms is to be counted is diluted in a solution that will not harm the microbe, yet does not support its growth so they do not grow during the analysis. For example, a volume of fluid sample is first diluted 10-fold into buffer and mixed thoroughly. In most cases, a 0.1-1.0 mL portion of this first dilution is then diluted a further 10-fold, giving a total dilution of 100-fold. This process is repeated until a concentration that is estimated to be about 1000 bacterial cells per mL of fluid is reached. In the spread-plate technique, the highest dilutions having the lowest bacterial density are then spread with a sterile glass rod onto a solid medium, such as agar for hetrotrophe bacteria, that supports the growth of these microbes. The liquid spread onto the plate should soak into the agar to prevent left over liquid on the surface from causing colonies to run together. The need for dry plates typically restricts the spreadable volume to 0.1 mL or less. A second method for counting viable bacteria is the pour plate technique, which consists of mixing a portion of the dilution with molten agar and pouring the mixture into a petri plate. In either case, sample dilution is high enough that individual cells are deposited on the agar and these give rise to colonies. By counting each colony, the total number of colony forming units (CFUs) on the plate is determined. By multiplying this count by the total dilution of the solution, it is possible to find the total number of CFUs in the fluid sample, which can be an input fluid sample or an output fluid sample.

In one example, the first and second levels are defined as colony forming units per 100 mL of fluid. In one version, the controller 170 sets the current density to obtain a second level of comprises fewer colony forming units per 100 mL of the output fluid than the first level of colony forming units per 100 mL of the input fluid. The current density is sufficiently high to substantially prevent an increase in the colony forming units per 100 mL in the output fluid. As another example, the controller 170 controls the power supply to apply to the first and second electrodes 106,108, a current having a current density that is sufficiently high to provide an output fluid having a second level of colony forming units per 100 mL that is at least about 90% lower than the first level of colony forming units per 100 mL of the input fluid.

The first and second levels of active microorganisms can also be defined as heterotrophe bacteria plate counts. While bacteria can be heterotrophe, that is carbon feeding, they can also be other types, such as sulfur feeding. Heterotrophe bacteria plate counts are used to count active bacteria which feed on carbon. When the input fluid comprises a first level of a microorganism comprising a heterotrophe bacteria plate count of at least about 500 Cfu/mL, the controller 170 sets the current density sufficiently high to provide an output fluid having a heterotrophe bacteria plate count of less than about 450 Cfu/mL. The controller 170 can also control the power supply 114 to apply to the first and second electrodes 106,108, a current having current density sufficiently high to provide an output fluid having a heterotrophe bacteria plate count which is at least 50 CFU/mL lower than the heterotrophe bacteria plate count of the input fluid. In one version, the controller 170 sets the current density sufficiently high to provide an output fluid having at least one log reduction of bacteria plate count for a fluid residence time of at least 0.05 minute, or even a two log reduction of bacteria plate count.

Referring to the exemplary cells shown in FIGS. 3A and 3B, the electrode 106 in these cells 102$a,b$ has an exposed area $A_{E1}$ that is exposed to the fluid stream 124 in the cell, the second electrode 108 has an exposed area $A_{E2}$, and the membrane 110 has an exposed area $A_M$. In these cells, the exposed areas $A_{E1}$, $A_{E2}$, and $A_M$ are substantially similar to one another to provide a relatively easy average current density calculation. The average membrane current density for a given membrane wrap or layer is the total cell current divided by membrane area for that wrap or layer. The controller 170 controls the power supply 114 to apply a current across the first electrode 106 to provide an average current density selected in relation to any one or more of the exposed areas $A_{E1}$, $A_{E2}$, or $A_M$. Another way of describing the cell bacteriostatis or microorganism deactivation parameters is through use of an electric potential drop. The current applied to the electrodes 106,108 passes through the fluid to form an electric potential drop across the membranes 110 in the fluid. The electric field generated by the potential drop is perpendicular to the plane of the membranes 110, and a normalized electric potential drop based on the number of membranes 110 between the electrodes 106,108 can be used to get a measure of the voltage applied across a stack of membranes 110.

In the cylindrical cell 102 shown in FIGS. 2B and 2C, for a given electric potential difference applied to the electrodes 106,108, the current density and electric field both gradually increase in the direction of the inner electrode 108 because it is smaller in diameter than the outer electrode 106. In this cell 102, the first electrode 106 has an exposed area $A_{E1}$ that is exposed to the fluid stream 124, the second electrode 108 has an exposed area $A_{E2'}$, and the membrane 110 has a range of exposed areas $A_{M'}$ relevant to the calculation of current density because a typical device will employ multiple layers of membrane between the electrodes 106,108. The exposed areas $A_{E1}$, $A_{E2}$, and $A_M$ are different from one another, because the electrodes 106,108 and membrane 110 each have different shapes. Thus, the current density in the fluid and electric potential drop with respect to the membranes is selected as the smaller of the values calculated from the membrane layer adjacent to the two electrodes 106 and 108. The controller 170 controls the power supply 114 to apply a current across the electrodes 106,108 which has an average electric field flux substantially perpendicular to the membrane surface. For a spiral cell such as cell 102, the membrane area used to calculate current density is the outermost layer's area. Of course for a plate and frame cell constructed from multiple membrane layers all having the same surface areas, the calculation of current density is straightforward.

Based on these observations, a preferred range of average current density for cells 102a and 102b is from about 0.01 to about 20 mA/cm$^2$ or even from about 0.01 to about 10 mA/cm$^2$. A suitable current density for a spiral wrapped membrane cell is about 0.2 to about 10 mA/cm$^2$. A suitable average electric potential drop per membrane layer is from about 0.05 to about 20 V per membrane layer. More preferably the electric potential drop is from about 0.5 V to about 10 V per membrane layer. As an example, for cell 102 shown in FIG. 2A, the current passed through the electrodes 106,108 may be from about 0.1 to about 4 amps during the operation of a cell having a height of 15 cm. In this cell, the innermost cartridge membrane area is about 200 cm$^2$ and the outermost membrane area is about 500 cm$^2$. The current density is calculated from the larger of these two areas, or 500 cm$^2$, and the range of current densities is found to be 0.2 mA/cm$^2$ at the low end, and 8 mA/cm$^2$ at the upper end.

The selected levels of current density applied though the first and second electrodes 106,108 to the fluid in any of the cells 102 results in bacteriostasis or a reduction in the concentration of active microorganisms, which include microbes such as bacteria and virus, in the fluid stream 124. Deactivation is a state in which the microorganisms are unable to replicate thereby effectively neutralizing their harmful effects in living creatures. Deactivation does not necessarily mean that microorganisms are removed from solution or that all are killed in the cell. However, deactivation is sufficient for disinfecting the fluid stream 124, because it prevents the microorganisms from replicating and hence causing disease.

Antimicrobial Cells

The fluid being treated electrochemically can also be exposed to an antimicrobial agent in an antimicrobial cell 177a to further increase the disinfection levels obtained in the output fluid. The antimicrobial cell 177a can be positioned before the electrochemical cell 102 (as shown), after the cell 102, in the cell 102 itself, or placed along the pathway of a small diverted fluid stream. The antimicrobial cell 177a is used to exposed the fluid, or add to the fluid, to an antimicrobial agent via a source of an antimicrobial agent, to further increase the disinfection levels obtained in the output fluid. The antimicrobial agent reduces the level, prevents the growth, or limits reproduction of microbes. Microbes are microorganisms and minute life forms that include, for example, bacteria, viruses, parasites, cysts, fungus, mildew, mold and spores. The antimicrobial agent can be one or more of antibacterial, antiviral, antifungal, antiparasitic, immunotherapeutic, antibiotic, chemotherapeutic and other agents. The antimicrobial agent should have selective toxicity, i.e., that the agent should inhibit reproduction of or kill microbes without releasing hazardous compounds into the treated fluid.

The antimicrobial cell 177a can be a drip system (not shown) that adds the antimicrobial agent to the fluid as it passes through an electrochemical cell 102 itself or through an antimicrobial cell 177 which is connected to an electrochemical cell 102. In one example, the drip system comprises a fluid dripper to drip an antimicrobial fluid containing antimicrobial agent into the fluid as it passes through the cell 177a. The fluid dripper comprises a container which contains a volume of replaceable antimicrobial fluid, and which can be connected by a pipeline to the fluid line through which the treated or untreated fluid is passed. A flow control valve (not shown) that can be placed in the pipeline to control the flow from the fluid dripper into the pipeline. In one example, the antimicrobial fluid comprises sodium chloride or chlorine. The drip exposure should add fluid containing antimicrobial agent in a concentration that is sufficiently high to allow disinfection of a fluid which is passed through the system at a flow rate of at least about 2 L/min.

In the example shown in FIG. 11B, the drip system 227 includes an angled pipeline 246 that diverts a small amount of the fluid stream into the cell 233. The diverted fluid dissolves a small fraction of the antimicrobial particles, such as the sodium chloride particles, contained in the cell 233. A suitable antimicrobial cell 233 is entirely filled with granular particles 247 of a suitable halide salt, such as sodium chloride, and a fraction of the fluid stream is diverted into the cell 233 to at least partially dissolve the halide salt to form halide ions, for example, chloride ions from the chloride salt. The antimicrobial particles can also comprise, for example, a compound containing an antimicrobial agent, such as sodium chloride salt to release chlorine ions into the fluid as it passes through the cell 233. The antimicrobial particles can also be encapsulated in a slow or sustained release material such as a coating which slowly releases chlorine ions into the fluid. The diverted fluid is returned to the fluid stream through a control valve 234 which controls the rate at which fluid flows through the drip system 227 and hence the dosing of the antimicrobial solution 229 and antimicrobial particles 247 into the fluid stream.

Other drip systems include micro valve systems which employ a micro valve with a fine capillary to continuously release a very small dose of the antimicrobial agent into the fluid stream. Still another drip system comprises a capillary tube or ventura orifice that also slowly releases the antimicrobial agent into the fluid stream.

The antimicrobial particles can be generated from a source of antimicrobial agent, for example, a compound containing an antimicrobial agent, such as sodium chloride salt to release chlorine ions into the fluid as it passes through the cell 177. The antimicrobial particles can also be encapsulated in a slow or sustained release material such as a coating which slowly releases chlorine ions into the fluid.

In yet another example, the antimicrobial cell 177a contains antimicrobial agent suspended in an antimicrobial membrane (not shown), such as a semi-permeable membrane or porous filter. The antimicrobial membrane is suspended in the cell 177a so that the fluid traverses the cell 177 passing across the membrane surface. In doing so, the fluid captures a small portion of the antimicrobial material trapped within the membrane. As one example, a suitable antimicrobial material can be entrapped in a polymer membrane during manufacture of the polymer membrane. Suitable polymers that can serve as the medium for a membrane containing antimicrobial agent include polyamides, acrylics, polyvinyl chloride, polymethyl methacrylates, polyurethane, ethyl cellulose, and nitro celluloses. The antimicrobial agent can ionically bond to, or be entrapped by, a crosslinked polymer network. The antimicrobial compound should be uniformly and homogeneously mixed with the membrane polymer precursor material. Mixing may be accomplished by mixing powders of the polymer precursor and the antimicrobial material in a shear mixer. The powders may also be dispersed in a suitable solvent and then coated or dried to form a solid powder. Suitable solvents include alcohol/water mixtures and can also include surfactants, peptizers and dispersion aids. The antimicrobial agents should be resistant to the temperature and pressure applied to the membrane during membrane fabrication.

In another version, the antimicrobial agent is added to the ion exchange or water-splitting membrane 110 itself so that the fluid is exposed to the antimicrobial agent while passing through the electrochemical cell 102. This system avoids having separate cells 177a,b for the antimicrobial agent. In one version, such a membrane 110 is fabricated by adding antimicrobial agent to the membrane 110 after it is fabricated and textured. For example, an antimicrobial agent can be added to the mix of cation and anion exchange materials that are mixed in a tank before being pressed or rolled into a water-splitting membrane 110. The cation and anion exchange materials can be powders which are mixed with the antimicrobial agent in a shear mixer to form a homogenized mixture of powders. The antimicrobial agent can also be dispersed in a suitable solvent such as alcohol, water, surfactants, peptizers, dispersion aids and their mixtures; and then coated onto other matrix particles or dried to form a mixed powder. The mixed powder is then fabricated into a membrane by heat treatment and pressure in a roller system. The antimicrobial agent can also be added to a membrane 110 by dipping a prefabricated water-splitting membrane 110 in a solution containing the antimicrobial agent or spraying a solution of the agent on the membrane as it passes through fabrication rollers. The highly porous and permeable membrane 110 absorbs the agent in its surface and internal pores. Application of the antimicorbial agent after the fabrication of the membrane 110 also reduces the likelihood of the agent becoming ineffective by exposure to heat, pressure or other membrane manufacturing conditions. The antimicrobial agents exchange or are released during passage of the fluid through the electrochemical cell 102 containing the modified antimicrobial water-splitting membrane. Long chain hydrophilic polymers which are incorporated in the membrane 110 can also adsorb water molecules and facilitate the ion exchange. The antimicrobial agent should be present in the membrane 110 in a concentration sufficiently high to allow disinfection of fluid passing through the cell at a flow rate of at least about 2 liter/minute. Textured membranes containing antimicrobial agents are expected to provide better disinfection than non-textured membranes because of the larger surface area of these membranes.

The antimicrobial membranes 110 can also include nanomaterials, which have dimensions on the order of nanometers, and which remove or deactivate microorganisms. For example, ceramic nanofibers can be added to the membranes to filter out contaminants. Alumina nanofiber filters having a positive charge that attracts negatively charged germs from the fluid and retains the same on the filter surfaces are made by Argonide, Sanford, Fla. Nanoscale polymer brushes coated with molecules can be used to capture and remove poisonous metals, proteins and germs, and these materials are made by eMembrane, Providence, R.I. Nanocolumns of titanium oxide can also be used to remove microbes.

The above described apparatus and methods for incorporating an antimicrobial agent into the apparatus 100 or electrochemical cell 102 itself, to treat the incoming fluid stream to remove or deactivate microbes, can be implemented using one or more of many different antimicrobial agents. Examples of suitable antimicrobial agents include inorganic compounds, naturally occurring or synthesized organic compounds, and pharmaceutical compounds. Several examples of these compounds are listed herein, however, it should be understood that the listed compounds are merely illustrative examples, and the present invention should not be limited to these examples but instead includes all other antimicrobial agents as would be apparent to those of ordinary skill in the art.

Various halogen-containing compounds and strong oxidizers are also effective antimicrobial agents which can be incorporated into the apparatus and methods described herein. For example, halogen disinfectants such as sodium hypochlorite, operate as effective antimicrobial agents. Antimicrobial agents that become effective when treated in and electrochemical cell include chloride-ion containing compounds such as sodium chloride which can be dissolved into fluid such as water from granular salt particles added to a container as described herein. In one version, the antimicrobial cell 177a comprises a halogen-ion containing cell that includes a container containing a halogen-containing compound, such as sodium chloride in granular form or saturated sodium chloride solution in a drip system. It should also be noted that chloride ions are also often present in city water supplies in quantities effective for increasing the antibacterial effect of the electrochemical cell operated at a particular electrochemical current flux. The concentration of the chemical ions in the fluid or membrane multiplied by the residence time taken by the fluid to traverse through the antimicrobial cell or membrane, determines the disinfection rate. In one example, the halide ion, such as a chloride ion is added to the fluid in a concentration of at least about 15 ppm, or even at least 60 ppm or even at least 100 ppm.

Other halogen compounds can also be used as antimicrobial agents. For example, the antimicrobial agent can also be a halogen-amine, such as for example, N-halamine. N-halamine resin beads are commercially available from HaloSource under the tradename HaloPure®. The N-halamine comprises amine groups joined to halogen such as chlorine. Some examples include amide halamine, imide halamines, and amine halamines. Examples of N-halamine disinfectants include 1,3-dichloro-2,2,5,5-tetramethylimidazolidin-4-one and 1-chloro-2,2,5,5-tetramethylimidazolidin-4-one. Another type of halogen-amine compound comprises chloramines, which produce fewer chlorinated organic compounds than free chlorine, and consequently, are more long term and stable in the cell 102. In one version, the antimicrobial membrane comprises chloramines suspended in a fine mesh of carbon. As a fluid, such as water, passes through the membrane it is exposed to chloramines to kill or deactivate microbes in the fluid. The halogen-amine or N-halamine can be provided from a halogen-amine or N-halamine cell which is based on the drip system described above.

In another example, an iodinated ion exchange resin, which can be a cationic or anionic resin, can also be used to form the membrane. The resin is heavily charged with elemental iodine and as water passes over the iodinated resin, it provides a programmed release of iodine that creates a fixed concentration in the treated water. Iodinated resins are highly effective biocide agents which kill or inactivate most waterborne microorganisms, including bacteria, parasites and viruses. Iodinated resins allow for a low residence of fluid through the cell because water only needs to be exposed to the resin for a short time period to become effectively disinfected. Thus, iodinated resins allow a high flow rate of fluid through the cell. Iodine is also environmentally friendly because it has a low electromotive force potential with organic materials. Iodine is also less inclined than other halogens to form dangerous organic complexes, the principal by-product being iodide salt, which is easily extracted from the treated water if desired. The iodated resin can be fabricated to provide a desired fixed-rate release of iodine into the fluid. When exposed to water laden with negatively charged particles, including most microbes, some iodinated resins will compensate by displacing slightly greater amounts of iodine into the contaminated water. This resin can also be combined with activated charcoal resin and used in the cell itself, for example as a liner of cell walls, or even as a spacer separating the membranes. The activated charcoal resin also removes chlorine from incoming water to prevent chlorine reaction with iodine. Iodinated resin membranes are particularly useful for emergency water purification.

A strong oxidizer can also act as an effective antibacterial agent. In this version, the antimicrobial cell 177a includes a container containing an oxidizer present in compound form, by itself or in the presence of a catalyst or other energizing source. For example, adding small amounts of an oxidizer such as hydrogen peroxide, 202, by itself to the fluid or water flowing through the cell 102 can be used to further purify the fluid. In this example, the oxidizer cell includes a container containing hydrogen peroxide. The oxidizer cell that also include a container containing $H_2O_2$ combined with colloidal silver (that serves as an antimicrobial catalyst) to provide good disinfection. Chemicals present in the water are oxidized by $H_2O_2$ and microorganisms are killed by the increased oxygen level.

Inorganic materials containing metal ions that have antimicrobial properties include metal ions of silver, copper, nickel, zinc, tin and gold. These metals can be provided in the apparatus in the form of metal colloids, metal salts, metal anhydrides, and antimicrobial metal-ion exchange materials. The metal ions perform ion exchange with counter ions in the fluid which are part of the microbe in the fluid, thereby inactivating or destroying the microbe. Metal ions upon contact can also disrupt electron transfer and respiration within the cells of a bacteria.

Silver ion is a particularly effective antimicrobial agent. As one example, antimicrobial agent comprising silver ion maintained in a controlled release matrix can be added to a membrane 110 during the fabrication process. For example, an antimicrobial membrane can comprise silver ion incorporated in a membrane 110 which serves as a carrier. The ion exchange material is compatible and may even be synergistic with the electrically accelerated ion exchange process and ion migration occurring in the electrochemical cells 102. Further, the high surface area of the membrane 110 would increase the effective surface area of silver ions exposed to fluid providing better disinfection. Since the electrochemical cell 102 is already operated to provide a degree of disinfection or microbe deactivation, addition of controlled release or exchange of silver ions could substantially increase beneficial disinfection properties.

Silver ions are also effective against a broad spectrum of microorganisms that cause odor, discoloration, bio-fouling, and other aesthetic problems. When silver ions contact bacteria and other microbes, they disrupt electron transfer and respiration within the cells. Further, the silver ions are not toxic to humans and animals and can be tailored to provide controlled release to allow continuous antimicrobial protection. The silver ion containing matrix can be incorporated directly into the membranes by mixing with the membrane material. The silver ion matrix can also be used in antimicrobial tubing, such as rigid polyethylene tubing, which is used to connect the valve(s) 118, electrochemical cells 102 and other components. The antimicrobial tubing inhibits microbial colonization on the inside surface of tube to prevent the formation of algae, slime or mold, on the tube walls.

The antimicrobial membrane or particles can comprise silver ion incorporated in a ceramic matrix which is inert and serves as a carrier as described below. One type of antimicrobial membrane comprises silver ion adsorbed on the surface of a layer of zeolite which operates by exchanging silver ions with counter ions found in the fluid. Zeolite is a hydrated alumino-silicate mineral with an "open" structure that can accommodate a variety of positive ions, such as for example, silver ion, which is rather loosely held and can readily be exchanged for other ions in the fluid passing in contact with the structure. Common mineral zeolites include analcime, chabazite, heulandite, natrolite, phillipsite, and stilbite; and an exemplary formula is for natrolite is $Na_2Al_2Si_3O_{10}-2H_2O$. Zeolites have unique crystalline structures comprising interconnected internal pores with controlled diameters on the order of nanometers or less. Ion exchange requires charge neutrality at the surface of the zeolite, and the silver ions are not released unless a cation is present for exchange. Thus, when the surface of such a membrane is wet, the zeolite-containing surface becomes active to release silver ions to an antimicrobial concentration, then it turns off reserving the silver reservoir when it is dry. A suitable silver ion in a zeolite matrix is commercially available under the trade name AgION™. The AgION antimicrobial compound works proactively against a broad spectrum of bacteria, fungi and other microbes, and have been proven to reduce bacteria on the treated product by as much as 99.999%, or 5-log reduction.

Another type of antimicrobial membrane comprises silver ion in a ceramic matrix comprising zirconium phosphate. The zirconium phosphate has a three-dimensional layered structure with silver atoms lying in between the layers. The silver is released from the layers by ion exchange with ambient ions; however, because the ion exchange can only occur at the edges of the layers, it provides controlled release kinetics. A suitable zirconium phosphate-based resin containing silver is AlphaSan® which can be obtained from Milliken & Company, of Spartanburg, N.C. Yet another type of antimicrobial membrane comprises silver ion in a matrix of phosphate glass. A mixture of such glass and silver is ground and then blended with plastics or coatings. When the glass dissolves in a slightly acidic solution, silver ions are released to provide an antimicrobial effect.

The antimicrobial membrane can be also be made using metal ion-exchange materials which have been exchanged or loaded with antimicrobial ions. Suitable metal ion-exchange materials include zirconium or phosphate compounds such as zirconium phosphates, sodium zirconium hydrogen phosphates and metal hydrogen phosphates. Various minerals are also antimicrobial and these include zeolites, clays such as montmorillonite, porous alumino-silicates, and magnesium silicates. The antimicrobial agent can have an active antimicrobial composition that is selected from a wide range of known antimicrobials, and suitable materials are disclosed in, for example, "Active Packaging of Food Applications" A. L. Brody, E. R. Strupinsky, and L. R. Kline, Technomic Publishing Company, Inc. Pennsylvania (2001), which is incorporated by reference herein in its entirety.

Certain metal compounds can also be effective antimicrobial agents as well as sediment forming agents. For example, inorganic compounds such as calcium and magnesium serve as buffering agents which assist in the formation of sediment flocs or foam which can be removed from the fluid. High concentrations of magnesium, for example, placed in a layer in the cell, can also inhibit the growth of the fungus, such as *aspergillus*, titanium dioxide and titania ceramics are also useful for water purification, anti-viral and bacteriacidal coatings. Copper sulfate is another good antimicrobial agent that can be used in some membranes form in small enough doses not to affect the health of a person drinking treated water from the apparatus.

Organic compounds, which can be naturally occurring or synthesized substances, can also serve as antimicrobial agents. For example, benzoic acid, $C_6H_5COOH$, and its salts, inhibit the growth of mold, yeast, and some bacteria when it is either added directly or created from reactions with its sodium, potassium or calcium salt. As another example, sorbic acid, $C_6H_8O_2$, a natural organic compound isolated from the unripe berries of the rowan Sorbus aucuparia, and its salts, such as sodium sorbate, potassium sorbate and calcium sorbate, are antimicrobial agents often used to prevent the growth of mold, yeast and fungi. The salts are preferred over the acid form because they are more soluble in water. The optimal pH for the antimicrobial activity is below pH 6.5 and sorbates are generally used at concentrations of 0.025% to 0.10%. As another example, allicin, which is a natural extract from garlic is a powerful antibiotic and anti-fungal compound. Other synthesized organic compounds that can serve as antimicrobial agents include, thymol and triclosan. Thymol is a monoterpene phenol derivative of cymene, $C_{10}H_{13}OH$, isomeric with carvacrol and found in oil of thyme, which kills fungal spores and mould. Triclosan is a chlorinated aromatic compound which has functional groups representative of both ethers and phenols, and which is a anti-bacterial compound. Triclosan is slightly soluble in water, but soluble in ethanol, diethyl ether, and stronger basic solutions such as 1 M sodium hydroxide. Triclosan appears to kill bacteria mainly by inhibiting fatty acid synthesis because it binds to bacterial enoyl-acyl carrier protein reductase enzyme (ENR), which is encoded by FabI.

Pharmaceutical compounds that can serve as antimicrobial agents include antibiotics and antiviral agents. In one version, the antimicrobial agent is a pharmaceutical, which may be antibiotic. The electrochemical membrane or another membrane in a separate cell, can incorporate the antibiotics within the membrane structure when they are added to the membrane by dipping the membrane into a solution tank and then drying, or incorporated into the membrane matrix itself during its fabrication. In one version, the antimicrobial agent added to the membrane 110 comprises an antibiotic that has a cidal or killing effect, or a static or inhibitory effect, on a range of microbes. The range of microorganisms affected by an antibiotic is expressed as its spectrum of action. Broad spectrum antibiotics are effective against procaryotes and kill or inhibit a wide range of Gram-positive and Gram-negative bacteria. Limited spectrum antibiotics are effective mainly against either Gram-positive or Gram-negative bacteria.

Suitable antibiotics are the tetracyclines, chloramphenicol, the macrolides (e.g. erythromycin) and the aminoglycosides (e.g. streptomycin). Generally, tetracyclines are broad-spectrum antibiotics with a wide range of activity against both Gram-positive and Gram-negative bacteria, and are natural products of *Streptomyces*. Tetracycline, chlortetracycline and doxycycline are the best known, and include chelocardin. Chloramphenicol which is a protein synthesis inhibitor having a broad spectrum of activity and which exerts a bacteriostatic effect against intracellular parasites such as the rickettsiae. Chloramphenicol inhibits the bacterial enzyme peptidyl transferase to prevent the growth of the polypeptide chain during protein synthesis. Cephalolsporins are beta lactam antibiotics produced by species of *Cephalosporium*, and they have a low toxicity and a broader spectrum than natural penicillins. Monobactams are particularly useful for the treatment of allergic individuals. Carbapenems can also be used. Bacitracin is a polypeptide antibiotic produced by *Bacillus* species. Cycloserine inhibits the early stages of murein synthesis where D-alanyl-D-alanine is added to the growing peptide side chain. Glycopeptides, such as the antibiotic vancomycin, appear to inhibit both transglycosylation and transpeptidation reactions during peptidoglycan assembly.

Erythromycin is active against most Gram-positive bacteria, *Neisseria*, *Legionella* and *Haemophilus*, but not against the Enterobacteriaceae. Lincomycin and clindamycin are a miscellaneous group of protein synthesis inhibitors have an activity similar to the macrolides.

Aminoglycosides are products of *Streptomyces* species, such as streptomycin, kanamycin, tobramycin and gentamicin. These antibiotics exert their activity by binding to bacterial ribosomes and preventing the initiation of protein synthesis. Aminoglycosides have been used against a wide variety of bacterial infections caused by Gram-positive and Gram-negative bacteria. Kanamycin, gentamicin and tobramycin have a bactericidal effect because they provide cytoplasmic accumulation which can be lethal to the cells, and can be used to treat *Pseudomonas* infections. Amoxycillin and Ampicillin have broadened spectra against gram-negatives and are effective orally. Methicillin is penicillinase-resistant. Clavulanic acid is a chemical sometimes added to a semisynthetic penicillin.

Cell membrane inhibitor antibiotics operate by disorganizing the structure or inhibit the integrity of the cytoplasmic outer membranes of the bacteria. One example is polymyxin, produced by *Bacillus* polymyxis, which is effective mainly against Gram-negative bacteria and is usually limited to topical usage.

The antimicrobial agent can also be an antiviral agent which destroys or inactivates viruses by suppressing their replication and, hence, their ability to multiply and reproduce. Suitable antiviral agents are described in, for example, *Antiviral Agents, Vaccines, and Immunotherapies*, Stephen K. Tyring, Marcel Dekker, 2004; and *Antiviral Drugs*, John S. Driscoll, Wiley, John & Sons, Inc. 2002; both of which are herein incorporated by example in their entireties. Suitable antiviral agents include protease inhibitors which is an antiviral drug used against HIV. Further examples include amantadine which is a synthetic drug that inhibits the multiplication of the influenza A virus; Rimantadine, also an anti-influenza A drug; and foscarnet a group of used to treat the symptoms of cytomegalovirus (CMV), which causes infection of the eyes.

In another version, the antimicrobial cell 177a can be an ultraviolet cell 242, as shown in FIG. 11A. Ultraviolet radiation 211 is also useful for biological disinfection because ultraviolet radiation 211 sterilizes water as it passes through it. UV light is absorbed by the proteins RNA and DNA in the membranes of microorganisms 213, and absorption of UV at high doses ultimately leads to the disruption of the membranes and death of the cell. At lower UV doses, absorption of UV by DNA can disrupt the ability of the microorganism 213 to replicate, resulting in inactivation of the microorganism 213 because it cannot replicate and hence cannot infect. Generally, more complex microorganisms 213 are more sensitive to UV inactivation. Thus, viruses are the least sensitive, then bacterial spores 214, and finally bacteria 231 are very sensitive. Protozoa, such as crytosporidium parvum and *giardia lamblia*, appeared to be insensitive to UV because of difficulty in penetrating the shell in their cyst or oocyst state, but once penetrated, are quite sensitive to UV radiation 211. Thus, disinfection by UV radiation 211 can now be extended to cover almost all pathogens.

Ultraviolet radiation 211 is light having wavelengths shorter than 400 nm. This range is subdivided into UVA (320-to-400 nm), UVB (280-to-320 nm), and UVC (200-to-280 nm). UVC which is also called "germicidal" radiation is absorbed by DNA causing genetic damage and the inactivation of bacteria and viruses. UV radiation 211 with wavelengths below 200 nm is absorbed by water and air and can only be transmitted in a vacuum, and thus, is called vacuum ultraviolet. UV cells are available from a number of suppliers for microorganism deactivation in small and large fluid treatment systems. UV radiation 211 is commonly generated by low and medium pressure mercury vapor lamps 237. Low-pressure mercury lamps generate UV radiation having a primary wavelength of 253.7 nm. Medium-pressure mercury lamps emit a wider range of 200 to 600 nm and with a higher power density.

The UV radiation 211 is delivered over a period of time into the fluid to inactivate the microorganisms 213. The UV light is effective only while an organism is exposed to it, and the E, UV irradiance level, in UV disinfection determines the level of disinfection. The desired E levels can be estimated from UV dose-response curves for various microorganisms 213, such as for example, the spore *Bacillus* subtillis or the virus MS2-phage. In a collimated beam apparatus, a concentrated suspension of the microorganism is seeded upstream of the UV antimicrobial filter and, after steady state is achieved, several influent and effluent samples are taken for plate counts. From the log inactivation achieved between influent and effluent samples, the UV dose can be obtained by reading off the UV dose corresponding to that log inactivation from the UV dose-response curve.

As fluid containing microorganisms 231 enter the ultraviolet cell 242 containing UV lamps 238, the fluid is exposed to varying irradiance levels from one or several lamps depending on its distance from the UV lamp 238. The exposure or residence time of the fluid depends on the specific path of the fluid through the reactor. Every organism that passes through this cell 242 should be exposed to at least some UV radiation 211. The UV irradiance delivered to the microorganism multiplied by the exposure time, in seconds, results in the UV dose offered to the organism. This dose then is measured, again, as $\mu W\text{-sec/cm}^2$ or mW-sec/cm2. Since a watt-second is a joule, the accepted unit for UV dose is mJ/cm2, although some use the equivalent unit mW-s/cm2. The measurement of UV dose involves all the factors that affect UV irradiance mentioned above. In order to maximize the dosage of UV radiation 211 to the microorganisms 231, in one version, the inner wall 239 is reflective to UV radiation 211. Typically, a dose of 30,000-40,000 $\mu W\text{-sec/cm}^2$ is required for disinfection.

By combining UV treatment with electrochemical treatment, the microorganism deactivation levels provided by the apparatus 100 can be significantly better than if the electrochemical cell 102 is used by itself. The UV cell 242 can be placed after the electrochemical cell 102a,b to treat the water which has already been deionized. For example, UV lamps 237 are prone to fouling with scale (eg. calcium carbonate) and dead microorganisms 243. The removal of particulate matter by the sediment filter 181 and calcium and carbonate by the activated carbon filter 187, and the substantial deactivation of microorganisms 213 in these cells and in the electrochemical cell 102, prior to water passing through the UV cell 242, will reduce the rate at which a UV lamp 237 fouls and thus requires cleaning or replacement. Thus, placement of a UV cell 242 after cells 102a,b will both allow the use of a lower cost, lower performance device for microorganism deactivation, and if placed downstream of the cells, will increase device life.

In another version, the antimicrobial cell 177b comprises an ozone treatment cell. Ozone can be used to disinfect the fluids by destroying microorganisms like Escherichi coli (*E. coli*), Cryptospondium, Poliovirus, *Giardia* muris and Girdia lamblia. Ozone inhibits growth, and causes the death, of gram negative and gram positive tested bacteria. It also removes iron, hydrogen sulfide and other contaminants from water. Ozone ($O_3$) is low molecular weight molecule composed of three oxygen atoms, which is an allotrope of oxygen ($O_2$). Ozone is a powerful oxidant and its chemical reactivity arise from its unstable electron configuration that seeks electrons from other molecules. During its reaction with other molecules, ozone is destroyed and the host is oxidized. Ozone ruptures bacteria's cellular membranes so that the microorganism cannot be reactivated. In water, oxidizing pollutants are oxidize by ozone at ambient temperatures without changing the pH of the water. This differs from other oxidizers such as chlorine, which require the use of caustic or lime to adjust the pH, thus altering overall water quality when byproducts are left in the water.

In a typical ozone cell, ozone or activated oxygen is bubbled through the fluid in the cell. Bubbling ozone through the fluid or water in the cell to maintain a dissolved ozone residual concentration of 0.4 ppm for a fluid residence time of minimum of 4 minutes can be used to provide disinfected drinking water. In one version, the ozone cell operates using ozone generated by accelerating electrons between two electrically charged plates in a process called "corona discharge." In another version, UV light is used to generate ozone by passing the UV light thorough ambient air in an ozone chamber where the UV light disassociates oxygen molecules, which then recombine as ozone molecules. A filter cell 177a can be used in conjunction with the ozone cell to remove destroyed microorganisms and matter to maintain stability and yield optimum water clarity.

The following examples demonstrate the efficacy of the microorganism deactivation and antimicrobial effects of the electrochemical cells 102 of the apparatus 100. However, the scope of the present invention should not be limited to the examples provided herein.

EXAMPLE 1

This example was conducted to determine the current levels at which the electrochemical cells 102 provided disinfecting and bacteriostatic properties in which microorganisms did not reproduce or grow in the cells 102 during deionization of fluid in the cells 102. It is believed that the microorganisms were deactivated or even killed because the acid and base produced at the two electrodes 106,108, and within each water-splitting membrane 110, created a hostile environment for the microorganisms. The bacteria count in the treated fluid stream 125 was measured by counting bacteria colonies after incubation in a nutrients. Heterotrophe bacteria are defined as those which feed on carbonaceous materials. At the selected current density levels, the heterotrophe bacteria plate count (HPC) was measured as service cycles over six weeks, as shown in FIG. 6. The first measurement was at 60 water treatment cycles, where each a cycle is one deionization cycle of 6 liters followed by a regeneration cycle. The apparatus 100 was operated at a rate of one cycle every two hours, which resulted in a HPC of only 10 Cfu (colony forming units) per milliliter which is a desirable low value. The subsequent three measurements were of the same order of magnitude with HPC's ranging from about 30 to about 60 Cfu/mL. The measurement of Cfu is imprecise, and thus, values within an order of magnitude of each other (eg. 1 to 10, or 10 to 100) are considered essentially the same. The last measurement, a value of 300 Cfu/mL recorded at cycle 550, occurred because the cell current was very low (~10 mA) due to an electrode failure. This demonstrates the importance of cell current density on bacteriostasis performance of the electrochemical cells 102. Municipal water systems having residual chlorine will have an HPC less than 500 Cfu/mL which can be met by the present electrochemical cells 102.

Thus, in one version, the controller 170 sets the current density in the cell 102 to prevent the heterotrophe bacteria plate count of water passing through the cell 102 to increase over periods of time, which results from the deactivation of microorganisms on the internal cell surfaces

EXAMPLE 2

The deactivation of *E. coli* bacteria and MS-2 virus as input fluid 124 passes through cell 102 as four flow rates are presented in FIG. 7. This data was obtained in the middle of a 6 liter deionization cycle with the apparatus 100, shown in FIG. 12 which has two electrochemical cells 102a,b, with each cell 102 comprising a cartridge 130 which is 25 cm tall and has an outer membrane area of 600 cm$^2$. The apparatus 100 was configured to process fluid, such as city water, to deionize and treat the water. The fluid treated was 750 ppm NaCl solution comprising E. coli and MS-2 virus, and the cell current during deionization increased from 0.1 amps at the start of the deionization cycle to about 1.0 amps at the end. Thus, the current density applied through the cell 102 was from 0.15 to 1.5 mA/cm$^2$. It was determined that the degree of microorganism deactivation increases as the flow rate decreases and the residence time of the fluid in the cell 102 increases. An unexpected and surprising level of disinfection of a three log (99.9%) reduction of bacteria and virus was obtained even at the highest flow rate examined, of 1.1 liters/min. An extraordinary level of disinfection of six log (99.9999%) reduction of both bacteria and virus was obtained at the lowest flow rate examined, namely, 0.060 liters/minute. The lowest flow rate is sufficient for EPA Purifier status and is practical for many applications. Thus, a current density of at least about 0.15 mA/cm$^2$ provided at least a six log reduction of microorganisms at 0.060 liters/minute or less, and even provided a three log reduction at less than 1 liter/minute using an apparatus as sized herein.

A doubling of the cell 102 height from 25 to 50 cm, while maintaining the same current density as for the collection of the data in FIG. 6, allows doubling of flow rate per cell 102. The residence time of fluid in the cell 102 which is the fluid volume of the cell 102 divided by the flow rate determines the level of disinfection obtained in the fluid stream. For example, a cell 102a as shown in FIG. 12, has a void volume of about 1 liter, so at that a fluid flow rate of 0.060 liters/minute, the residence time of the fluid in the cell 102 is about 17 minutes. As another example, at a flow rate of 1.1 liters/minute, the residence time is 0.9 minutes. Thus, it is desirable to control the residence time in the electrochemical cell 102 to provide the desired level of disinfection. Preferably, the fluid residence time is at least about 0.05 minutes, and more preferably at least about 0.3 minutes.

The controller 170 can also set the current density in relation to a predetermined level of microorganisms in the fluid being treated. For example, if the microorganism level is detected to be six log by the method, for example, of counting colonies after suitable incubation with an apparatus 100, then the current density level can be set to at least 0.1 mA/cm$^2$ at with a residence time of about 10 minutes. The current density can also be set in relation to a detected level of microorganisms in the treated fluid in order to adjust the current density and/or residence time (flow rate).

EXAMPLE 3

An electrochemical fluid treatment apparatus 100 comprising a pair of electrochemical treatment cells 102a,b, valve(s) 118, a power supply 114, controller 170 and tubing system and having no auxiliary filters or antimicrobial cells (such as 177a, 177b) was used to disinfect feed water having an incoming concentration of ATCC 25922 E. coli of 3-5×10$^7$ Cfu/100 mL. Feed water concentration were measured with 1:20000 and 1:400000 sample dilutions in sterile PBS (Hardy) plated on mFC Agar plates 100 mm (Bio-Media BM 3277). Plates were incubated for 24 hours at elevated temperature according to Difco Manual. Blue E. coli colonies were counted using hand held Electronic Colony Counter (Fisher 07-910-15).

Output water samples for E. coli count were collected for each run at the one liter point and at the five liter point of a six liter continuous sample for both cells of apparatus 100. Samples (100 mL) were collected in Corning Brand Coliform Sample Containers with Thiosulfate (Fisher 09 73091). Samples were assayed by membrane filtration method using Millipore Microfil Filtration System (MIAC 01P01) with 100 mL funnels with MICE membrane white 0.45 μL (MI-HAWG072) and mFC Agar plates 100 mm (Bio-Media BM 3277). Plates were incubated for 24 hours at elevated temperature according to Difco Manual. Blue E. coli colonies were counted using hand held Electronic Colony Counter (Fisher 07-910-15).

The disinfection level provided by the cell 102 was measured by the log reduction of E. coli as defined by the LOG10 of the ratio of the concentration of E. coli in the feed water (in Cfu/100 mL) divided by the concentration of E. coli in the product water. For example, if the initial concentration of E. Coli is 10$^7$ Cfu/100 mL and the final count was 10 Cfu/100 mL, the log reduction is 6.0.

In one experiment, product water was collected from apparatus 100 with two cells 102a,b, each having a height of about 15.6 cm, an inner diameter of membrane of about 3 cm, and an outer diameter of membrane of about 10 cm. Samples were collected under a range of voltage settings from 0 to 300 volts and a disinfection level of greater than 2 log reduction of E. coli was seen at a voltage of 50V, corresponding to 0.8V/membrane layer for a 60 layer spiral cell.

In this experiment the feed water contained 150 ppm of chloride ion, 150 ppm of sodium bicarbonate, and 150 ppm of magnesium sulfate. The measured conductivity was 850-890 μS/cm and the measured pH was 6.5. Results are shown below for the average log reduction for each condition.

| Voltage | Log Reduction at 0.25 liter/min Flow Rate | Log Reduction at 0.50 liter/min Flow Rate |
| --- | --- | --- |
| 0 | 0.5 | 0.2 |
| 50 | 3.7 | 2.8 |
| 150 | 4.5 | 3.3 |
| 300 | 6.2 | 5.1 |

EXAMPLE 4

The data from experiment in EXAMPLE 3 was plotted for all individual points obtained at the 1 liter point of a 6 liter sample from each cell 102 as shown in FIG. 8A, and at the 5 liter point of a 6 liter sample from each cell 102 as shown in FIG. 8B. The disinfection level as measured by log reduction increases with the current measured in the cell 102. Greater than 2 log reduction is obtained even at currents below 0.1 Amp DC corresponding to a current density of 0.2 mA/cm$^2$ at the outer diameter of the cell. The un-powered cell (0 volts) does not provide a significant level of disinfection. Levels of less than 1 Log reduction in this test are within the experimental error of this procedure.

EXAMPLE 5

In another experiment carried out with the apparatus 100, cells 102, and method described in Example 3, the disinfection level was measured as a function of the chloride ion present in the feed water. Feed water E. coli concentrations ranged from 5×10$^6$ to 1.3×10$^7$ Cfu/100 mL. Results for each entry in the table below are from an average of 4-8 individual samples at the same conditions. For all levels of chloride, the total conductivity was adjusted with the addition of 150 ppm each sodium bicarbonate magnesium sulfate. The measured conductivity range for all samples was 430-890 µS/cm and the pH range was 8.0-8.6. Greater than 2 log reduction was seen for all levels of chloride tested and also in the absence of chloride ions.

| Chloride ion level in feed water, ppm | Log Reduction at 0.25 liter/min Flow Rate | Log Reduction at 0.50 liter/min Flow Rate |
|---|---|---|
| 0 | 3.8 | 3.2 |
| 15 | 5.8 | 3.8 |
| 60 | 6.6 | 5.8 |
| 150 | 6.5 | 6.3 |

EXAMPLE 6

In this experiment carried out with the apparatus 100, cells 102, and method described in Example 3, the residual free chlorine level in the product water was measured as a function of the chloride ion present in the feed water. Four measurements were made for each run and the values in the table are an average for several runs made at a range of flow rates (0.25-1.0 L/min) and conductivity (430-1680 µS/cm).

Samples were tested for free chlorine concentration using Chlorometer 1000 (Palintest PT 245/M2) and Palintest DPD1 and 3 test reagents (AP031).

All samples had a disinfection level greater than 2 log reduction with an average chlorine residual less than 0.1 ppm. No individual point in the average had a value greater than 0.2 ppm. Low levels of free chlorine are desirable in producing drinking water with low taste and odor components.

| Chloride ion level in feed water, ppm | Average free chlorine in product water, ppm | Number of Sample Runs |
|---|---|---|
| 0 | 0 | 7 |
| 15 | 0.02 | 4 |
| 60 | 0.07 | 9 |
| 150 | 0.08 | 5 |
| 360 | 0.06 | 1 |

EXAMPLE 7

In another experiment carried out with the apparatus 100, cells 102, and method described in Example 3, the disinfection level was measured as a function of the pH of the feed water. One single feed was used for this experiment with $5.2 \times 10^7$ Cfu/100 mL and 60 ppm chloride ion, 560 µS/cm conductivity, and pH 8.6. The pH was then adjusted to 6.4 by the addition of sulfuric acid. Each value in the table is an average of four samples (at the 1 and 5 liter points of a 6 liter sample from each cell).

| | Log reduction at 0.25 liter/min | Log reduction at 0.50 liter/min |
|---|---|---|
| pH 6.4 | 4.9 | 4 |
| pH 8.6 | 3.5 | 2.9 |

EXAMPLE 8

In another experiment carried out with the apparatus 100, cells 102, and method described in Example 3, the concentration of *E. coli* was measured in the waste stream. In these runs, less than 10 Cfu/100 mL of *E. coli* were found in the waste water.

| | Feed water parameters | | | | | | Samples *E. coli* in waste water average | | |
|---|---|---|---|---|---|---|---|---|---|
| Run # | NaCl (ppm) | Cl– (ppm) | Incom. pH | TDS (µS/cm) | Temp. (° C.) | (Cfu/100 mL) | (Cfu/100 mL) | Reduction | Reduction log |
| 43 | 25 | 15 | 6.7 | 410 | 32 | 2.40E+06 | 1.00E+00 | 2.40E+06 | 6.4 |
| 45 | 25 | 15 | 6.3 | 410 | 28 | 1.84E+07 | 3.00E+00 | 6.13E+06 | 6.8 |
| 47 | 25 | 15 | 8.4 | 370 | 28 | 4.00E+06 | 1.75E+00 | 2.29E+06 | 6.4 |
| 38 | 100 | 60 | 6.7 | 470 | 28 | 1.52E+07 | 1.00E+00 | 1.52E+07 | 7.2 |
| 48 | 250 | 150 | 8.3 | 830 | 28 | 1.08E+07 | 1.00E+00 | 1.08E+07 | 7.0 |
| 44 | 250 | 150 | 6.8 | 830 | 32 | 3.60E+06 | 1.00E+00 | 3.60E+06 | 6.6 |

EXAMPLE 9

This experiment was carried out with the apparatus 100 and method described in Example 3, except that no water splitting membrane was present, the total chlorine level in the product water was measured as a function of the chloride ion present in the feed water and the flow rate.

FIG. 25 shows that in the absence of water splitting membrane 110, significant chlorine is generated and remains in the product water. An electrochemical cell without ion exchange membrane may be used to generate free chlorine to feed into the electrochemical cell 102 with a membrane 110 for improved disinfection performance.

EXAMPLE 10

In another experiment carried out with the apparatus 100, cells 102, and method described in Example 3, the disinfection level was measured with and without an additional antimicrobial cell added to the system. The antimicrobial cell contained 48 g of HaloPure® brominated resin beads, an N-halamine compound. Six liters of product water was drawn continuously through the apparatus from each cell 102 followed directly by the N-halamine cell at a flow rate of 0.5 liter/minute. Each value in the table is an average of four samples (at the 1 and 5 liter points of a 6 liter sample from each cell).

In this experiment the feed water contained 600 ppm of sodium bicarbonate and 600 ppm of magnesium sulfate. Additional salts added were either 250 ppm NaCl or 250 ppm Na2SO4 to target a total conductivity level of 1500 µS/cm. The measured conductivity was 1480-1530 µS/cm and the measured pH was 7.2-7.3.

| Cell Configuration | NaCl ppm | Log Reduction at 0.5 liter/min Flow Rate |
|---|---|---|
| Apparatus | 0 | 1.7 |
| Apparatus + N-halamine cell | 0 | 7.6 |
| Apparatus | 250 | 4.8 |
| Apparatus + N-halamine cell | 250 | 7.6 |

The addition of an additional disinfection cell to apparatus 100 provided greater than 7 log reduction disinfection with or without the presence of chloride in the feed water.

While illustrative experiments are provided for the microorganism deactivation and antimicrobial properties achievable for the electrochemical cell 102, it should be understood that other cell configurations can also be used.

Filters

In addition to the antimicrobial cells, or as an alternative, the apparatus 100 can also include filters 177b which are provided downstream of the electrochemical cell 102 (as shown), upstream of the cell 102, or even in the cell 102 itself. The filter 177b can be of different types including sediment filters, carbon filters, micropore filters, bacteriological filters and other filters.

In one version, the filter 177b is a sediment filter 181 that serves to filter out particulates 197 such as suspended solids from the fluid stream 124, as shown in FIG. 9. The particulates 197 can include dirt, sand, and clay particulates. Fluid passes into the sediment filter 181 and through a porous membrane 198 which forms the walls of the filter 181. Particulates having a diameter larger than the pore diameter of the filter are trapped inside the membrane 198. In general, sediment filters are rated by a "micron" number which refers to the particle size that will be trapped by the filter 181. They are further classified as "nominal" or "absolute". For instance, a nominal 5 micron filter may be expected to trap 85% of particles of five microns and larger, whereas an absolute 5 micron filter may be expected to trap 99% of particles 5 microns and larger. In one version, the cartridge type filter has a pore structure which will filter out particles having a dimension of at least 5 micron. In one version, the sediment filter 181 comprises a bag type. A bag-type filter passes fluid into a bag 199 and out through the pores 201 of the bag 199, trapping dirt and particulate matter 197 inside. Another version uses a cartridge-type filter (not shown) wherein the cartridge comprises a hollow cylinder of porous filter element material which is bound at the top and bottom ends. Fluid passes into the center of the filter element (bag or cartridge) and out through the pores of the wall, trapping dirt and particulate matter in the walls and at the base of the hollow center. The sediment filter 181 element (bag or cartridge) is porous and may comprise wound string or cord, polypropylene, polyester, cellulose, ceramic, glass fiber or cotton. The filter element is contained in a housing 202 comprising a body 202b and a lid 202a. The housing 202 may comprise molded plastic, polymer, stainless steel, bronze or copper. The sediment filter 181 may also comprise an antimicrobial filter, that is, the porous membrane of the sediment filter comprises a source of an antimicrobial agent as described herein.

Another version of the filter 177b comprises an activated carbon filter 187 as shown in FIG. 10. The activated carbon filter 187 comprises activated carbon in the form of particles, granules, or a carbon block 221 that filters out contaminant microparticles and microbes from the fluid stream. The carbon filter is encased in housing 219 and the carbon particles, granules, or block are surrounded by a pre-filter 223 and a post filter 225 which may include but are not limited to antimicrobial filters. The carbon filter has a cap 226 to help direct the flow of the fluid stream 125. The activated carbon has an elevated surface area that adsorbs contaminants from passing fluid because of the reduction in the surface energy of the activated carbon which occurs when such the adsorption takes place. The activated carbon has a nominal pore size of, for example, about 1 micron. Suitable activated carbon also has a surface area of at least about 1000 $m^2/g$. The activated carbon acts as an absorbent sieve to remove cysts, microorganisms, microscopic particles, chlorine and organic compounds to provide, for example, treated water having a better taste and appearance.

The activated carbon filter 187 can be placed upstream of the electrochemical cells 102 and antimicrobial filter to ensure that any potential growth in the carbon filter is disinfected further downstream. An apparatus 100 comprising electrochemical cells 102 and a filter 177b having a carbon block with a nominal pore size of 1 microns was found to remove a wide range of contaminants.

In another version, the activated carbon filter 187 is placed in the output pipe 151 to treat deionized fluid. The activated carbon filter 187 filters out impurities and contaminants, such as large organic molecules, which may be dissolved or suspended in the fluid stream 125. The activated carbon can also be located within the housing 219 of the electrochemical cell 102 itself, for example, as a layer at the bottom of the cell 102. The activated carbon is placed in the center of the cell housing 219 and around the riser tube so that the fluid has to pass through the inlet 217 then through the carbon to reach the outlet 218 of the cell 102. In another version, the carbon may be included as an activated carbon wrap, or a layer of particles adhered to the inner surface of the spiral wrapped membrane. In this version, the activated carbon wrap is to be replaced when the ion exchange membrane cartridge is replaced.

The filter 177b also include a ceramic filter comprising fine pores having sizes of less than about 10 micron. The ceramic filters can also include submicron filters which filter particles having sizes less than down 0.1 micron. Suitable ceramic filters comprise include micropore and nanomaterial filters. Nanomaterial filters contain materials having dimensions of nanometers that are used to remove or deactivate microorganisms. For example, the ceramic filters can contain ceramic nanofibers such as alumina nanofibers; nanoscale polymer brushes coated with molecules to capture and remove poisonous metals, proteins and germs; and nanocolumns of titanium oxide. The filters can also include nanomaterial filter which when subjected to ultraviolet light, destroy many contaminants such as pesticides, industrial solvents and germs, in the passing fluid stream. The ceramic filter can be flushed with fluid in the reverse flow direction to clean it out. In some cases, powerful back flushing can be needed to unclog the pores.

The filters 177b can also be antimicrobial filters that are capable of killing, deactivating or removing bacteria or other microorganisms from the fluid stream. By combining an antimicrobial filter (also known as an bacteriological filter) before or after the electrochemical cell 102 in the apparatus 100, the requirements of both the filter 177b and antimicrobial cell 177a can be relaxed while still enabling the apparatus 100 to meet a disinfection objective. For example a bacteriological filter which provides three log disinfection would enable the cell 102a,b to provide only three log disinfection, for a total microorganism reduction of six log. Suitable bacteriological filters include mechanical filters such as carbon block with a suitably small pore size (<1 micron), as well as ultrafiltration, nanofiltration or reverse osmosis membranes, all of which physically exclude microorganisms of various sizes from product water. Other useful filters comprise additives which deactivate or kill microorganisms, for example silver blended in some form blended with carbon media or other media which leaches and kills microorganisms near the media surface as water passes through the filter, as described in the section on metal ion filters.

In another version, the filter 177b is a reverse osmosis filtration cell 249. In the reverse osmosis cell 249, the fluid or water is forced by an electric pump 251 or city water pressure, through a synthetic semi-permeable membrane 253. The semi-permeable membrane 253 comprises a chemical compound which is stable in the fluid. Water is pumped through the membrane 253 at high pressures causing contaminants 254 to be removed at the membrane interface. For example, reverse osmosis filters comprising Filmtec membranes can be used to remove salt in the desalination of sea water, remove naturally occurring minerals from well water, and can also have a softening effect by removing hard ions. The reverse osmosis cell 249 can also be used in combination with an activated carbon cell, the latter provided to remove chlorine to avoid degradation of the reverse osmosis membrane, and volatile organic chemicals before the water passes through the reverse osmosis membrane. In the desalination application, the removal of 98% of total dissolved solids (TDS; or ions) from water containing 35,000 ppm TDS, leaves 700 ppm in the water. This is still a high concentration for drinking water (taste and odor problems), and it is beneficial to further reduce this concentration with for example the electrochemical apparatus 100 of the present invention.

In yet another version, the filter 177b is a multistage or combination filter that combine the advantages of several techniques. The multistage filter include various combinations of sediment, activated carbon, and other cells to provide drinking water with better taste, lower solid content, clearer color and lower microbe levels. The apparatus 100 with electrochemical deactivation and multistage filters removed a wide range of contaminants including chlorine, suspended particles, organic compounds, bacteria, virus, cysts and ionic species, to provide greater than 90% removal of a wide range of biological and chemical contaminants.

In another version, the filter 177b include a hard water conversion cell which converts hard water to soft water. Hard water interferes with the cleaning action of soaps and detergents. A water softener employs strong acid cation exchange resin in the sodium form. As water comprising divalent cations such as calcium, magnesium and manganese pass through this ion exchange resin, the divalent ions exchange for monovalent sodium. Water containing monovalent ions is termed "soft". When the bulk of sodium ions on the ion exchange resin are replaced by divalent ions, the resin must be regenerated with brine (concentrated sodium or potassium chloride) to replace the divalent ions with sodium or potassium, followed by a thorough rinse, to ready the water softener for another service water cycle to produce soft water. There is no reduction in the TDS of the softened product water, nor are anions (negatively charged species such as nitrate, arsenic or perchlorate) exchanged. The use of the electrochemical apparatus of the present invention following a water softener would reduce TDS to improve taste, and would remove anionic contaminants which may be harmful.

The present system of disinfecting fluids such as water can also be used as part of other fluid treatment systems. For example, the electrochemical disinfecting apparatus can be used in municipal water treatment systems which comprise sedimentation, softening and other treatments. Municipal systems include drinking water treatment and waste treatment for water reuse or discharge. The use of the apparatus 100 of the present invention in conjunction with municipal water treatment systems would enable, for example, the reduction of chlorine or other chemical disinfectant concentrations, while at the same time reducing TDS or specific contaminant concentrations. Additive chemicals are necessary to provide residual disinfection (a lasting effect as drinking water winds its way through the distribution system to end-users). The use of the present invention enables use of less chemical to provide this residual effect. Pools and spas also require some chemical residual concentration in the water for sustained disinfection, so the same benefit is obtained when using the present invention in a pools/spas which also employ other disinfection systems, for example, chemical or electrochemical feed systems (manual or automated). In a pool or spa, the electrochemical cell 102 of the present invention can simultaneously reduce TDS or remove a specific contaminant, while reducing the demand for chemical additive to provide a given disinfection effect, thereby decreasing chemical consumption or maintenance frequency.

In yet another application, the semiconductor industry requires ultrapure water for the manufacture of semiconductor products. In semiconductor applications, the water needs to be disinfected because microorganisms compromise microcircuit or component product quality. This is typically performed by ultraviolet light devices as the last step in a multi-step process. The use of the present invention can simultaneously deionize the water while disinfecting as a final step in process water fabrication. A further application is as a pretreatment for electrodialysis, electrodeionization or mixed-bed ion exchange devices for use in water deionization, for example lab water production, to provide these devices with feed water having reduced TDS, hardness and microorganism concentrations. This will extend the life of these other deionization systems, reducing costs.

Multiple Cell Apparatus

An exemplary embodiment of a fluid treatment apparatus 100 comprising multiple electrochemical cells 102a,b, is shown in FIG. 12. Each cell 102a,b has a stack of membranes 110a,b which are exposed to a fluid stream 124 and surrounded by first and second electrodes 106a,108a and 106b, 108b, respectively. The cells 102a,b each also comprise an orifice 146a,b to receive a fluid, an orifice 148a,b to release the fluid, and a fluid passageway 144a,b connecting the orifices to the orifices and through which the fluid stream 124 is passed. The fluid stream 124 originates from a fluid source 120 which can be, for example, a city water supply, water from a well, or a source of waste water containing undesirable chemicals. For example, the fluid source 120 can provide a fluid stream 124 comprising city water which is to be purified by the treatment cells 102a,b with the resultant purified water provided though the orifice 148 to a dispensing device such as the dispensing device 128. The fluid source 120 generally provides pressurized fluid, such as from the city water supply, a pump such as a peristaltic pump, or a city water supply in combination with a flow control device (not shown).

The cells 102a,b operate in one of two modes which can include a fluid treatment (or water deionization) mode and a cell regeneration mode. During fluid treatment or water ionization, the electric potential drop occurring the membranes 110*a,b* from the current applied to the two pair of electrodes 106*a*, 108*a* and 106*b*, 108*b*, respectively, causes the water to be irreversibly dissociated or "split" into component ions H+ and OH− at the interface 156*a,b* between the cation and anion exchange layers 150*a,b* and 152*a,b* of each membrane 110*a,b*.

During electrical regeneration, the opposite electrical field is applied, causing H$^+$ and OH$^-$ ions to be formed at the membrane interface 156*a,b*, and thereby rejecting cations and anions which were removed in a previous deionization cycle, thus, reforming the acid and base forms of the cation and anion exchange materials. Optimally, while electrochemical cell 102*a* is being used to treat the city fluid source 120 flowing through the cell 102*a*, electrochemical cell 102*b* is being regenerated. Thus, cell 102*a* can be operating in the water treatment mode, while cell 102*b* is operating simultaneously in the regeneration mode. In one version, in a regeneration cycle, the controller 170 opens a valve to flow deionized fluid into the inlet fluid orifice of the cell 146 while controlling the power supply 114 to supply a current having a first positive polarity to the second electrode 106 to regenerate the ion exchange membrane to form regenerate fluid which is released from the deionized fluid orifice. The deionized fluid can have a conductivity of less than 50% that of the fluid treated during the deionization cycle. The deionized fluid regenerates the electrochemical cell better than the ion containing input fluid, and can be formed in the adjacent cell of a two cell apparatus.

In operation, the controller 170 operates the valves by sending signals to each of the valves to control movement of their movable elements 122 from a first to a second position, or other positions. The valve system 118 directs the passage of a fluid stream 124 to any one of the cells 102*a,b*; from the cells 102*a,b* to a drain 190; or from one cell 102*a* to the other cell 102*b* or vice versa. The valve system 118 can also be used to pass the fluid to other fluid treatment apparatus as would be apparent to one of ordinary skill in the art.

The controller 170 operates the valve 117 by sending signals to the motor 188 of the valve 117 to control movement of the movable element 122 from a first to a second position, or to other positions. The valve 117 directs the passage of a fluid stream 124 to either cell 102*a* or cell 102*b*. The valve 117 comprises a movable element 122 which can be moved from a first position to a second position, or other positions, to regulate the flow of fluid though the valve ports 180*a-d*. The valve 117 can have a motor 188 to control movement of the movable element 122. The valve 117 can be used to direct a fluid stream 124 to any one of the cells 102*a,b*; from the cells 102*a,b* to a drain 190; or from one treatment cell 102*a* to the other cell 102*b* or vice versa. The valve 118 can also be used to pass the fluid to other fluid treatment apparatus as would be apparent to one of ordinary skill in the art.

An exemplary embodiment of a single valve 117 that can be used to regulate the flow of a fluid stream 124 through the fluid treatment apparatus 100 is illustrated in FIG. 13. While an exemplary embodiment of a valve 117 having a particular shape and arrangement is shown, the valve 117 can also have other shapes and structures, as would be apparent to those of ordinary skill in the art, and these valves or other equivalent structures that can control the flow of fluids, are included in the scope of the present application. Generally, the valve 117 comprises an enclosed housing 210 that can hold fluid and comprises a base 230 coupled to a cover 240 and is typically fabricated by injection molding a polymer, such as NORYL™, or made from stainless steel, aluminum or copper. The housing 210 has a set of ports 180*a-d* though which fluid can enter and leave the valve 117. Each of the ports 180 have at least one encircling port groove 182 that is capable of receiving a rim seal 183 to surround the port 184. The rim seals 183 can be an elastomeric or Teflon® O-ring sized to fit into the corresponding grooves 182 to form a fluid tight seal. The ports 180 can also have a plurality of concentric grooves 182 to allow the placement of multiple rim seals 183 around each port 180. A peripheral groove 186 extends around the periphery of the base 230 to receive a sealing gasket 189. An outwardly extending circumferential lip has holes that allow attachment of the base 230 to a cover 240. The cover 240 is fitted over the base 230 and has at least one port 180 for receiving fluid from the fluid source 120. The cover 240 forms a chamber 245 that stores the fluid received from the source 120 via the orifice port 215. The cover 240 also can include a shaft opening 235 through which a movable element 122 extends. When the source 120 provides fluid that is under pressure, such as from a city water supply, the water in the chamber 245 is also under the same external pressure.

A movable element 122 is maintained under a compressive force and is capable of moving between different positions, including a first position and a second position, to control the flow of fluid though the valve 117 and into the ports 180. The movable element 122 is in the housing 210 and extends out from the cover 240 to be coupled to a motor 188. In one embodiment, the motor 188 can rotate the movable element 122; however, the motor 188 can also slide the movable element longitudinally, vertically, transversely or in other direction depending on the shape and configuration of the valve 117. In the embodiment shown, the movable element 122 has a rotor 252, a movable surface 268, and an internal channel 274. A floating seal 284 is provided between the movable element 122 (such as the rotor 252) and the base 230 to reduce fluid leakage from the chamber 245 to the ports 180 as the movable element 122 moves. A spring 290 fits around the shaft 255 to maintain an initial compressive force on the movable surface 268, which in turn presses against the floating seal 284. A suitable floating seal 284 can be made from polytetrafluoroethylene, for example Teflon®, available from Dupont de Nemours Company Wilmington, Del.

A motor 188 is connected to the movable element 122 via a gear assembly (not shown). The motor 188 can be a conventional DC motor that is geared down and controlled to provide rapid cycle movements of the movable element 122. A suitable DC motor can be a rotary actuator, which rotates a movable element comprising the rotor 252, or a linear actuator, which slides the movable element 122. A gear assembly comprises a set of gears that provide a suitable gearing ratio can also be used.

Instead of the single valve 118, a valve system comprising a plurality of solenoid valves 119 can also be used to direct the flow of fluid through the cells 102*a,b*. While an exemplary embodiment of a solenoid valve 119 is shown in FIG. 14, the valve 119 can also have other shapes and structures, as would be apparent to those of ordinary skill in the art. Generally, the valve 119 comprises an enclosed housing 210 that can hold fluid and which has a set of ports 180*a,b* though which fluid can enter and leave the valve 119. The housing 210 is typically fabricated by injection molding a polymer, or made from stainless steel, aluminum or copper. Each valve 119 comprises a plunger 123 which can be moved from a first position to a second position, or other positions, to regulate the flow of fluid though the valve ports 180*a,b*. A solenoid 127 is used to control movement of the plunger 123 by applying an electrical current to a coil 233 within the solenoid 127 that surrounds the plunger 123. The housing 210 has ports for attachment of electrical connectors to connect to the coil 233 of the solenoid 127. The plunger 123 has an embedded magnet 247 and a bottom sealing surface 249. The embedded magnet 247 is oriented such that a line drawn between its north and south poles lies approximately perpendicular to a plane of one coil winding. The solenoid 127 is activated by passing a direct current through the coil 233 via the connectors 234. The current through the coil 233 generates a magnetic field inside the coil 233 which interacts with the magnet 247 embedded in the plunger 123 to raise or lower the plunger 123, depending on the direction of the current. When the solenoid 127 is in the open position, the plunger 123 is raised and a fluid passage allows fluid to pass from the first port 180*a* to the second port 180*b*. When the solenoid 127 is in the closed position, the plunger sealing surface 249 is pressed down over the orifice to form a seal, preventing passage of fluid between the valve ports 180*a,b* and stopping fluid flow through the valve 119.

Examples of Dual Cell Apparatus

FIG. 15 depicts a version of a fluid treatment apparatus 100 having two electrochemical treatment cells 102*a,b* which are powered by dual power supplies 114*a,b* and have a valve system 118, and which is controlled by a controller 170. Each of the dual power supplies independently comprises necessary components, for example, the components shown in the embodiment illustrated in FIGS. 4A and 4B. However, in another version, the dual electrode power supplies may have certain components in common, for example, the dual power supplies can have a single zero-crossing detector, as the zero-crossing signal generated by the zero-crossing detector is dependent only upon the AC voltage, and thus may be commonly used by a plurality of power supplies.

While a single power supply 114 can also be used, the dual power supply 114*a,b* allows one power supply 114*a* to operate the first cell 102*a* for both deionization and regeneration, and the other power supply 114*b* to operate the other cell 102*b* also for both functions. This way both cells 102*a,b* can be operated independently or simultaneously. The power supplies 114*a,b* each have two output terminals 157*a,b* and 153*a,b*. In this version, each power supply 114*a,b* is connected to a single cell 102*a,b*, respectively, for example, the power supply 114*a* is connected to cell 102*a* and power supply 114*b* is connected to cell 102*b*. The level of the voltage output between the terminals 157*a,b* and 153*a,b* is controlled by the controller 170. Each power supply 114*a,b* is capable of providing a bias voltage to each of the cells 102*a,b* respectively, to operate the connected cell for fluid treatment or regeneration. In the version shown, each power supply 114*a,b* is capable of outputting a voltage from between about −300 volts and +300 volts. For example, the power supplies 114*a,b* can output a positive voltage of up to about 300 volts and a negative voltage less than about −300 volts, between the output terminals 157*a,b* and 153*a,b*.

In yet another version, the dual power supply 114*a,b* is set up so that the polarity of each of the power supplies 114*a,b* is a fixed polarity so that one power supply always provides a voltage with a positive polarity, and the other a negative polarity. Thus, the first power supply 114*a* comprises a first output terminal 157*a* having an always positive polarity, and the second power supply 114*b* comprises a first output terminal 153*a* having an always negative polarity. This version allows a first power supply 114*a* to be used solely for deionization of fluid in both of the cells 102*a,b*, and a second power supply 114*b* only for regeneration of both cells 102*a,b*.

In a further version, each power supply 114*a,b* is independently connected to both cell 102*a* and cell 102*b*, and can be used to drive either cell 102*a,b* in the deionization or regeneration mode. This version provides a duplicate capabilities as with one of the power supplies 114*a,b* fails, the other power supply can be used to operate both cells 102*a,b*. In this version, the controller 170 comprises program code to detect operation (or failure) of each of the power supplies 114*a,b* and to substitute one power supply for the other if needed.

In operation, the controller 170 controls the power supplies 102*a,b* for switching them on and off, and controls the supply voltage provided between the output terminals 157*a,b* and 153*a,b*. In addition, the controller 170 controls a valve system 118 to regulate the flow of fluid through the cells 102*a,b*, while controlling the connection to, and voltage supplied at, the terminals 152*a,b* and 153*a,b* of each of the power supplies 114*a,b*. In this way, the controller 170 is able to operate the cells 102*a,b* for fluid treatment, and also to operate one cell 102 in the fluid treatment direction while the other cell 102 is being regenerated.

The apparatus 100 further comprises a fluid piping system which has a first fork 163 that splits into two pipes to allow the incoming fluid stream 124 to flow along one side of the fork toward a first cell 102*a*, and another side of the fork towards cell 102*b*. In one version, the valve system 118 comprises four solenoid valves 119*a-d* which are provided in the piping system to control the flow of fluid through the various pipes. The first pair of solenoid valves 119*a,b* is positioned in the pipe between the first fork 163 and each of the treatment cells 102*a,b* to control incoming fluid flow to each of the treatment cells 102*a,b*. Between the first valve 119*a,b* and the cell 102*a,b*, respectively, is second fork 165*a,b*. At the second fork 165*a*, fluid flowing through the apparatus 100 can flow to the treatment cell 102*a* or to the drain 190. Between the second fork 165*a,b* and the drain 190 is a second solenoid 119*c,d*, which controls fluid flow to the drain 190. The valve system is controlled by a controller 140 which operates the valves in conjunction with the power supplies 114*a,b* to treat fluid and regenerate the cells 102*a,b*.

During operation of cell 102*a* for fluid treatment, valve 119*b* is shut and valve 119*a* is open. Fluid flows from the outlet of the sediment filter 181, through valve 119*a* and into cell 102*a* through the first orifice 146*a*. A forward voltage is applied to the electrodes 106*a*, 108*a* of cell 102*a* and fluid passing through the cell 102*a* is treated. Fluid exits cell 102*a* through the second orifice 148*a* and flows through the activated carbon filter 187, which further treats the fluid. The doubly treated fluid flows through the fluid flow sensor 204. The valve 119*e* is opened and treated fluid passes out of valve 119*e* and to the consumer.

The cells 102*a,b*, solenoids valves 119*a-e* and outputs 148*a,b* arranged in the configuration shown allows for the cells 102*a,b* to be used to regenerate each other, for example as follows: During operation of cell 102*a* in the treatment mode and operation of cell 102*b* in the regeneration mode, valve 119*b* is shut and valve 119*a* is open. Valve 119*c* is shut and valve 119*d* is open. Fluid flows from the outlet of the sediment filter 181, through valve 119*a* and through the first orifice 146 of cell 102*a*. Voltage is applied between the electrodes 106, 108 of cell 102*a* and fluid passing through the cell 102*a* is treated. Fluid exits cell 102*a* through the second orifice 148*a*. Valve 119*e* is shut, thereby blocking the flow of treated fluid to the output. Instead, the fluid flows into cell 102*b* through the second orifice 148*b*. A reverse voltage is applied to the electrodes 106, 108 of cell 102*b*. Fluid flows from the second orifice 148*b* of cell 102*b* to the first orifice 146*b* of cell 102*b* and picks up ions. Re-ionized fluid exits the first orifice 146*b* of cell 102*b*, flows through valve 119*c* and to the drain 190, where it exits the fluid treatment apparatus 100.

Fluid passed through cell 102b in this manner rinses the cell 102b of impurities and can be said to recharge the cell 102b for future fluid treatment use.

Another version of the valve system 118 can also have five solenoids valves 119, as shown, which are used to control the flow of fluid through the cells 102a,b, to a drain 190, and to a fluid output which outputs treated fluid for a user. The solenoid valves 119a and 119b control incoming fluid flow to cell 102a and cell 102b, respectively. Solenoid valves 119c and 119d control fluid flow to the drain from cell 102a and cell 102b, respectively. The additional fifth solenoid valve 119e controls the flow of fluid to the outlet. The outlet 148a of treatment cell 102a and the outlet 148b of treatment cell 102b are connected to a common output pipe 151.

A fluid flow sensor 204 can also be positioned along the fluid stream 125. A suitable sensor is a Hall Effect sensor which outputs a voltage which oscillates with a frequency that corresponds to the rotational frequency of the turbine. The controller 170 uses the flow rate signal from the fluid flow sensor 204 to determine the flow rate of fluid passing through the pipes and the cells 102a,b, and this flow rate information can be used for a number of different purposes. For example, the controller 170 can use level of the flow rate signal to control the power supplies 114a,b to adjust the electrical power applied to the electrodes 106,108 of the cells 102a,b. In this way, the voltage applied to the electrodes can be adjusted to achieve higher levels of microorganism deactivation, or to adjust the voltage power applied to the electrodes in relation to the rate of flow fluid through the cells 102a,b.

A pressure sensor 159 can also be provided to output a pressure signal to the controller 170 that is proportional to the pressure of the fluid in the apparatus 100. When the dispensing device 128 is opened and the pressure in the output pipe 151 decreases, the controller 170 can switch on operation of the fluid treatment apparatus 100 to provide a treated fluid stream 125. When the dispensing device 128 is closed, pressure builds up in the output pipe 151 and the controller 170 can switch off the operation of the electrochemical cells 102a, b. A suitable pressure sensor 159 comprises a conventional sensor such as a pressure diaphragm sensor which has a flexible diaphragm which collapses upon the application of fluid pressure to the diaphragm. The collapsing diaphragm operates a variable resistance or micro switch that is activated by the displacement of the diaphragm.

The apparatus 100 can also include a sediment filter 181 that serves to filter out particulates from the fluid stream 124 as described above. In this version, the sediment filter 181 is located at the front end of the apparatus 100, so that the incoming fluid stream 124 is processed through the sediment filter 181 before it passes through an electrochemical cell 102. Also, locating the sediment filters in front of the cell 102 provides a more bacteriostatic system because the electrochemical cell 102 deactivates bacteria that grow in most filters. The apparatus 100 can further include an activated carbon filter 187 that sits in the common output pipe 151 and treated fluid passes through the activated carbon filter 187 on the way to the output 162. In the version shown the fluid flow sensor 204 described above, is positioned between the activated carbon filter 187 and the outlet port 162 of the apparatus 100. The apparatus 100 can also include an ultraviolet antimicrobial filter 161 in the fluid stream 125 between the flow pressure sensor 159 and the dispensing device 128. In the version shown, the UV antimicrobial filter 161 is positioned in the fluid stream 125 between the flow pressure sensor 159 and the dispensing device 128, and the pressure sensor 159 is positioned between the UV antimicrobial filter 161 and the flow sensor 204.

Another version of an exemplary multi-cell apparatus is shown in FIG. 16. The apparatus 100 comprises two electrochemical treatment cells 102a,b and a single power supply 114, and is similar to the version of FIG. 15, in that it can also comprise a sediment filter 181, valve system 118 comprising solenoid valves 119a-d, drain 190, activated carbon filter 187, fluid flow sensor 204, ultraviolet antimicrobial filter 161 and output dispensing device 128. However, the apparatus 100 of FIG. 16 can also have a fluid holding tank 126 with pressure sensor 159, and a dosing component 194 with dosing valve 119e.

The power supply 114 is connected to and provides power to both treatment cells 102ab and can drive each cell 102 separately or both together. The controller 170 controls the magnitude of the voltage output by the power supply, and can output a voltage between 30 and 330 volts DC, or between 30 and 300 volts DC with an AC ripple comprising between 10 and 50% of the magnitude of the output voltage. The controller 170 also controls the polarity selector of the power supply 114 and hence the polarity of the voltage supplied at the output terminals to cell 102a and cell 102b. Thus, the power supply 114 is capable of operating the cells 102a,b in the fluid treatment direction and also in the reverse direction for regeneration. The power supply 114 can operate the cells 102a,b separately or together, i.e., the power supply 114 can operate cell 102a in the fluid treatment direction while cell 102b is off; or the power supply 114 can operate both the cell 102a and cell 102b in the fluid treatment direction. The power supply 114 can also operate cell 102a in the treatment direction while cell 102b is operated in the regeneration direction. The controller 170 controls the power supply 114 and the valve system 118 to regulate the supply of voltage and fluid flow through the cells 102a,b.

The apparatus 100 also comprises a dosing component 194 with a dosing valve 119e. The dosing component periodically or continuously supplies a dose of an antimicrobial agent to the fluid. In operation, input fluid is passed through a pipe to the sediment filter 181, and after the removal of sediments, the fluid flows past a dosing valve 119e, which may be a solenoid valves. The dosing valve 119e connects the fluid stream 124 to a dosing component 194. The dosing component may comprise an antimicrobial cell 177a which contains antimicrobial particles containing an antimicrobial agent that is slowly released into the fluid as the fluid passes through the cell 177a of the dosing component 194. For example, the dosing component 194 can release a source of chloride ions into the fluid, such as sodium chloride or chlorine.

The fluid holding tank 126 sits in the treated fluid line downstream of the fluid flow sensor 204 to receive treated or output fluid from the electrochemical cells 102a,b. A pressure sensor 159 can be mounted in a fluid holding tank 126 which is used to receive output fluid from the apparatus 100, and to store a volume of the treated output fluid, prior to releasing the treated fluid to the dispensing device 128. In one version, the pressure sensor 159 is located near the bottom of the tank 126 to measure the pressure of fluid within the tank 126 and hence the depth of fluid in the tank 126. The pressure sensor 159 outputs a pressure signal to the controller 170, which controls the valve system 118 and regulates the flow of fluid through the treatment apparatus 100. For example, the controller 170 can stop flow to the treated fluid tank 126 when the tank 126 is near full when the pressure signal indicates full tank level. This prevents fluid waste from overflow. The controller 170 can also operate the apparatus 100 to start fluid flow to the treated fluid tank 126 when the pressure signal indicates that the level of fluid in the tank 126 is low, thereby keeping the treated fluid tank 126 near full capacity. The controller 170 can also switch off operation of the electrochemical cells 102a,b upon receiving a pressure signal that indicates a sufficiently high pressure in the fluid holding tank 126 to save electrical power.

Multiple Cell Deionization and Regeneration Operation

Reversing Deionization Flow Direction

Referring to FIG. 1, one version of a deionization process is conducted in an electrochemical cell 102 comprises a housing 104 with a first orifice 146 abutting a cylindrical outer wall 132 which allows fluid to enter the cell 102 from a hole in or near the wall 132, a second orifice 148 abutting a tubular inner wall 134 which allows fluid to come out from the bottom of the cell 102, a first electrode 106 adjacent the cylindrical outer wall 132, a second electrode 148 about the tubular inner wall 134 (the wall 134 may itself be the electrode 148 or maybe positioned near the electrode 148), and a spiral wound ion exchange membrane 110 between the electrodes 106,108. The controller 170 controls the power supply 114 and valve 117 to, in a deionization cycle, flow fluid into the second orifice 148 of the cell 102 so that the fluid travels from the tubular inner wall 134 to the cylindrical outer wall 132 to be released at the first orifice 146, while supplying a current to the electrodes 106,108 to deionize the fluid.

In this particular deionization process, fluid is passed through the cell 102 in a direction which is the reverse of the normal or typical direction of fluid flow during deionization in cell 102. The orifice 148 of cell 102 is in a radially inner volume of the cell 102, as shown in FIG. 1. Thus, during this deionization cycle, fluid having a higher conductivity passes into the radially inner volume of the cell 102 to provide an overall higher conductivity relative to the opposite flow direction, which is conventionally practiced, for geometric reasons. Fluid then flows through the cartridge 130 to the radially outer volume as deionized fluid having a lower conductivity and exits the cell 102 through what is normally the inlet orifice 146 during deionization. Positioning the lower conductivity solution in the larger, outer volume during deionization rather than in the inner volume as is conventionally done provides an overall smaller cell resistance. This occurs because the inner electrode 108 has a smaller area exposed to the fluid than the outer electrode 106, which is larger. The electrical resistance is substantially smaller at the inner volume near the first electrode 106. The smaller resistance results in higher localized conductivity in the localized fluid region, and thus, more efficient ion removal from the membranes 110 situated adjacent to the inner electrode 106. This deionization process is especially desirable for the spiral wrapped membranes 110 which also have a small diameter of wrapped membrane configuration in the inner volume of the cell 102, than in the outer volume of the same cell 102. This process reduces effective cell resistance to on-half or one-third the conventional cell resistance. Thus this deionization process is especially desirable for the spiral wrapped membranes 110 which have a small diameter of wrapped membrane configuration in the inner volume of the cell 102 than in the outer volume of the same cell 102.

During regeneration, the fluid is flowed through the cell 102 in the reverse direction with fresh fluid entering the cell 102 from the first orifice 146 so that the incoming, less conductive fluid passes first through the outer volume of the cylindrical cell 102, which provides an overall higher conductivity for geometric reasons, and exits from the central portion of the cell 102 as more conductive solution in this geometrically lower conductivity volume. Thus, in this cycle, fluid is passed into the first orifice 146 of the cell 102 so that the fluid travels from the cylindrical outer wall 170 to the tubular inner wall 134 to be released at the second orifice 148, while a current is supplied to the electrodes 106,108 to regenerate the spiral wrapped membrane 110.

Post Deionization Current

In another version, the controller 170 is programmed to control the power supply 114 to continue to maintain a current through the cell 102 for a short time period after the deionization cycle is completed. In the deionization cycle, the controller 170 opens the valve 117 to flow fluid into an orifice 146 of the cell 102 while controlling the power supply 114 to supply a power or current to the electrodes 106,108 to form deionized fluid that is released at the orifice 148. In another version, the controller 170 is programmed to control the power supply 114 to continue to maintain a current through the cell 102 for a short time even after the deionization fluid flow has stopped.

This process is particularly relevant in intermittent use applications, such as a point of use drinking water system to provide occasional glasses or pots of treated water. In a deionization cycle, when a faucet or valve 117 is opened and flow is sensed, for example by a flow rate or pressure sensor, a signal is sent to controller 170 to supply current to cell 102 to deionize the fluid flowing through it. Immediately after the faucet or valve 117 is closed, a flow sensor 204 signals the controller 170 that flow has substantially stopped. At this time, even after cessation of the flow of fluid into and out of the cell 102, in a post-deionization cycle, the controller 170 is programmed to instruct the power supply 114 to continue to supply a deionization current to the electrodes 106,108 to deionize the residual fluid held stationary in the cell 102 for a time period. This allows the residual fluid in the cell 102 to be further deionized while it is still in the cell 102. The residual fluid is deionized in the cell 102 so that subsequently, when fresh untreated fluid is passed into the cell 102, the already deionized fluid in the cell 102 is forced out of the cell 102 by the incoming fresh fluid. As a result, the initial batch of treated fluid produced by the cell 102 is already deionized and does not have a bad taste or residual ions that would otherwise have remained in the fluid if the electrode power was turned off at the time the fluid flow was initially stopped.

Typically, the time period for which power is applied to the electrodes 106,108 after fluid flow into the cell 102 depends upon the current density in the cell 102 during this static period. For current densities greater than about 0.5 mA/cm$^2$, this post-deionization time is less than 10 minutes and preferably less than 5 minutes. The total time period is typically less than about 5 minutes. The typical current density supplied to the electrodes is at least about 0.05 mA/cm$^2$ and can also be less than about 5 mA/cm$^2$. Excessive post-deionization times, particularly as the static period deionization current density increases, increases the temperature of the cell 102 and its fluid contents. This may be beneficial or detrimental depending on the application.

FIG. 21 demonstrates the effect of applying a post deionization current to the electrodes 106,108 of a cell 102 after the flow of fluid passing through the cell 102 is terminated. The % ions removed for the increasing volume of fluid passed through the cell 102 increases by about 10% for increasing time periods, from 0 to 3 minutes, for which current is continued to be supplied to the electrodes 106,108. At the 0 current level, in which no post deionization current was applied to the cells 102a,b, after 7 gallons of fluid was deionized the % ions removed dropped down to about 70%. In contrast, when a post deionization current was applied for time periods of 1, 2 or 3 minutes, the % ions removed was about 80% or higher at a volume level of 7 gallons.

Reversing Flow & Current in Regeneration

Referring back to FIG. 1, the cell 102 has first and second electrodes 106,108 arranged about the ion exchange membranes 110 such that the first electrode 106 abuts the first orifice 146 and the second electrode 108 abuts the second orifice 148. In a deionization cycle, the controller 170 operates the valve 117 to pass fluid to flow into the first orifice 146 of the cell 102 so that the fluid passes in through the first orifice 146 and out thorough the second orifice 148. At the same time, the controller 170 can operate the power supply 114 to maintain a current in the cell 102 to cause negative ions to migrate toward the first electrode 106 to deionize the fluid which is then released at the second orifice 148. In this cycle, the controller 170 operates the power supply 114 to apply a voltage to the first electrode 106 which is more positive than the voltage applied to the second electrode 108. This maintains the first electrode 106 at a positive bias relative to the second electrode 108. In one example, the first electrode 106 is maintained at a positive polarity and the second electrode 108 is maintained at a negative polarity. However, the first electrode 106 can also be maintained at a more positive polarity than the second electrode 108 with both electrodes 106, 108 being kept at a net negative polarity (relative to earth ground), or vice versa. For example for a cell 102 approximately 25 cm tall and 4 inch in diameter, in the deionization stage, the power supply 114 can apply across the first and second electrodes 106,108, a current of from about 0.01 to about 10 Amps with the positive leg applied to the first electrode 106. Since the membranes 110 are spirally wound, the cross-sectional area of the membranes 110 changes from the outside to the inside of the spiral winding so the current density for each wrap of membrane also changes from the inside to the outside. The membranes 110 typically have an outer diameter that is about two to three times the inner diameter. The current density for the membrane is determined from the larger area adjacent to the electrodes 106,108. In a spiral cartridge, this is the outer membrane wrap, and the membrane current density is calculated from the cell current (mA) divided by the outer cartridge surface area ($cm^2$). A suitable current density is from about 0.02 to about 20 $mA/cm^2$.

In the cell 102 deionization cycle, because a voltage having a more positive polarity is applied to the first electrode 106 adjacent to the first orifice 146a,b through which fluid enters the cell 102, it serves as the anode causing acid to be formed at this electrode 108, dissolving any calcium carbonate or other scale on this electrode 108 or in this part of the cell 102. The acid is further swept into the cartridge in the fluid flow direction to dissolve precipitated scale such as calcium carbonate on or about the membrane. As a result, the scale deposits are self-cleaned during the membrane deionization cycle to provide a longer operational cycle lifetime for the cell 102.

Thereafter, in a regeneration cycle, the controller 170 operates the valve 117 to reverse the flow direction of the fluid through the cell 102. Reversing the flow direction during regeneration is advantageous because it provides a more efficient (faster, less water, less power consumption) than the alternative. During deionization, the ion exchange material at the deionization fluid inlet extracts more ions from feed solution than does the ion exchange material at the end of the membrane length, where treated fluid exits cell 102. The membrane at the beginning of the deionization path is the coarse treatment step (removing the bulk of ions), and the membrane at the end of the membrane length is the finishing treatment step (removing less ions). Thus by reversing the fluid direction for regeneration, the regeneration feed fluid, which has the lowest ionic concentration, is in contact with the finishing end of the membrane length with the lowest ionic concentration, and as ions are rejected from the membrane, the ion concentration of the regeneration fluid increases. Therefore, the concentration gradient across the membrane surface is minimized along the entire length of membrane during regeneration, and thus ions are more efficiently rejected from the membrane into the regeneration fluid. A further benefit is that at the end of regeneration, the water at the deionization outlet has the composition of regeneration feed water, not the higher concentration of the waste which exits at the deionization inlet. This reduces contamination of the first water exiting cell 102, at the regeneration inlet, during the subsequent deionization.

FIG. 22 shows a comparison of the conductivity of output treated fluid, such as deionized water, for increasing deionization process cycles run in an electrochemical cell 102. In each deionization process cycle, about 2 gallons of water was deionized in the cell 102. After each deionization cycle, the cell 102 was regenerated with: line (a)—fluid comprising hard water which has a high ion concentration; line (b)—fluid comprising soft water; and line (c)—fluid containing deionized water passed through the cell 102 in a reverse flow through the deionized fluid orifice. It is seen that regeneration with hard water as seen in line (a) significantly increases the conductivity or ion content of the water deionized in a cell 102 after 300 cycles relative to the cells 102a,b which were regenerated with soft water, line (b), or regenerated with deionized water in reverse flow as in line (c).

In addition to reversing the fluid flow direction during regeneration, the controller 170 also reverses the direction of the current applied through the cell 102. To do this, the controller 170 operates the power supply 114 to maintain the first electrode 106 as the negative electrode and the second electrode 108 as the positive electrode relative to the first electrode 106. This can be done by reversing the polarity of the first and second electrodes 106,108, or charging the first electrode 106 with a negative bias relative to the second electrode 108. In an example, the first electrode 106 is maintained at a negative polarity and the second electrode 108 is maintained at a positive polarity. However, the first electrode 107 can also be maintained at a more negative polarity than the second electrode 108 with both electrodes 106,108 being kept at a net negative or positive polarity. The current in the cell 102 causes positive ions to migrate toward the first electrode 106. During regeneration, the power supply 114 can apply the same or different current and current density absolute values to the electrodes 106,108. In the cell 102 regeneration cycle, as in the deionization cycle, because a voltage having a more positive polarity is applied to the second electrode 108 which is located adjacent the second orifice 148a,b through which the fluid enters the cell 102, it serves as the anode causing acid to be formed at this electrode 108, dissolving any calcium carbonate or other scale. The acid is further swept into the cartridge in the fluid flow direction to dissolve precipitated scale such as calcium carbonate on or about the membrane. As a result, the scale deposits are self-cleaned during the membrane regeneration cycle to provide a longer operational cycle lifetime for the cell 102. For example, cell 102 regeneration by this method provided cell 102 lifetimes of from about 500 to about 1000 gallons, in contrast to prior cell 102 lifetimes of 100 to 300 gallons.

The power supply 114 controlled by the controller 170 comprises a voltage supply 113. The voltage supply 113 can also supply a time modulated voltage to the first and second electrodes 106,108 in either of the deionization or regeneration cycles. For example, in the deionization cycle, the voltage supply 113 can supply a first time modulated voltage to the electrodes 106,108; and in the regeneration cycle, the voltage supply 113 can supply a second time modulated voltage to the electrodes 106,108 which has different magnitudes than the first magnitudes. For example, the controller 170 in the regeneration cycle, can open the valve 117 to flow fluid into the deionized fluid orifice of a cell 102 while controlling the variable voltage supply to supply a time modulated direct current voltage to the electrodes of the cell 102.

Burst Regeneration

The controller 170 can also be programmed to control the valve 117 to pass a timed burst of fluid into an orifice of a cell 102 during the regeneration cycle. Each regeneration cycle is conducted for a regeneration cycle time which is the total time during which the membrane is regenerated before it is used again for a deionization cycle. The timed burst of fluid is a flow of fluid for a time period that is shorter than the regeneration cycle time. For example, the controller can operate the valve 117 to provide timed bursts of fluid for time periods of from about 0.1% to about 80% of the regeneration cycle time, or even for time periods of from about 0.3% to about 30% of the regeneration cycle time. The controller 170 is programmed to provide a timed burst of fluid into the cell 102 by opening the valve 117 for a time period and then closing the valve 117. The burst duration is the time period during which the valve 117 is turned on and then shut off by moving the movable element 122 from a first position to a second closed position. At the same time, the controller 170 controls the power supply 114 to power the electrodes 106,108 to regenerate the ion exchange membrane 110 to form regenerate fluid which is released at another orifice.

Typically, the controller 170 operates the valve 117 to provide a plurality of bursts during a regeneration cycle time, i.e., in a single regeneration cycle. The plurality of bursts may have flow rates and durations selected according to the desired removal of residual solids in the electrochemical cell 102, and are typically performed in sequence, substantially without performing any intervening fluid deionization cycle in the cell 102. As an example, the controller 170 may operate the valve 117 to provide at least about 2 sequential fluid bursts into the cell 102, or even at least 10 bursts, or even 20 bursts, during a regeneration cycle.

In one example, the controller 170 operates the valve 117 to open the valve 117 for a timed burst of fluid, which lasts for a time period of from about 0.1 to about 40 seconds, and then closes the valve 117, once every minute. More typically, the timed burst of fluid is for a time period of from about 0.3 to about 15 seconds. In one version, the controller 170 opens the valve 117 for a time period of about 0.5 to about 5 seconds then shuts off the valve 117 off once each minute until the next timed burst. The time period between bursts, one minute in these examples, is typically a time period that is longer than the burst time.

In one version, in the deionization cycle, the controller 170 also instructs the power supply 114 to apply a voltage having a first polarity across the electrodes 106,108 in the cell 102; and in the burst regeneration cycle, supply power with a second polarity to the cell electrodes 106,108 while passing a timed burst of fluid into the cell 102.

The timed burst of fluid to regenerate cell 102 provides several benefits. Burst regeneration enables more efficient regeneration of cell 102 while using less fluid, reducing power consumption, and improving regeneration time. These advantages are obtained when compared to a continuous flow process in which fluid is continuously flowed into the cell 102 for regeneration, reducing the overall cost of the electrochemical cell 102 regeneration cycle. For example, the high regeneration flow rate obtained in a single burst time cycle, forces particles such as scale out of the cell 102 to prevent their irreversible precipitation or collection in the cell 102. The timed burst of fluid also allows regeneration of the cell 102 with a relatively smaller volume of fluid as compared to a continuous flow process.

The timed burst can provide a range of flow rates depending upon the available pressure and pressure drop across cell 102 and drain plumbing. Flow restrictors may be employed in the plumbing circuit to reduce the flow rate during bursts. Generally, however, to maximize the benefits of burst regeneration, the highest flow rate obtainable for the system is preferred during a burst. The actual flow rate varies depending on the size of the cell 102 and the pressure available, but for cells 15 cm tall and 10 cm in diameter, and a head pressure of 60 psi, for example, a flow rate of at least 0.5 liters per minute is desirable, more preferably at least 1 liter per minute. This is the actual flow rate during the burst time, not the average flow rate calculated from the total volume passed through cell 102 over the regeneration time. For example, the average flow rate calculated from a total of 1.3 liters passed during a regeneration cycle, which is ten minutes long, is 0.13 liters per minute. With burst regeneration, however, this water is passed in multiple bursts, for example ten bursts over ten minutes, to provide 1.3 liters total volume passed to the drain. If the actual flow rate during a burst is 2 liters per minute, for example, then burst time would be set to four seconds long at an actual burst flow rate of 2 liters per minute is desirable. If the flow rate were lower, the burst time can simply be increased to obtain the same average flow rate and total regeneration waste volume.

During a single regeneration cycle, the sequential timed bursts can have different times for two or more stages, which are parts of an entire single regeneration cycle. In this version, the controller 170 turns the valve 117 on and off for different time periods during each regeneration cycle. The time periods for which the valve 117 is turned on, and then turned off, can be changed from one regeneration stage to another in a single regeneration time cycle. Thus, sequential burst regeneration can include multiple regeneration stages with the valve 117 on time being different in each stage. For example, in one version, the controller 170 operates the valve 117 to provide timed bursts of fluid (i) during a first regeneration stage for time periods of from about 0.1% to about 30% of the regeneration cycle time; (ii) during a second regeneration stage for about 0.3% to about 80% of the regeneration cycle time; and (iii) during a third regeneration stage for time periods of from about 0.1% to about 30% of the regeneration cycle time.

In another version, the controller 170 operates the valve 117 to provide a timed burst of fluid (i) during a first regeneration stage for one or more time periods of from about 0.1 to about 10 seconds; (ii) during a second regeneration stage for one or more time periods of from about 3 to about 40 seconds; and (iii) during a third regeneration stage for one or more time periods of from about 0.1 to about 10 seconds. The first regeneration stage can be performed from the commencement of the regeneration cycle until a time, for example, of less than about 2 minutes later, the second regeneration stage is performed for at least about 3 minutes further, and the third regeneration stage performed for at least about 3 more minutes. A complete regeneration time cycle can last, for example, for about 10 minutes.

An exemplary embodiment of a burst sequence of fluid flowed through an electrochemical cell 102 showing the burst volume and current versus time passed in the regeneration cycle is shown in FIG. 17. The duration of time for which the valve 117 is kept open controls the volume of fluid that is passed through the cell 102. The longer the valve 117 is kept open, the larger the volume of fluid that passes through the cell 102. For example, the volume of fluid passed with each burst through the cell 102 during the first regeneration stage can be 20% the volume of fluid passed with each burst through the cell 102 in the second regeneration stage, and the burst volume of fluid passed through the cell 102 in the third regeneration stage can again be only 20% the volume in the second regeneration stage. Accordingly, the timed bursts of fluid during the second regeneration stage would be at least about 5 times longer than the time periods in the first regeneration stage in this example, and the timed bursts of fluid during the third regeneration stage can be at least about one-fifth the time of the second regeneration stage. As another example, the valve 117 is operated to provide timed bursts of fluid during one regeneration stage that is a least about 2 times longer than the time period during another regeneration stage. For example, the valve 117 can provide timed bursts during an initial regeneration stage that are less than about ½ the time period of the following regeneration stage, and timed bursts of fluid during a last regeneration stage having a time period that is less than about ½ the time period of the preceding regeneration stage.

By controlling the time during which the valve 117 is open, different volumes of water can be passed through this cell 102 in different stages of the regeneration cycle to more efficiently regenerate the cell 102. It can be desirable, for example, to have a high fluid volume pass through the cell 102 in early or initial bursts when the concentration of dissolved ions or solids expelled from the membranes 110 during regeneration is highest to efficiently purge or flush out this expelled material from the cell 102. If this concentrate were allowed to remain in the cell 102 or be gradually or slowly expelled from the cell 102, the ion concentrate could precipitate out and deposit as scale on the internal surfaces of the cell 102 or even clog the surface of the membranes 110, or it may prevent efficient rejection of more ions due to concentration polarization. The clogged membranes 110 increase the fluid pressure in the cell 102 leading eventually to rupture or failure of the membrane 110 and reduced deionization performance. For example, ions such as calcium, magnesium or manganese that are expelled from the membranes 110 can precipitate out as insoluble carbonates, sulfates or other such compounds unless rapidly purged out.

An exemplary embodiment of a burst regeneration process having sequential timed bursts of fluid with the Y-axis representing the time that the valve 117 is left open and the current supplied to the electrodes 106,108, and X-axis showing elapsed time in a regeneration time cycle, is shown in FIG. 18. In the exemplary version shown, the entire regeneration time cycle lasts about 10 minutes. In the first regeneration stage, the valve 117 is opened for a sequential timed burst that lasts for a time period of about 1 second. The time between the start of each burst is 60 seconds. Each 1 second burst releases 60 cc of fluid into the cell 102. In the second regeneration stage, when the waste matter expelled from the membranes 110 has the highest concentration level, the valve 117 is maintained open for 4 timed bursts of 6 seconds duration each, passing 300 cc of fluid into the cell 102 in each burst. This cycle removes the bulk of the residual solids out of the cartridge 130 in the cell 102. Then, in the third regeneration stage, 5 timed bursts of 1 second duration each are provided to clean out residual solids from the cartridge.

The entire sequence of timed bursts, including the three stages each having particular burst time durations and closed time intervals, can also be controlled and programmed into the computer program code of the controller 170, or can be set by an operator insitu during use of the apparatus 100 and changed during use in the field. Varying the time for which the valve 117 is left open provides more efficient regeneration by controlling the volume of fluid passed through the cell at different stages of the regeneration cycle. This way, the valve 117 can be left on for a longer period of time to provide a greater volume of fluid passing through the 102 when the ions and solids expelled from the cell membranes 110 is at the greatest levels. As a result, multiple burst sequences can halve the time required to regenerate the membranes 110, and halve the water waste, thereby increasing regeneration efficiency by a factor of 2×compared to convention regeneration cycles with a single burst time or continuous regeneration water flow. While three stages are used to illustrate the process, two stages, or more than three stages can also be used, depending on the application.

During the open and close cycles of the valve 117, the current density applied to the membrane 110 of the cell 102 during burst regeneration can also be independently controlled to further optimize regeneration efficiency, as for example, shown in the exemplary embodiments of FIGS. 17 and 18. For example, in one method, one or more short time periods of high current levels can be applied to the electrodes 106,108 to generate high concentration levels of acid and base within the membrane by the water-splitting reaction in cell 102. The high levels of acid or base take time to diffuse and migrate through the membrane 110. The current density levels are then dropped down to lower levels to reduce heat and electricity consumption while still maintaining an electric potential drop through the cell 102 to continue to provide the migration effect on ion transport out of the membranes to the orifice to be flushed out of the cell 102. In one version, high current density levels of at least about 0.5 $mA/cm^2$ to about 5 $mA/cm^2$, are maintained in the cell 102 for about three minutes. The high current level in this example is followed by a low current level, which is about 80% less than the first current level, for about seven minutes. In the example shown in FIG. 18, in the current first stage, which partially overlaps the first and second fluid flow burst stages, a current of about 1.8 Amps is applied to the electrodes 106,108. Thereafter, for the remaining stages, a reduced current of about 0.5 Amps is applied to the electrodes 106,108.

The total volume of fluid used to regenerate the cell 102 can also be controlled in relation to the fluid flow rate or pressure provided by the fluid source. In one version, a fluid flow sensor 204 is provided in the fluid pathway after the cell 102 as shown in FIG. 19, or in or before the cell 102 (not shown). The flow sensor 204 can be a mass or volume flow meter, which measure flow rates, or a fluid pressure monitor 159 to monitor the pressure of fluid provided to the cell 102. In the version shown, the flow sensor 204 measures the flow rate passing through the cells 102a,b. The flow sensor 204 can be a magnetic turbine which is positioned in the fluid flow path and adjacent to a conventional Hall Effect sensor. The Hall Effect sensors measure the rotation of the magnetic turbines to allow determination of the volumetric fluid flow rate. Suitable magnetic turbines are available from Gems Sensors, Plainville, Conn.

The flow sensor 204 is in communication with the controller 170 and measures the flow rate or pressure of fluid through the cell 102 during at least a portion of the cell's operation cycle to generate a fluid flow or pressure signal which is sent to the controller 170. The controller 170 operates the valve 117 to set the duration of the timed bursts of fluid to adjust the flow volume passed though the cell 102 during regeneration. The fluid pressure can vary, for example, with the pressure provided by an external fluid source such as a city water supply. In some geographies, large variations of pressure can occur on a daily basis. Rather than varying burst time to compensate for varying feed pressure, the flow or pressure signal may adjust a pump that is used to pump fluid to through the cell 102, or it may control the opening size of a port of the valve 117 to control the fluid pressure. As the fluid pressure varies, the flow sensor 204 sends a fluid pressure signal to the controller 170, which in turn controls the pump pressure or valve opening time duration to control the volume of fluid passed through the cell 102.

In yet another version, the apparatus 100 has two or more cells 102a,b the second cell 102b can be operated to provide deionized fluid to the first cell 102a which is being regenerated by burst regeneration. The burst flow of fluid during regeneration provides better regeneration of the cell 102 and removes residual solids that would otherwise impede cell 102 regeneration. In this version, the bursts can be provided to cell 102a by controlling fluid flow through the cell 102a. So cell 102a receives bursts of fluid from the valve 117, and the bursts of deionized fluid are then passed from cell 102b to regenerate cell 102a.

FIG. 19 also shows a suitable arrangement of a flow regulator 193 to regulate the flow through the cells 102a,b. The flow regulator 193 can be a device that opens or closes the size of a hole in a concave shaped rubber washer (not shown) in relation to the pressure of fluid passing through the regulator 210. For example, the flow regulator 193 can regulate the flow rate of fluid passing through to achieve a constant flow rate of, for example, from about 0.5 l/min to 3 l/min. For a cell 102 sized about 15½ inches tall and from about 6 to about 12 inches in diameter, a suitable flow rate is from about 1 to about 2 l/min. Suitable flow regulators 193 having the desired flow rates are fabricated by Vernay, Yellow Springs, Ohio.

The apparatus 100 can further comprise conductivity sensors 212a,b in the fluid flow paths either upstream of the cells 102a,b, downstream of the cells 102a,b, or both. In one version, the conductivity sensors 212a,b are electrical circuits that provide a constant voltage across two electrodes immersed in the fluid to determine the conductivity of the fluid, which The resultant current passed between the electrodes 106,108 is in turn is a measure of the ion concentration of the fluid. The current is conveniently measured as a small voltage across a resistor in series with the circuit. The controller 170 upon receiving the conductivity signal from the sensor 212 can adjust the current passed through the cells 102a,b to for example, maintain a consistent ion concentration in the fluid passing through the cells 102a,b. In one version, the conductivity sensors 212a,b comprise a voltage supply that provides a voltage of 2 volts at 1 KHz across two gold plated pins which are inserted in the fluid flow path. The voltage across the measurement resistor is proportional to the current in the cell 102, which is related to the conductivity of the fluid and its ion concentration.

Flow Restrictor

Another way to limit fluid flow through the cell 102 during cell regeneration is to use a flow restrictor 220 in the flow path of the fluid being passed thorough the cells 102a,b, as for example, schematically shown in FIG. 20. The flow restrictor 220 limits the fluid flow rate passed through the cell 102a during regeneration of the cell 102 to reduce fluid consumption in regeneration. The flow restrictor 220 is used in conjunction with check valves 222a,b which prevent fluid flow in direction opposite to the arrowhead (as shown). Without the check valves 222a,b the fluid flow would not be controllable through the fluid restrictor 220.

For example, a suitable flow restrictor 220 can reduce the flow rate from over about 1 l/min to a lesser amount, for example to 0.5 l/min, 0.1 l/min, ore even 20 cc/min, during regeneration. As a result, the total volume of fluid passed through the cell 102 during regeneration can be reduced by a factor of 3× to about 50×relative to the flow volume used in regeneration without the flow restrictor 200 and if the valve 117 were left open for an entire regeneration cycle. For example, whereas continuous flow regeneration without a flow restrictor 220 would use a total volume of 46 liters at a flow rate of 2 l/min in a regeneration cycle lasting 23 minutes; a 15×flow restrictor can reduce the total volume of fluid to about 3 l in each 23 minute regeneration cycle. The flow restrictor 220 can also have a diameter which is at least about 30 times smaller than the diameter of the normal inlet pipe feeding an orifice 146,148 of a cell 102; for example, a diameter of less than about 0.05 inches, or even from about 0.01 inches. However, the small diameter of the flow restrictor 220 can cause occasional clogging of the restrictor or check valves 222a,b, which is undesirable. Using the burst sequence allows removal of the flow restrictor 220 and check valves 222a,b and consequently elimination of the problems associated with these components with the small opening size of the flow restrictor 220 because the total volume of fluid used during regeneration can be controlled simply by regulating the sequential timed burst durations and cycles through a larger orifice.

Modulating Regeneration Current

In yet another version, the current supplied through the cell 102 is modulated and set at different levels during regeneration to optimize regeneration and/or reduce power consumption during the regeneration cycle. Regeneration fluid flow may be of the burst or continuous variety. In one version, the controller 170 is adapted to control the power supply 118 to maintain first and second currents across the electrodes 106, 108 during the regeneration cycle. The variable voltage rejects ions from the membrane 110 to form a concentrate which is released at the inlet orifice of the cell 102. In one version, deionized fluid made at a first cell 102a is passed into the deionized fluid orifice of the second cell 102b during regeneration of the second cell 102b. During regeneration, the second electrode within the cell 102b is maintained at a positive polarity. In one version, the time modulated current comprises a first current and a second current, and wherein the first current is greater than the second current. The duty cycle for the first current is larger than that of the second current. The first and second currents are selected to provide optimum regeneration of the cell 102. For example, the second current may be a current that is reduced from the first current, to reduce power consumption during the regeneration process, to lower the concentration of hydroxide produced at the cathode, and reduce the cell 102 temperature. In one version, the regeneration cycle includes a first current level in which a first current density passed through membrane 110 of the cell 102 is at least about 0.5 mA/cm$^2$ for about 1 to about 5 minutes. This is followed by a second current level, which is at least about 30% lower than the first current density level, and more preferably at least about 50% lower, for a further about 5-20 minutes. Greater or lesser first and second current level times may be advantageous in different applications. In another measure of this preferred operation, the first current density is maintained from about 0.5 to about 5 mA/cm$^2$; and the second current density is from about 0.05 to about and 3 mA/cm2. Third and more current levels during a regeneration cycle may also be employed to provide power savings, lower temperatures or less electrode product (eg. hydroxide) to improve the operation of the present invention. These current levels may or may not coincide with regeneration burst.

In another version, the first and second currents of the regeneration cycle may also be pulsed or maintained for different time periods to vary power during first, second or further stages of a regeneration cycle to obtain results similar to those obtained from changing DC current level during regeneration. If pulsing the current to control power level, the duty cycle during the pulse is a measure of the percent time that the current is applied to cell 102. For example, the first current may be operated with a 100% duty cycle, and the second current with at most a 70% duty cycle to provide only at most 70% the power during the second regeneration stage, and thus to obtain the benefits of less power consumption, lower cell 102 temperatures and less electrode product. More preferably, the duty cycle of the second stage is at most 50% in this example. In addition, an alternating current pulse can also be provided overlying a direct current pulse.

FIG. 23 shows the effect of reducing regeneration current on the conductivity of the waste or regenerate fluid outputted from a cell 102 during regeneration. The total regeneration cycle time was about 20 minutes. The regeneration current was reduced 2 minutes into the regeneration cycle from the original 1 amp value to the indicated lesser values, and subsequently, raised back at 9 minutes into the cycle, to the original 1 amp level. The different currents applied to the cell 102 are shown in the index and vary from about 0.1 to about 1 amp, in values of 0.1, 0.3, 0.5, 0.7 and 1 amp. It is seen that the regenerate fluid conductivity remains about the same even when lower current levels of 0.1 amp are applied during the regeneration cycle, indicating that the total amount of ions rejected from the membranes 110 (area under the curve) which are passed to the regenerate fluid, does not change significantly even when a lower regeneration current level is applied. This allows substantial reduction of total energy consumption during regeneration without sacrificing regeneration performance.

FIG. 24 shows that above described reductions of regeneration current for the period 2 to 9 minutes into the regeneration cycle; do not significantly reduce the subsequent deionization performance of the cell 102. The % total dissolved solids (TDS) in the deionized fluid obtained from cells 102a,b regenerated with the lower current level did not vary significantly, indicating that this was yet another unexpected method of reducing total energy consumption during regeneration.

Reversing Electrode Polarity in Regeneration

In another version, after the cell 102 is operated to deionize fluid, a two-step regeneration process is conducted. In a first, primary regeneration step, the controller 170 opens the valve 117 to flow fluid into an orifice 148 of the cell 102 and controls the power supply 114 to supply a current having a polarity to the electrodes 106,108 of the cell 102 for a time period to regenerate the ion exchange membrane 110. The supplied current causes rejection of ions from the cell 102 into the fluid being passed though the cell 102 to form regenerate fluid, which is released at another orifice 146. In this primary regeneration step, the controller 170 typically supplies the current for a time period of at least about 2 minutes at current densities of about 0.2 to 20 mA/cm$^2$.

After the primary regeneration step is completed, in a secondary or post-regeneration step, the polarity of the current is reversed, but water flow continues as for the primary regeneration step (either burst or continuous flow). For example, the second polarity can be reversed from the first polarity by having the opposite sign. The second polarity can even be substantially the same polarity that is applied during the deionization cycle. The second polarity provides a deionization current to the cell 102 to reduce the concentration of residual ions in the cell 102 prior to initiating the deionization cycle. The reverse polarity current is maintained for a time period of at least about 0.5 minutes.

This method allows the fluid contained with the freshly regenerated cell 102 to be deionized by the reversed electrode polarity which causes current to move in opposite direction through the cell 102, while the valve 117 continues to pass fluid into the cell 102 for a time period in the regeneration flow direction. Reversing the polarity of the voltage immediately after the first, primary regeneration step of the cycle can help to prepare the cell 102 for subsequent processes by at least partially deionizing the fluid in the cell 102, to provide a less ionized fluid for subsequent deionization cycles.

At the end of the secondary, post-regeneration step, or in its place, the controller 170 may optionally signal the power supply 114 to stop supplying power to the electrodes 106,108 of the cell 102 so that no current passes through the fluid in the cell 102 while the valve is 117 set to continue to allow fluid to flow into the cell 102 in the primary regeneration flow direction for a time period of typically at least about 1 minute. This step will purge warm fluid from the cell 102, providing cooler fluid at the start of a subsequent deionization cycle.

Regeneration with Deionized Fluid

An apparatus 100 comprising at least a first electrochemical cell 102a (cell A) and a second electrochemical cell 102b (cell B) may be used to deionize fluid in a first cell 102a and to regenerate the ion exchange membranes 110 in a second cell 102b using the deionized fluid from the first cell 102a. An exemplary operational cycle for a fluid treatment apparatus 100 comprising two electrochemical cells 102a (cell A) and 102b (cell B), as shown in FIG. 12. Operation of the apparatus 100 is illustrated in the treatment of water from a fluid source 120, such as a city water supply, to deionize the water and regenerate the cells 102a,b. Each electrochemical cell 102a has a first or inlet orifice 146a,b connected to a valve 117 for receiving fluid, and a second, deionized fluid, or outlet orifice 148a,b, to pass the treated fluid 125 out of the cell 102a. In operation, the valve 117 directs an input fluid 124 to either of the cells 102a,b and also receives regenerated wastewater from the cells 102a,b and expels the waste water through the drain 124. The valve 117 as shown in FIG. 13, performs this by moving the movable element 122 between at least two positions. For example, where the movable element 122 is a rotor 252, the rotor 252 is rotated between different positions to regulate fluid flow. The controller 170 operates the motor 188 of the valve 117 and the power supply 114 to be able to perform a plurality of pre-treatment, fluid treatment (de-ionization), regeneration, and post-regeneration cycles.

Referring to FIGS. 12 and 13, to deionize and treat fluid in Cell A (102a), the movable element 122 of the valve 117 is set to a first position in which water from the fluid source 120 (city water supply) is passed through the inlet port 180a into the valve 117 chamber 245 of the valve cover 240 through the movable element 122 and out of the outlet valve port 180d. The fluid then enters the first or inlet orifice 146a of cell 102a. After deionization in the cell 102a, the treated fluid 125 is outputted or released from the orifice 148a for consumption or other use. The treated or deionized fluid from cell A is then passed into the orifice 148b of cell B (previously operated in deionization mode) which is now in a regeneration cycle to remove ions displaced from the ion exchange membrane 110. The regeneration waste water from cell B is expelled from the orifice 146b and passes through the base 230 into the internal passageway 274 of the movable element 122 and out into the city drain 190. Regeneration prepares the ion exchange membrane 110a for subsequent deionization processes and the deionized fluid regenerates the cell 102a with better regeneration efficiency because the lower ion content of the deionized fluid provides a greater driving force for ions to be expelled from the membrane 110a.

FIG. 22 shows that regeneration with hard water as seen in line (a) significantly increases the conductivity or ion content of the water deionized in a cell 102 after 300 cycles relative to the cells which were regenerated with deionized water line (b), or regenerated with deionized water in reverse flow as in line (c). The hard water used in this experiment had a conductivity of 1000 μS/cm, contained bicarbonate ions, and was passed through the cell 102 in a flow rate of about 40 mL/min. The soft water was absent the bicarbonate ions but had the same conductivity, and the deionized water was deionized in a connected cell 102 and had a conductivity of 100 μS/cm.

Note that the deionized fluid outputted from cell 102a is passed from its output orifice 148a to, for example, what is normally the deionized fluid output orifice 148b of the second cell 102b, which is undergoing regeneration. This reverses the normal or typical direction of fluid flow during regeneration of fluid in cell 102b. The orifice 148b of cell 102b is in a radially inner volume of the cell 102, for example, as shown in FIG. 1. Thus, during this regeneration of cell 102b, fluid passes from the radially inner volume of the cell 102b to the radially outer volume and exits the cell 102b through what is normally the inlet orifice 146b and is then passed to the drain 190. Thus, during this regeneration of cell 102b, fluid passes from the radially inner volume of the cell 102b to the radially outer volume and exits the cell 102b through what is normally the deionization fluid input orifice 146b and is then passed to the drain 190. The reversal of flow direction provides the benefit cited earlier of improving regeneration efficiency and avoiding contamination of the first water provided during the subsequent deionization cycle.

The controller 170 can also control the rate of fluid flowing into the first cell 102a operated in deionization mode, for example, to control the rate at which deionized fluid from cell 102a is passed into cell 102b that is being regenerated, or vice versa. Alternatively, the controller 170 can control the rate of fluid passed into the second cell 102b using a valve (not shown) placed in the fluid pathway between the orifice 148a of cell A and the orifice 148b of cell B. In one version, the controller 170 maintains a flow rate of fluid into the cells 102a,b that is sufficiently high to avoid precipitation of solids, for example calcium carbonate, in the cells 102a,b, during one or more of the deionization and regeneration cycles. The flow of fluid maintains the solubility of calcium-containing compounds in the fluid, thus reducing the build-up of calcium-containing precipitates and "scales" on the interior walls of the electrochemical cells 102a,b.

Scale Inhibitor Reagent Feed During Regeneration

Scale slowly accumulates in the cells 102, filters 160, pipes and other components of the apparatus 100 when treating hard water. Hard water comprises multivalent metal ions such as calcium, magnesium and manganese in addition to anions such as carbonate, bicarbonate and sulfates. Scale forms during regeneration when the concentrations of multivalent ions and carbonates rejected from the water-splitting membranes are highest, and it is particularly prevalent at higher pH's which form carbonates (from bicarbonate). To reduce the rate of scale formation in cartridges and cells 102, a scale inhibitor reagent that inhibits or removes scale formation can be added to the fluid entering a cell 102, for example, during the regeneration cycle. The scale inhibitor reagent can be an acid, such as strong acid, for example, hydrochloric acid, phosphoric acid, or sulfuric acid; a weak acids such as citric acid, sulfamic acid or malic acid; or other reagents such as phosphates. The addition of scale inhibitor reagent during regeneration can be continuous or in discontinuous steps, such as short drips, and may take place throughout the regeneration cycle or only during a portion of the regeneration cycle. The scale inhibitor drip system can also drip scale inhibitor reagent into the fluid during a deionization cycle.

The scale inhibitor drip system can add scale inhibitor reagent to fluid using the previously described drip system. A particularly useful method to minimize reagent consumption and hence reducing cell 102 maintenance is to add acid to the regeneration feed water to reduce the pH between the membranes only during the portion of regeneration which produces the highest concentrations of carbonates. Maintaining the pH at less than 7, or even less than 6, or less than 5, can largely avoid scale formation within the cartridge 130 and cell 102.

The present invention has been described with reference to certain preferred versions thereof; however, other versions are possible. For example, the apparatus and methods can be used in other types of applications, as would be apparent to one of ordinary skill, such as for example, processes for removing other materials or species from fluids, solutions, and slurries. Other configurations of the apparatus, different ways of interconnecting the electrochemical cells, alternative valve structures, and different membrane types can also be used. Therefore, the spirit and scope of the appended claims should not be limited to the description of the preferred versions contained herein.

What is claimed is:

1. A fluid treatment apparatus comprising:
   (a) an electrochemical cell comprising
     (i) a plurality of fluid orifices to receive an input fluid and release an output fluid, the input fluid comprising a first level of active microorganisms;
     (ii) first and second electrodes; and
     (iii) an ion exchange membrane between the first and second electrodes to treat the input fluid to form the output fluid;
   (b) a power supply having an output to apply a current to, and an output voltage across, the first and second electrodes; and
   (c) a control module comprising program code to:
     (i) receive a signal from the power supply to detect the current through the first and second electrodes; and
     (ii) send a signal to the power supply to apply an output voltage across the first and second electrodes to maintain a current having a current density which is sufficiently high to deactivate the microorganisms in the fluid such that the output fluid comprises a second level of active microorganisms which is less than the first level of active microorganisms in the input fluid.

2. An apparatus according to claim 1 wherein the control module comprises program code to send a signal to the power supply to apply an output voltage across the first and second electrodes to maintain a current having a current density from about 0.01 to about 20 mA/cm$^2$.

3. An apparatus according to claim 1 wherein the first and second levels comprise colony forming units per 100 mL of fluid, and wherein the second level comprises fewer colony forming units per 100 mL of the output fluid than the first level of colony forming units per 100 mL of the input fluid.

4. An apparatus according to claim 3 wherein the control module comprises program code to send a signal to the power supply to maintain a current density that is sufficiently high to substantially prevent an increase in the colony forming units per 100 mL in the output fluid.

5. An apparatus according to claim 4 wherein the control module controls the power supply to apply an output voltage across the first and second electrodes to maintain a current having a current density that is sufficiently high to provide an output fluid having a second level of colony forming units per 100 mL that is at least about 90% lower than the first level of colony forming units per 100 mL of the input fluid.

6. An apparatus according to claim 4 wherein the input fluid comprises a first level of a microorganism comprising a heterotrophe bacteria plate count of at least about 500 Cfu/mL, and wherein the control module comprises program code to send a signal to the power supply to set a current density sufficiently high to provide an output fluid having a second level of heterotrophe bacteria plate count that is less than about 450 Cfu/mL.

7. An apparatus according to claim 1 wherein the first and second levels of active microorganisms comprise heterotrophe bacteria plate counts.

8. An apparatus according to claim 7 wherein the input fluid comprises a first level of a microorganism comprising a heterotrophe bacteria plate count of at least about 500 Cfu/mL, and wherein the control module comprises program code to send a signal to the power supply to maintain a current density sufficiently high to provide an output fluid having a second level of heterotrophe bacteria plate count that is less than about 450 Cfu/mL.

9. An apparatus according to claim 1 wherein the control module controls the power supply to maintain a current density sufficiently high to provide an output fluid having at least one log reduction of bacteria plate count for a fluid residence time of at least 0.05 minute.

10. An apparatus according to claim 1 wherein the control module comprises program code to send a signal to the power supply to maintain a current density sufficiently high to provide an output fluid having at least two log reduction of bacteria plate count.

11. An apparatus according to claim 1, wherein the control module comprises program code to send a signal to the power supply to maintain the current in response to a measured voltage across a resistor placed in series with the output of the power supply.

12. An apparatus according to claim 1 wherein the control module comprises program code to send a signal to a voltage level selector to produce a timing signal to control the output voltage applied by the power supply.

13. An apparatus according to claim 12, wherein the voltage level selector comprises:
 (a) a zero-crossing detector;
 (b) a capacitor and switched resistor network; and
 (c) a timer.

14. A fluid treatment apparatus comprising:
 (a) an electrochemical cell comprising
  (i) a plurality of fluid orifices to receive an input fluid and release an output fluid, the input fluid comprising a first heterotrophe bacteria plate count, and the output fluid comprising a second heterotrophe bacteria plate count;
  (ii) first and second electrodes; and
  (iii) an ion exchange membrane between the first and second electrodes to treat the input fluid to form the output fluid, the ion exchange membrane comprising both anion and cation exchange surfaces;
 (b) a power supply to apply a current to the first and second electrodes; and
 (c) a control module to receive a signal from the power supply and to send a signal to the power supply, the control module comprising program code to:
  (i) receive a signal from the power supply to detect a voltage drop per membrane layer; and
  (i) send a signal to the power supply to supply a current to the first and second electrodes to maintain an electric potential drop of at least about 0.05 volts/membrane and that is sufficiently high to substantially prevent an increase in the plate count of the heterotrophe bacteria in the output fluid, so that a second plate count of heterotrophe bacteria in the output fluid is lower than the first plate count of heterotrophe bacteria in the input fluid.

15. An apparatus according to claim 14 wherein the control module comprises program code to send a signal to the power supply to maintain a current to obtain an electric potential drop of less than about 20 volts/membrane.

16. An apparatus according to claim 14 wherein the ion exchange membrane comprises multiple membrane layers between the first and second electrodes.

17. An apparatus according to claim 16 wherein the control module comprises program code to send a signal to the power supply to maintain a current sufficiently high to obtain an average electric potential drop of at least about 0.05 volts/membrane layer.

18. An apparatus according to claim 16 wherein the control module comprises program code to send a signal to the power supply to maintain a current sufficiently high to obtain an average electric potential drop of at least about 0.5 volts/membrane layer.

19. An apparatus according to claim 16 wherein the control module comprises program code to send a signal to the power supply to maintain a current to obtain an average electric potential drop of less than about 20 volts/membrane layer.

20. An apparatus according to claim 14 wherein the second plate count of heterotrophe bacteria is reduced by at least by a factor of 10 from the first plate count.

21. An apparatus according to claim 14 wherein the second plate count of heterotrophe bacteria is reduced by at least by a factor of 100 from the first plate count.

22. A fluid treatment apparatus comprising:
 (a) an electrochemical cell comprising a housing having a plurality of orifices, and an ion exchange membrane between a pair of electrodes;
 (b) a power supply to supply a current to the electrodes;
 (c) a valve to control the flow of fluid through the orifices of the cell; and
 (d) a control module comprising program code to:
  (1) in a deionization cycle, send a signal to the valve to open the valve to flow fluid into an orifice of the cell while sending a signal to the power supply to supply a current having a current density to the pair of electrodes to form deionized fluid which is released at another orifice; and
  (2) in a post deionization cycle, send a signal to the valve to close the valve to substantially stop the flow of fluid into the cell, while continuing to send a signal to control the power supply to supply a deionization current to the electrodes for a time period.

23. An apparatus according to claim 22 wherein the control module comprises program code to, in a post-deionization cycle, send a signal to the power supply to apply a deionization current that is maintained at a current density of at least about 0.5 mA/cm$^2$, and for a time period of less than about 10 minutes.

24. An apparatus according to claim 22 wherein the time period is less than about 5 minutes.

25. An apparatus according to claim 22 wherein the control module comprises program code to, in a deionization cycle, send a signal to the power supply to maintain a current density that is at least about 0.05 mA/cm$^2$.

26. An apparatus according to claim 22 wherein the control module comprises program code to, in a post-deionization cycle, send a signal to the power supply to maintain a current density that is less than about 5 mA/cm$^2$.

27. A fluid treatment apparatus comprising:
(a) an electrochemical cell comprising a housing having a plurality of orifices, and an ion exchange membrane between a pair of electrodes;
(b) a power supply to supply a current to the electrodes of the cell;
(c) a valve to control the flow of fluid through the orifices of the cell; and
(d) a control module comprising program code to:
 (1) in a fluid deionization cycle, send a signal to the valve to operate the valve to pass fluid into an orifice of the cell while sending a signal to the power supply to supply a current to the electrodes to form deionized fluid that is released at another orifice; and
 (2) in a regeneration cycle, send a signal to the valve to operate the valve to provide a timed burst of fluid into an orifice of the cell, the timed burst comprising opening the valve for a time period shorter than the regeneration cycle time, while sending a signal to the power supply to supply a current to the electrodes to regenerate the ion exchange membrane to form regenerate fluid which is released at another orifice, and then send a signal to close the valve.

28. An apparatus according to claim 27 wherein the control module comprises program code to, during a regeneration cycle, operate the valve to provide a plurality of timed bursts of fluid in the regeneration cycle time.

29. An apparatus according to claim 27 wherein the control module comprises program code to, during a regeneration cycle, operate the valve to provide timed bursts of fluid for time periods of from about 0.1% to about 80% of the regeneration cycle time.

30. An apparatus according to claim 27 wherein the control module comprises program code to, during a regeneration cycle, operate the valve to provide timed bursts of fluid for time periods of from about 0.1 to about 40 seconds.

31. An apparatus according to claim 27 wherein the control module comprises program code to, during a regeneration cycle, operate the valve to provide timed bursts of fluid for different time periods during the regeneration cycle time.

32. An apparatus according to claim 31 wherein the control module comprises program code to, during a regeneration cycle, operate the valve to provide timed bursts of fluid (i) during a first regeneration stage for time periods of from about 0.1% to about 30% of the regeneration cycle time; (ii) during a second regeneration stage for time period of from about 0.3% to about 80% of the regeneration cycle time; and (iii) during a third regeneration stage for time periods of from about 0.1% to about 30% of the regeneration cycle time.

33. An apparatus according to claim 31 wherein the control module comprises program code to, during a regeneration cycle, operate the valve to provide timed bursts of fluid (i) during a first regeneration stage for time periods of from about 0.1 to about 10 seconds; (ii) during a second regeneration stage for time periods of from about 3 to about 40 seconds; and (iii) during a third regeneration stage for time periods of from about 0.1 to about 10 seconds.

34. An apparatus according to claim 27 wherein the control module comprises program code to operate the valve to provide timed bursts of fluid during one regeneration stage that is a least about 2 times longer than the time period during another regeneration stage.

35. An apparatus according to claim 27 wherein the control module comprises program code to operate the valve to provide timed bursts of fluid during a last regeneration stage having a time period that is less than about ½ the time period of a preceding or following regeneration stage.

36. An apparatus according to claim 27 wherein the control module comprises program code to, during a regeneration cycle, operate the valve to provide timed bursts of fluid during (i) a first regeneration stage which is performed from the commencement of the regeneration cycle until a time of less than about 2 minutes later, (ii) a second regeneration stage, which is performed for a time of at least about 3 minutes further, and (iii) a third regeneration stage, which is performed for at least about 3 minutes further.

37. An apparatus according to claim 27 further comprising a flow sensor that measures a flow rate through the first cell and sends a flow signal to the control module to operate the valve to set the duration of the timed bursts of fluid.

38. An apparatus according to claim 27 wherein in (a) the electrochemical cell is a first cell, and further comprising a second electrochemical cell comprising a housing having a plurality of orifices, a pair of electrodes, and an ion exchange membrane between the electrodes, and
 wherein the control module comprises program code to send a signal to the power supply and to the valve to deionize fluid in the second cell in a deionization cycle and pass the deionized fluid to the orifice of the first cell which is in a regeneration cycle.

39. A method of operating an electrochemical cell comprising a pair of electrodes about an ion exchange membrane, the method comprising:
(a) in a fluid deionization cycle, passing fluid into the cell while powering the electrodes to deionize the fluid to form deionized fluid; and
(b) in a regeneration cycle, providing a timed burst of fluid into the cell while powering the electrodes to regenerate the ion exchange membrane, the timed burst lasting from about 0.1% to about 80% of the regeneration cycle time, where the regeneration cycle time is the total time during which the ion exchange membrane is regenerated before it is used again for a deionization cycle.

40. A method according to claim 39 wherein the timed burst lasts from about 0.3% to about 30% of the regeneration cycle time.

41. A method according to claim 39 comprising, in a regeneration cycle, providing a plurality of timed bursts of fluid into the cell while powering the electrodes to regenerate the ion exchange membrane.

42. A method according to claim 41 wherein the number of timed bursts is at least about 10.

43. A method according to claim 41 wherein the timed bursts of fluid are performed in two or more stages and wherein the duration of the timed bursts are different for different stages.

44. A fluid treatment apparatus comprising:
(a) an electrochemical cell comprising a housing having a plurality of orifices, and an ion exchange membrane between a pair of electrodes;
(b) a power supply to supply a current to the electrodes of the cell;
(c) a valve to control the flow of fluid through the orifices of the cell; and
(d) a control module comprising program code to:
 (1) in a deionization cycle, send a signal to the valve to open the valve to flow fluid into an orifice of the cell while sending a signal to the power supply to supply a current to the electrodes to deionize the fluid to form deionized fluid which is released at another orifice;

(2) in a regeneration cycle, send a signal to the valve to open the valve to flow fluid into an orifice of the cell and send a signal to the power supply to:

(i) in a main regeneration step, supply a current having a polarity to the electrodes to regenerate the ion exchange membrane to form regenerate fluid which is released at another orifice; and (ii) in a post regeneration step, reverse the polarity of the current.

45. An apparatus according to claim 44 wherein the control module comprises program code to, during the post regeneration step, send a signal to the power supply to supply the current for a time period of at least about 0.5 minutes.

46. An apparatus according to claim 44 wherein the control module comprises program code to, at the end of the post regeneration step, send a signal to the power supply to terminate the reverse polarity current supplied to the electrodes while sending a signal to the valve to maintain the valve open to allow a volume of fluid to continue to flow into the orifice of the cell, the volume being at least 20% of the cell void volume.

47. A fluid treatment method conducted in an electrochemical cell, the method comprising:

(a) in a deionization cycle, flowing fluid into the cell while passing a current through the fluid to form deionized fluid which is released from the cell;

(b) in a regeneration cycle, flowing fluid into the cell and (i) in a main regeneration step, passing a current having a polarity through the fluid to regenerate the ion exchange membrane to form regenerate fluid which is released from the cell; and (ii) in a post regeneration step, reversing the polarity of the current.

48. A method according to claim 47 wherein, in the post regeneration step, the current is supplied for at least about 0.5 minutes.

49. A method according to claim 47 comprising, after (b)(ii), terminating the reverse polarity current while continuing to flow fluid into the cell.

50. A method according to claim 49 comprising, after terminating the reverse polarity current, continuing to flow fluid into the cell for at least about 1 minute.

51. A fluid treatment apparatus comprising:

(a) an electrochemical cell comprising a housing having inlet and deionized fluid orifices, and an ion exchange membrane between first and second electrodes, the first electrode being adjacent to the inlet fluid orifice and the second electrode adjacent to the deionized fluid orifice;

(b) a power supply to supply a current to the electrodes of the cell;

(c) a valve to control the flow of fluid through the inlet and deionized fluid orifices of the cell; and (d) a control module comprising program code to:

(1) in a deionization cycle, send a signal to the valve to open the valve to flow fluid into the inlet fluid orifice of the cell while sending a signal to the power supply to supply a current to the first electrode to deionize the fluid to form deionized fluid which is released at the deionized fluid orifice; and (2) in a regeneration cycle, send a signal to the valve to open the valve to flow fluid into the deionized fluid orifice of the cell while sending a signal to the power supply to supply a current having a first positive polarity to the second electrode to regenerate the ion exchange membrane to form regenerate fluid which is released from the inlet fluid orifice.

52. An apparatus according to claim 51 wherein in (d)(2), the control module comprises program code to send a signal to the power supply to supply a current which generates a current density of from about 0.02 mA/cm$^2$ to about 20 mA/cm$^2$.

53. An apparatus according to claim 51 wherein the power supply comprises a voltage supply.

54. An apparatus according to claim 53 wherein the voltage supply supplies a time modulated voltage to the first and second electrodes.

55. An apparatus according to claim 51 wherein the deionized fluid has a conductivity of less than 50% that of the fluid treated during the deionization cycle.

56. A fluid treatment apparatus comprising:

(a) an electrochemical cell comprising a housing having inlet and deionized fluid orifices, and an ion exchange membrane between first and second electrodes, the first electrode being adjacent to the inlet fluid orifice and the second electrode adjacent to the deionized fluid orifice;

(b) a power supply to supply a current to the electrodes of the cell;

(c) a valve to control the flow of fluid through the inlet and deionized fluid orifices of the cell; and (d) a control module comprising program code to:

(1) in a deionization cycle, send a signal to the valve to open the valve to flow fluid into the inlet fluid orifice of the cell while sending a signal to the power supply to supply a current having a first positive polarity to the first electrode to deionize the fluid to form deionized fluid which is released at the deionized fluid orifice; and (2) in a regeneration cycle, send a signal to the valve to open the valve to flow deionized fluid into the deionized fluid orifice of the cell while sending a signal to the power supply to supply a current having a first positive polarity to the second electrode to regenerate the ion exchange membrane to form regenerate fluid which is released from the inlet fluid orifice.

57. An apparatus according to claim 56 wherein the deionized fluid has a conductivity of less than 50% that of the fluid treated during the deionization cycle.

58. An apparatus according to claim 56 wherein in(d)(2), the control module comprises program code to send a signal to the power supply to supply a current which generates a current density of from about 0.02 mA/cm$^2$ to about 20 mA/cm$^2$.

59. An apparatus according to claim 56 wherein the power supply comprises a voltage supply.

60. An apparatus according to claim 59 wherein the voltage supply supplies a time modulated voltage to the first and second electrodes.

61. A fluid treatment apparatus comprising:

(a) an electrochemical cell comprising a housing having inlet and deionized fluid orifices, and an ion exchange membrane between first and second electrodes, the first electrode being adjacent to the inlet orifice and the second electrode adjacent to the deionized fluid orifice;

(b) a variable voltage supply that provides a time modulated direct current voltage to the electrodes of the cell, the time modulated direct current voltage having a single polarity that remains either positive or negative;

(c) a valve to control the flow of fluid through the inlet and deionized fluid orifices of the cell; and (d) a control module comprising program code to, in a regeneration cycle, send a signal to the valve to open the valve to flow fluid into the deionized fluid orifice of the cell while sending a signal to the variable voltage supply to supply a time modulated direct current voltage to the electrodes of the cell.

62. An apparatus according to claim 61 wherein the control module comprises program code to send a signal to the valve to open the valve to flow deionized fluid into the deionized fluid orifice.

63. An apparatus according to claim 61 wherein the second electrode is maintained at a positive polarity.

64. An apparatus according to claim 61 wherein the time modulated current comprises a first current and a second current, and wherein the first current is greater than the second current.

65. An apparatus according to claim 64 wherein the duty cycle for the first current is larger than that of the second current.

66. A fluid treatment apparatus comprising:
(a) an electrochemical cell comprising a housing having a plurality of orifices, and an ion exchange membrane between a pair of electrodes;
(b) a power supply to supply a current to the electrodes;
(c) a valve to control the flow of fluid through the orifices of the cell; and
(d) a control module comprising program code to:
  (1) in a deionization cycle, send a signal to the valve to open the valve to flow fluid into an orifice of the cell while sending a signal to the power supply to supply a current having a current density to the pair of electrodes to form deionized fluid which is released at another orifice; and
  (2) in a regeneration cycle, send a signal to the valve to open the valve to supply deionized fluid to an orifice while sending a signal to the power supply to supply a modulated regeneration current to the electrodes.

67. An apparatus according to claim 66 wherein the control module comprises program code to, in a regeneration cycle, send a signal to the power supply to maintain first and second currents across the electrodes.

68. An apparatus according to claim 67 wherein the first current is larger than the second current.

69. An apparatus according to claim 68 wherein the duty cycle of the first current is larger than the duty cycle of the second current.

70. An apparatus according to claim 69 wherein the first current provides a current density of from about 0.5 mA/cm$^2$ to about 5 mA/cm$^2$.

71. An apparatus according to claim 70 wherein the second current provides a current density of from about 0.05 mA/cm$^2$ to about 3 mA/cm$^2$.

72. An apparatus according to claim 69 wherein the duty cycle for the first current is about 100% and the duty cycle for the second current is less than about 70%.

* * * * *

UNITED STATES PATENT AND TRADEMARK OFFICE
CERTIFICATE OF CORRECTION

PATENT NO. : 8,562,803 B2  
APPLICATION NO. : 11/539596  
DATED : October 22, 2013  
INVENTOR(S) : Nyberg et al.

Page 1 of 1

It is certified that error appears in the above-identified patent and that said Letters Patent is hereby corrected as shown below:

In the Specification:

Column 11, line 29 "it's" should be changed to -its-.

Column 21, line 10 "202" should be changed to -$H_2O_2$-.

Signed and Sealed this  
Thirty-first Day of December, 2013

Margaret A. Focarino  
*Commissioner for Patents of the United States Patent and Trademark Office*